US007436644B2

(12) United States Patent
Nagai et al.

(10) Patent No.: US 7,436,644 B2
(45) Date of Patent: Oct. 14, 2008

(54) SWITCHING CIRCUIT, SWITCHING METHOD, PROTECTIVE DEVICE AND BATTERY PACK

(75) Inventors: Tamiji Nagai, Kanagawa (JP); Kazuo Yamazaki, Kanagawa (JP); Hitoshi Akiho, Miyagi (JP); Takayuki Aita, Fukushima (JP); Kenji Enomoto, Saitama (JP)

(73) Assignee: Sony Corporation (JP)

( * ) Notice: Subject to any disclaimer, the term of this patent is extended or adjusted under 35 U.S.C. 154(b) by 285 days.

(21) Appl. No.: 10/503,992

(22) PCT Filed: Dec. 12, 2003

(86) PCT No.: PCT/JP03/15966

§ 371 (c)(1), (2), (4) Date: Apr. 4, 2005

(87) PCT Pub. No.: WO2004/057719

PCT Pub. Date: Jul. 8, 2004

(65) Prior Publication Data

US 2005/0174711 A1 Aug. 11, 2005

(30) Foreign Application Priority Data

Dec. 20, 2002 (JP) ............................ 2002-369515
Jan. 22, 2003 (JP) ............................ 2003-013423
Mar. 26, 2003 (JP) ............................ 2003-084598

(51) Int. Cl.
*H01H 51/22* (2006.01)
*G01R 31/327* (2006.01)

(52) U.S. Cl. ...................... 361/160; 361/91.1; 324/418; 324/419; 324/424

(58) Field of Classification Search ................ 361/160; 324/418, 419, 424
See application file for complete search history.

(56) References Cited

U.S. PATENT DOCUMENTS 3,364,392 A * 1/1968 Lafreniere ................... 361/18
3,688,227 A * 8/1972 Hong ............................ 335/7
3,742,313 A * 6/1973 Spencer ...................... 361/160
3,845,467 A * 10/1974 Oman et al. ............... 340/3.53

(Continued)

FOREIGN PATENT DOCUMENTS

EP 0 043 020 A1 1/1982

(Continued)

OTHER PUBLICATIONS

International Search Report dated Apr. 13, 2004.

(Continued)

*Primary Examiner*—Michael J Sherry
*Assistant Examiner*—Zeev Kitov
(74) *Attorney, Agent, or Firm*—Rader Fishman & Grauer PLLC; Ronald P. Kananen

(57) ABSTRACT

A solenoid type switch has at least two driving coils. The driving coils turn off a switch with a current for example an overcurrent that flows in the switch. The driving coils are magnetized or demagnetized by a driving circuit so as to turn on or off the switch. The driving circuit magnetizes or demagnetizes the driving coils in accordance with a control signal supplied from a controlling circuit. Thus, the switch can be turned off with the current that flows in the driving coils.

19 Claims, 45 Drawing Sheets

L1 SW21 L2 101 103 105 110 E 106 111 102 104 107 SW22a 108 SW22b SW22 SIGNAL 112

U.S. PATENT DOCUMENTS

| | | | | | |
|---|---|---|---|---|---|
| 4,241,372 | A | * | 12/1980 | Sears | 361/72 |
| 4,841,407 | A | * | 6/1989 | Baba et al. | 361/146 |
| 5,394,291 | A | * | 2/1995 | Janke et al. | 361/155 |
| 5,590,013 | A | * | 12/1996 | Harasawa | 361/187 |
| 5,737,161 | A | * | 4/1998 | Thomas | 361/7 |

FOREIGN PATENT DOCUMENTS

| | | | |
|---|---|---|---|
| JP | 63-172958 | | 7/1988 |
| JP | 401059733 | * | 3/1989 |
| JP | 04-109814 | | 4/1992 |
| JP | 4-109814 A | | 4/1992 |
| JP | 05-290707 | | 11/1993 |
| JP | 07-322512 | | 12/1995 |
| JP | 2002-093466 | | 3/2002 |

OTHER PUBLICATIONS

Japanese Patent Application 2002-369515; OA Issued on Jul. 4, 2006.

* cited by examiner

SW31
SW32
L1
L2
121
122
123
124
125
126
127
128
129
SW CONTROLLING
131
132
133
134
135
136
137
138
139
140
E

T2001
T2002
2026
SELECTION CONTROLLING
CAPACITY DETECTING
2011
2021
2022
2023
2025
2024
E2012
E2011

T2001
CONSTANT VOLTAGE
CONTROLLING
SELECTION CONTROLLING
T2002
CAPACITY DETECTING
2043
2042
2026
2021
2022
2041
2011
E2012
E2011

T2001
2021
2022
SELECTION CONTROLLING
2026
T2002
2046
PROTECTION DETECTING/
SELECTION DETECTING
2041
E2012
E2011

T2001
2026
SELECTION CONTROLLING
2046
PROTECTION DETECTING
SELECTION DETECTING
T2002
2041
L2002
L2001
$SW2002_1$
$SW2002_2$
$SW2002_3$
$SW2001_1$
$SW2001_2$
$SW2001_3$
$E2022_1$
$E2022_2$
$E2022_3$
$E2022_4$
$E2022_5$
$E2022_6$
E2022
$E2021_1$
$E2021_2$
$E2021_3$
$E2021_4$
$E2021_5$
$E2021_6$
E2021

T2001
T2003
2053
USE/NON-USE STATE DETECTING
2052
CHARGING/DISCHARGING OPERATION COMPLETION STATE DETECTING
T2002
2026
SELECTION CONTROLLING
2046
PROTECTION DETECTING
SELECTION DETECTING
2041
L2002
$SW2002_1$
$SW2002_2$
$SW2002_3$
$SW2001_1$
$SW2001_2$
$SW2001_3$
L2001
BATTERY PACK
2051

SWITCHING CIRCUIT, SWITCHING METHOD, PROTECTIVE DEVICE AND BATTERY PACK

TECHNICAL FIELD

The present invention relates to a switching circuit, a switching method, a protecting device, and a battery pack for protecting an electronic part, for example a lithium ion secondary battery cell against an overcurrent.

BACKGROUND ART

Conventionally, when an overcurrent that flows in an electric circuit is detected, a current is detected by a detecting circuit. With the detected current, it is determined whether or not the detected current is an overcurrent. For example, as shown in FIG. 1, a current is detected by a detecting circuit 151. The detected current is supplied to a controlling circuit 152. The controlling circuit 152 determines whether or not the supplied current is an overcurrent. The determined result is supplied as a control signal to a driving circuit 153.

The driving circuit 153 magnetizes or demagnetizes a solenoid type switch 154 in accordance with the supplied control-signal. For example, when the solenoid type switch 154 is magnetized, it is turned off. In contrast, when the solenoid type switch 154 is demagnetized, it is turned on.

Conventionally, an electric circuit that uses a solenoid type switch is controlled by one driving coil (refer to Japanese Patent Laid-Open Publication No. HEI 05-290707).

Japanese Patent Laid-Open Publication No. 2002-093466 describes a technology of a charging controlling circuit that has a battery protecting function so as to integrate circuit boards for a charging controlling circuit and a battery cell protecting circuit as one board and allow a battery pack to be composed of only battery cells.

However, in such a circuit, if the detecting circuit and the controlling circuit are broken with an overcurrent, the possibility of which the solenoid type switch is kept on is high.

However, there is no method for determining whether or not the solenoid type switch 154 has been turned off. Thus, if the solenoid type switch 154 breaks and melt-adheres, it cannot be turned off.

To solve such a problem, another technology as shown in FIG. 2 has been disclosed. In the technology, a protecting circuit is disposed along with a switch 1121 as a solenoid type switch. The switch 1121 as a solenoid type switch is disposed between a positive terminal of a secondary battery cell 1131 and a protecting circuit 1134. Detecting circuits 1132 and 1133 are disposed in parallel with the secondary battery cell 1131. The detecting circuits 1132 and 1133 detect for example voltages or currents. A detected result of the detecting circuit 1132 is supplied to a driving circuit 1123. The driving circuit 1123 controls on/off states of the solenoid type switch 1121 in accordance with the detected result. Likewise, a detected result of the detecting circuit 1133 is supplied to the protecting circuit 1134. The protecting circuit 1134 shuts off for example a charging path and/or a discharging path so as to protect the secondary battery cell 1131 in accordance with the detected result of the detecting circuit 1133.

Thus, conventional technologies require an extra protecting circuit that protects a solenoid type switch.

Therefore, an object of the present invention is to provide a switching circuit, a switching method, and a protecting device that are capable of preventing a contact of a switch from adhering without need to dispose an extra detecting circuit, detecting on/off states of the switch, and maintaining safety without need to dispose an extra protecting circuit.

In addition, in a battery pack having a plurality of secondary battery cells connected in series, they are charged or discharged at a time. For example, a battery pack shown in FIG. 3 uses a battery block 2081 of which four secondary battery cells are connected in series and in parallel. The secondary battery cells are charged and discharged through terminals 2083 and 2084. As a protecting circuit that maintains safety of the battery block 2081, a switching circuit 2082 is disposed between the battery block 2081 and the terminal 2082.

Japanese Patent Laid-Open Publication No. HEI 7-322512 describes a battery assembly of which electrodes of a plurality of battery cells are not contacted to each other. In the battery assembly, the capacity of each battery cell is detected. Each battery cell is independently charged.

In a battery pack shown in FIG. 4, many battery cells are connected in a battery block 2088. In the battery pack, if for example one battery cell is short-circuited, an overcurrent flows in the battery cell. As a result, safety of the battery pack cannot be maintained.

Thus, to assure safety of a battery pack, the number of secondary battery cells that can be connected in series and in parallel has been restricted. Thus, the upper limit of the capacity of a battery pack has been designated.

Therefore, an object of the present invention is to provide a battery pack having at least two battery pack cells whose safety is assured and allowing them to be selectably used.

DISCLOSURE OF THE INVENTION

Claim 1 of the present invention is a switching circuit, comprising first and second coils; a switch connected in series with the first coil; and controlling means for controlling on/off states of the switch with the second coil, wherein when an overcurrent flows in the first coil, the first coil is configured to turn off the switch.

Claim 3 of the present invention is a switching method, comprising the steps of disposing a first coil and a switch in series; controlling on/off states of the switch with a second coil; and when an overcurrent flows in the first coil, causing the first coil to turn off the switch.

Claim 5 of the present invention is a protecting device, comprising a first switch and a second switch connected in series; controlling means for controlling on/off states of the first switch and the second switch; operation state detecting means for detecting operation states of the first switch and the second switch; state determining means for determining whether or not control states of the first switch and the second switch match the operation states thereof, wherein when the determined result of the state determining means represents that the control states do not match the operation states, the first switch and the second switch are configured to be turned off.

Claim 8 of the present invention is a battery pack, comprising a first battery block and a second battery block, each of which is composed of a plurality of secondary battery cells connected in series and in parallel; a first battery terminal to which first terminals of the first battery block and the second battery block are connected through first switching means and second switching means; a second battery terminal to which second terminals of the first battery block and the second battery block are connected; switching means for switching the first switching means and the second switching means when charging or discharging is performed; capacitance detecting means for detecting battery capacitances of the first battery block and the second battery block; and switching controlling means for controlling the switching means in accordance with the detected battery capacities, wherein when the first switch means and the second switch means are switched, after one of the first switch and the second switch is turned off and a predetermined time period elapses, the other of the first switch means and the second switch means is turned on.

Thus, when an overcurrent flows, a switch is turned off by a coil disposed in parallel therewith. Thus, the switch can be prevented from melt-adhering.

In addition, operating states of a first switch and a second switch that are connected in series can be detected. It can be determined whether or not they are normally operating in accordance with detected operating states and controlling states thereof. Thus, even if one of the switches breaks and melt-adheres, the circuit can be protected.

In addition, first switching means and second switching means are controlled in accordance with battery capacities of battery blocks. Thus, a desired output can be obtained while safety of the battery blocks is maintained.

BEST MODES FOR CARRYING OUT THE INVENTION

Figure 1:
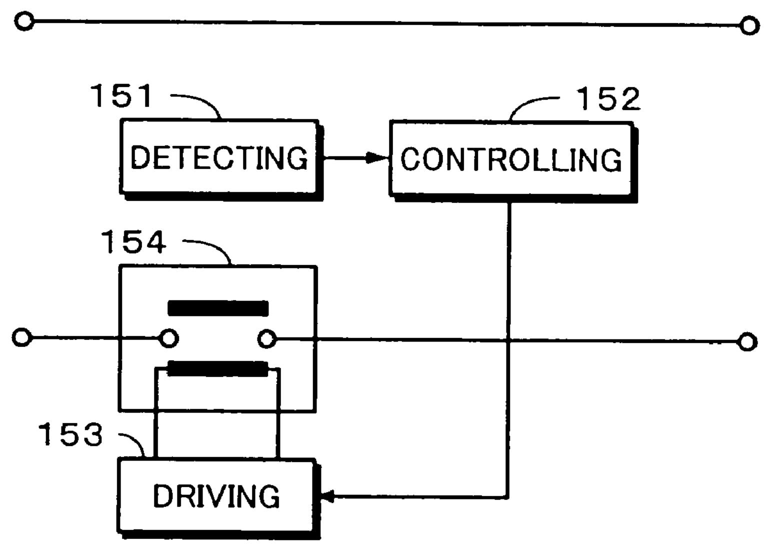
FIG. 1 is a block diagram describing the structure using a conventional solenoid type switch.
Figure 2:
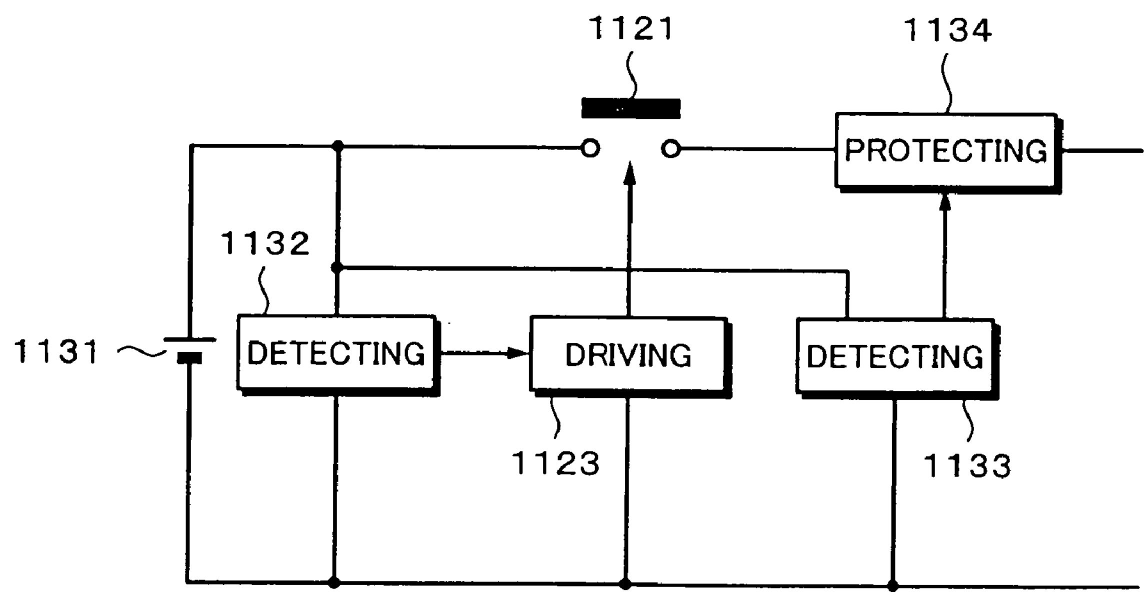
FIG. 2 is a block diagram describing a circuit using a conventional solenoid type switch.
Figure 3:
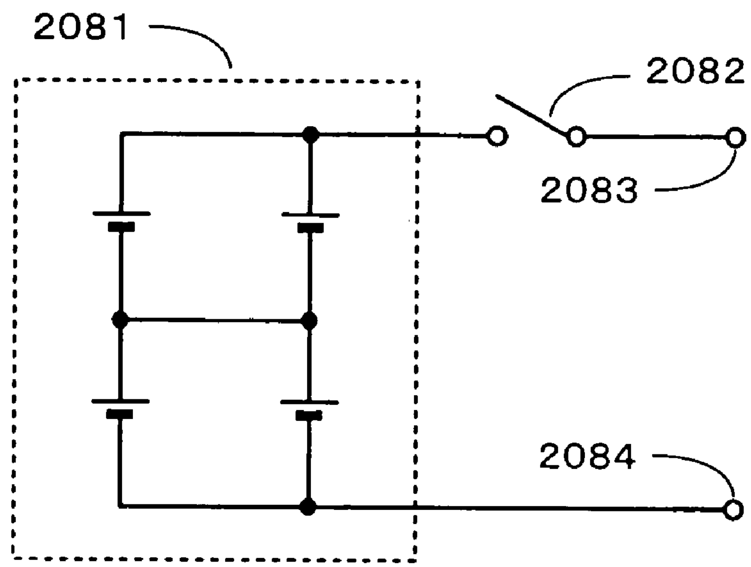
FIG. 3 is a block diagram describing a conventional structure.
Figure 4:
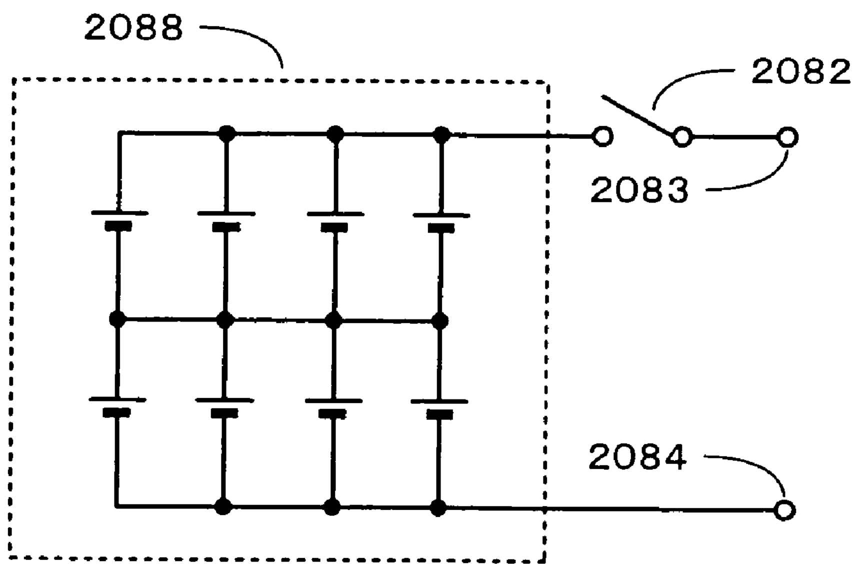
FIG. 4 is a block diagram describing a conventional structure.
Figure 5:
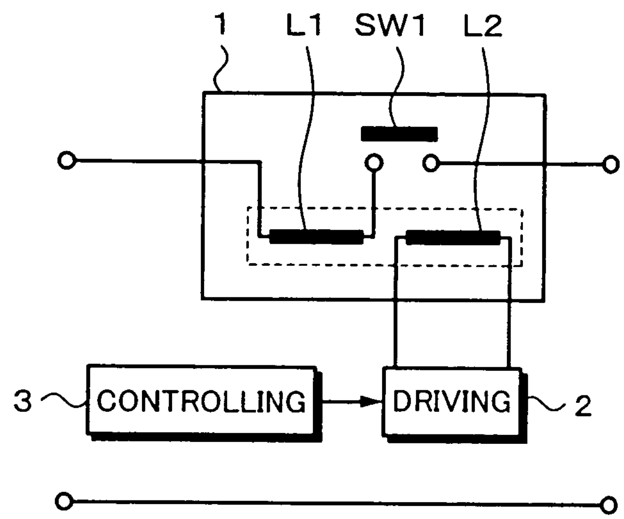
FIG. 5 is a block diagram describing an overall structure according to an embodiment of the present invention.

Next, with reference to FIG. 5, a basic structure of the present invention will be described. A solenoid type switch 1 has at least two driving coils L1 and L2. The driving coil L1 performs an operation for turning off a switch SW1 when a current that flows in the switch SW1 is equal to or higher than a predetermined current value (overcurrent). The driving coil L2 performs an operation for changing the direction of a current that flows in a driving circuit 2 and turning on or off the switch SW1. The driving circuit 2 changes the direction of the current that flows in the driving coil L2 in accordance with a control signal supplied from a controlling circuit 3. Thus, the switch SW1 can be turned off with an overcurrent that flows in the driving coil L1.

Figure 6:
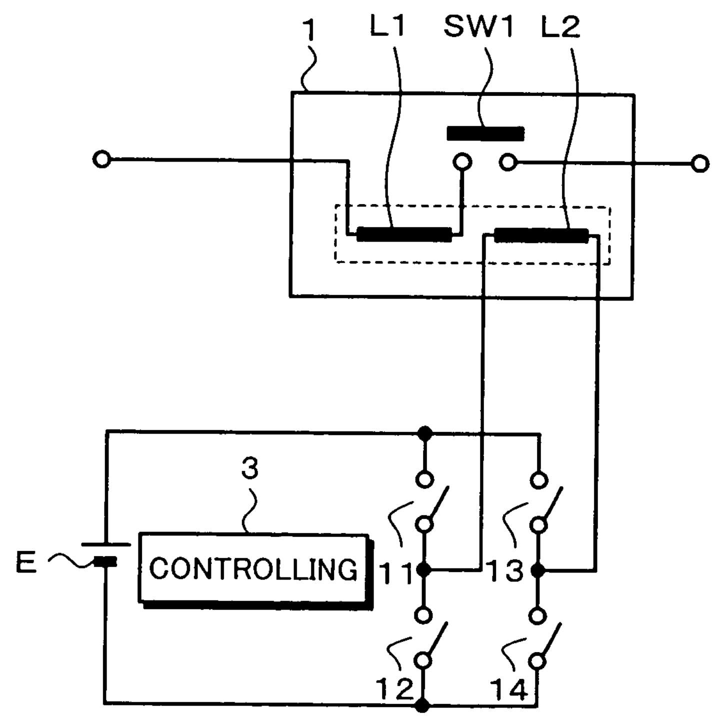
FIG. 6 is a block diagram describing a control according to a first embodiment of the present invention.

Next, with reference to FIG. 6, a first embodiment of which the direction of the current that flows in the driving coil L2 will be described. As shown in FIG. 6, a DC power supply E, switches 11 and 12 that are connected in series, and switches 13 and 14 connected in series are connected in parallel. One terminal of the driving coil L2 is connected to a connection point of the switches 11 and 12. Another terminal of the driving coil L2 is connected to a connection point of the switches 13 and 14. When the switches 11 and 14 are turned on, the switches 12 and 13 are turned off. When the switches 12 and 13 are turned on, the switches 11 and 14 are turned off. When the switches are operated in such a manner, the direction of the current that flows in the driving coil L2 can be changed. These controls are performed by a controlling circuit 2.

Figure 7:
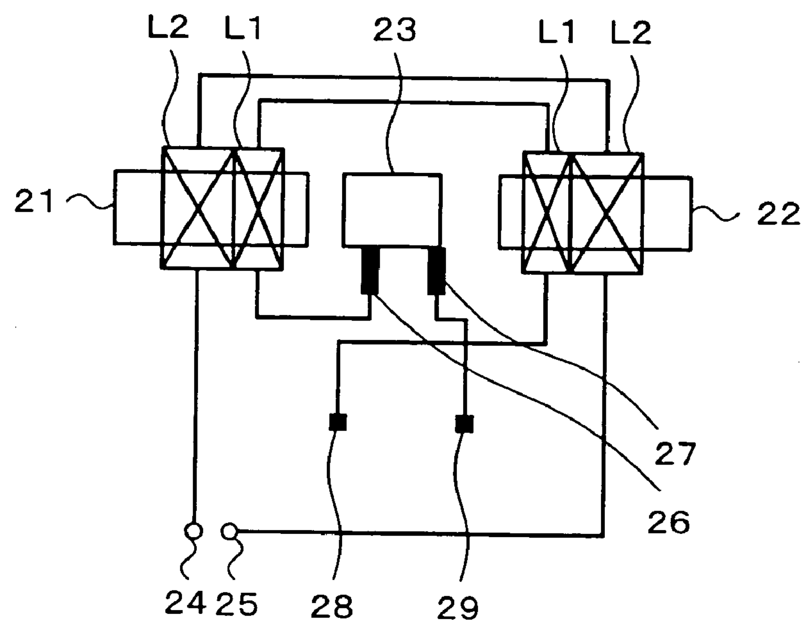
FIG. 7 is a schematic diagram describing an outlined structure of a solenoid type switch according to the present invention.

FIG. 7 shows an outlined structure of the solenoid type switch 1. The driving coils L1 and L2 have iron cores 21 and 22, respectively. A magnetic substance 23 is movably disposed between the iron cores 21 and 22. Terminals 24 and 25 are connected from the driving coil L2. A current is supplied through the terminals 24 and 25. A terminal 26 connected from one end of the driving coil L1 is disposed at a position where the terminal 26 contacts the magnetic substance 23. As a first terminal of the switch SW1, a terminal 28 is connected from another end of the driving coil L1. A terminal 27 connected to another terminal 29 of the switch SW1 is disposed at a position where the terminal 27 contacts the magnetic substance 23.

Figure 8:
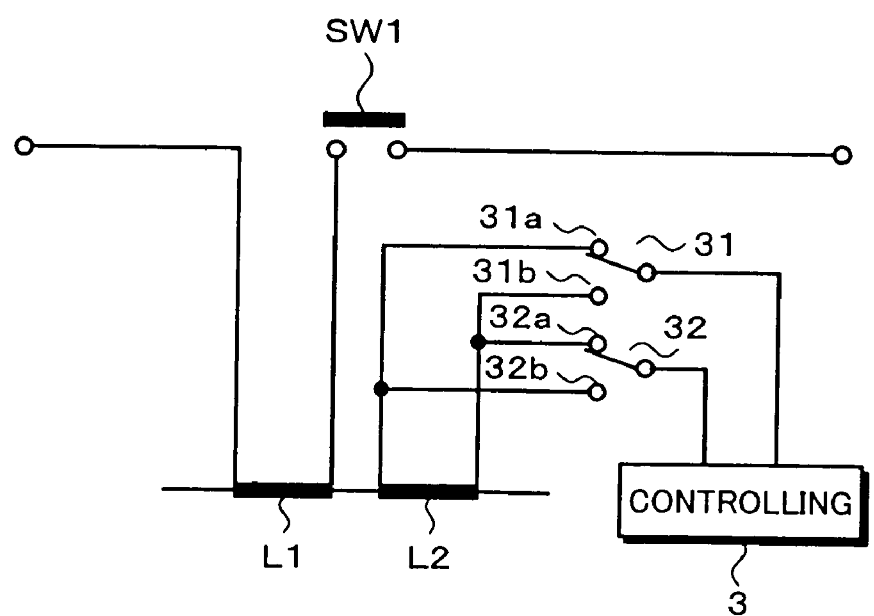
FIG. 8 is a block diagram describing the control according to the first embodiment of the present invention.
Figure 9:
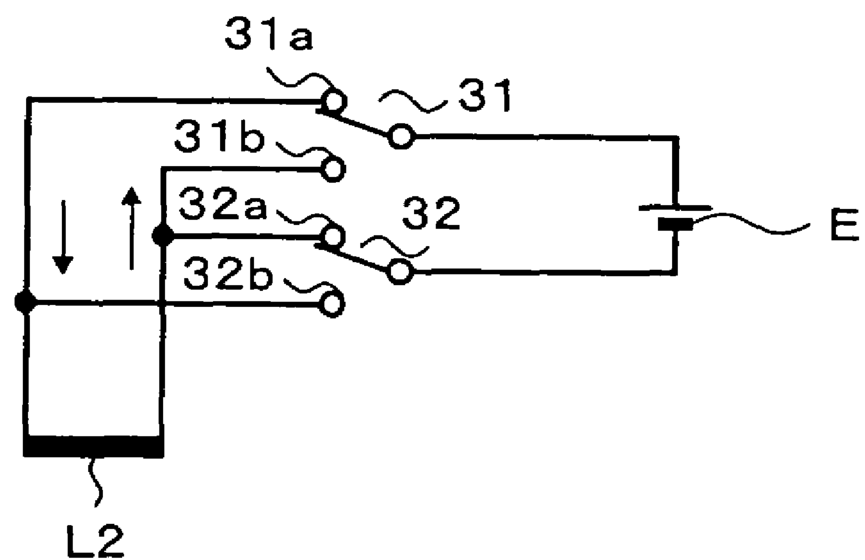
FIG. 9 is a block diagram describing the control of the first embodiment of the present invention.
Figure 10:
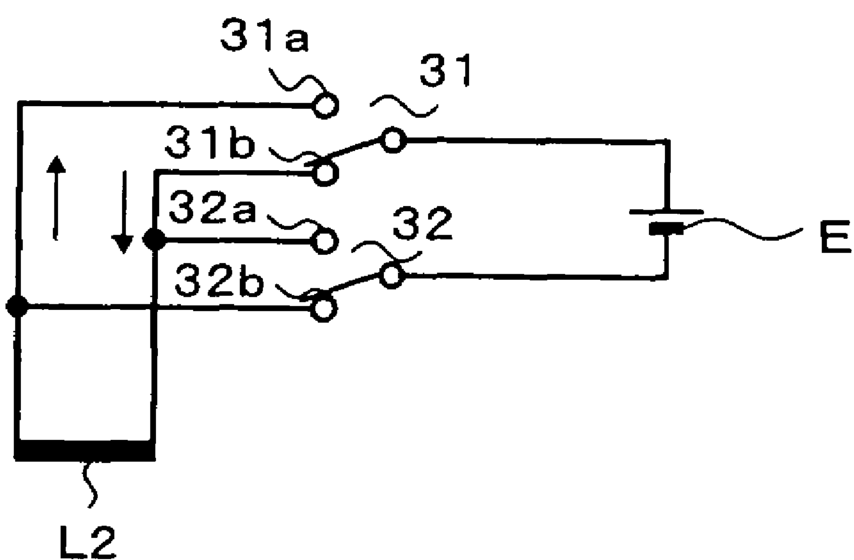
FIG. 10 is a block diagram describing the control according to the first embodiment of the present invention.
Figure 11:
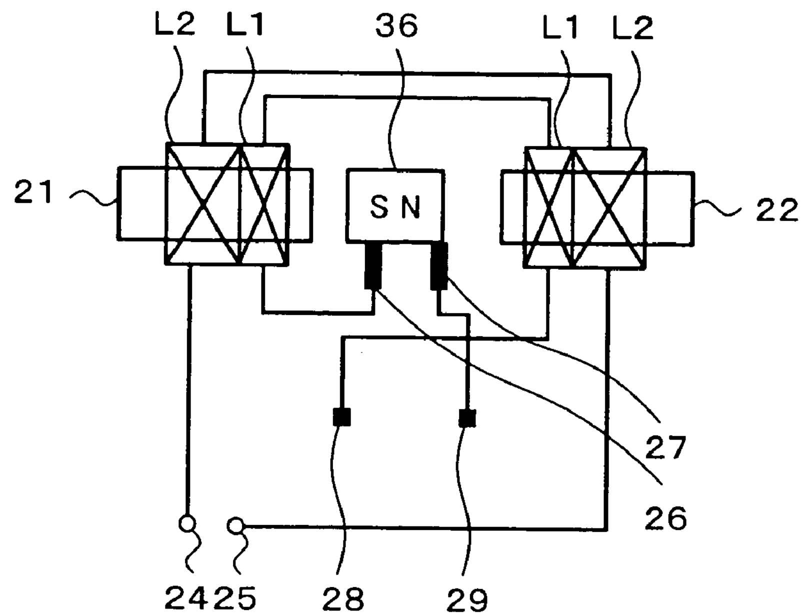
FIG. 11 is a schematic diagram describing an outlined structure of the solenoid type switch according to the present invention.

Next, with reference to FIG. 8, another example of which the direction of the current that flows in the solenoid type switch 1 is changed will be described. A current is supplied from the controlling circuit 2 to the driving coil L2 through switches 31 and 32. As shown in FIG. 8, with the switches 31 and 32, the direction of the current that flows in the driving coil L2 is changed. When a terminal 31*a* is selected from the switch 31 and a terminal 32*b* is selected from the switch 32, the current flows as shown in FIG. 9. When a terminal 31*b* is selected from the switch 31 and a terminal 32*a* is selected from the switch 32, the current flows as shown in FIG. 10.

When the direction of the current is changed, even if a magnet 36 is used as the magnetic substance, the solenoid type switch 1 can be controlled. In other words, unless the direction of the current supplied to the driving coil L2 is not changed, if the magnet 36 is used as the magnetic substance, the solenoid type switch 1 cannot be controlled. Thus, with the foregoing switches, the direction of the current that flows in the driving coil L2 is changed.

Figure 12:
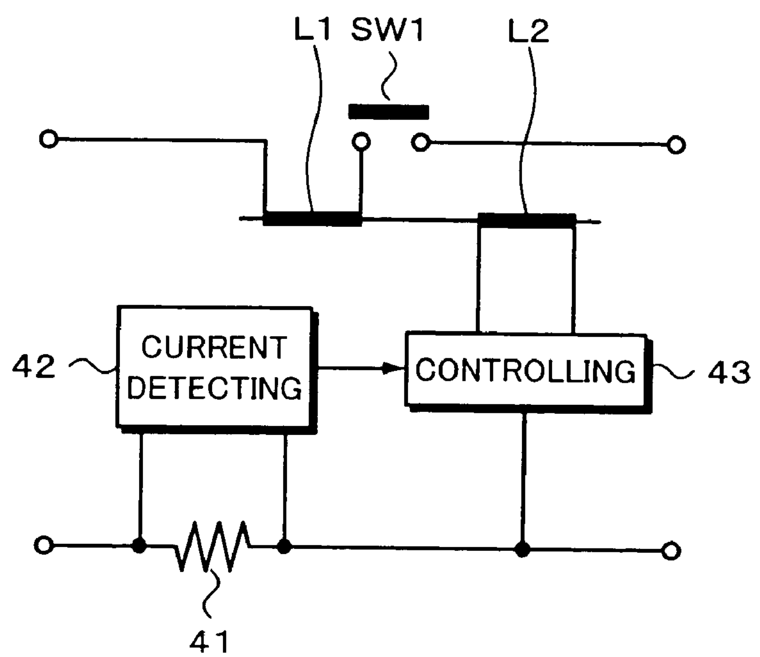
FIG. 12 is a block diagram describing the control according to the first embodiment of the present invention.
Figure 13:
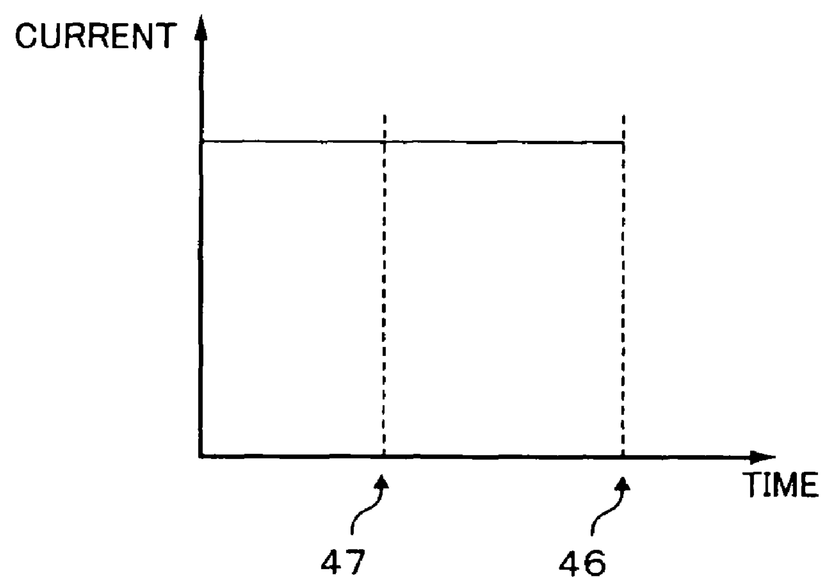
FIG. 13 is a characteristic chart describing the control of the first embodiment of the present invention.

Next, with reference to FIG. 12, an example of which the solenoid type switch is turned off will be described. As described above, when an overcurrent is supplied to the driving coil L1, the switch SW1 is turned off. At that point, after the overcurrent is supplied until the solenoid type switch 1 is turned off, it takes time 46 as shown in FIG. 13.

Thus, in this example, a current detecting circuit 42 detects an overcurrent from both ends of a resistor 41. When the determined result represents that an overcurrent has been detected, a controlling circuit 43 controls the driving coil L2 so as to turn off the switch SW1. When the switch SW1 is turned off with both the driving coils L1 and L2 in such a manner, the time period for which the switch SW1 is turned off can be shortened to time 47 shown in FIG. 13.

Figure 14:
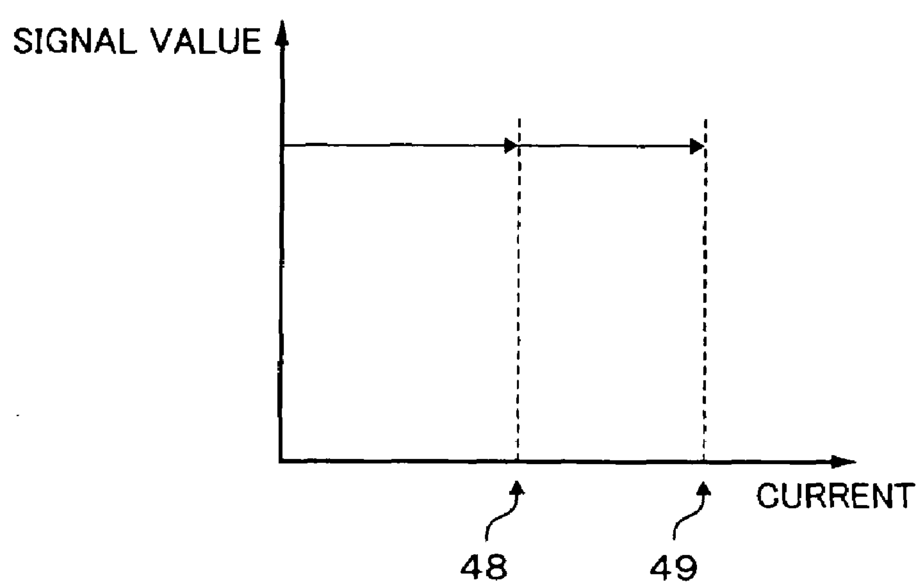
FIG. 14 is a characteristic chart describing the control according to the first embodiment of the present invention.

At that point, a current value for which the switch SW1 is turned off with the driving coil L1 may be detected by a current detecting circuit 42 that detects a current value 48 that is lower than a current value 49 shown in FIG. 14. Thus, the switch SW1 can be turned off in a shorter time period than the foregoing structure.

Figure 15:
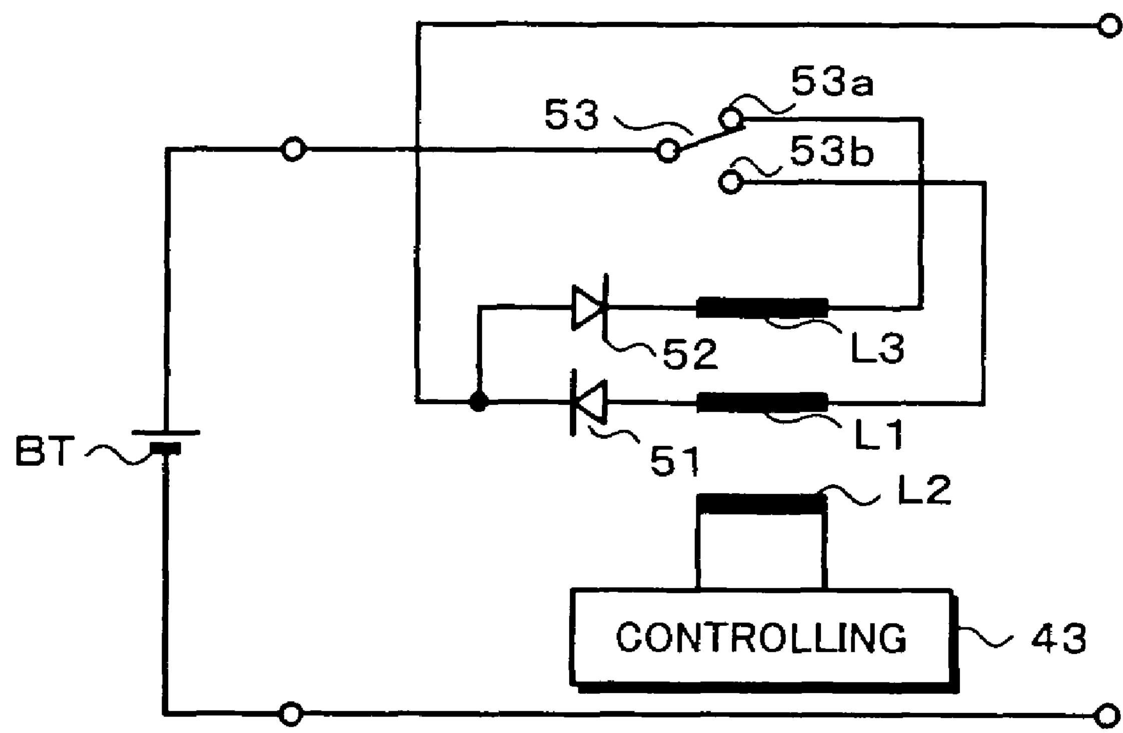
FIG. 15 is a block diagram describing a second embodiment of the present invention.

Next, with reference to FIG. 15, a second embodiment of which a secondary battery cell is charged or discharged according to the present invention will be described. When the second battery cell is charged, a terminal 53*a* is selected from a switch 53. A current supplied from a charging device (not shown) is supplied to a secondary battery cell BT through a diode 52, a driving coil L3, and a switch 53.

When the secondary battery cell BT is discharged, a terminal 53*b* is selected from the switch 53. The current supplied from the secondary battery cell BT is output from a positive terminal of the secondary battery cell BT through the switch 53, the driving coil L1, and a diode 51. Thus, since the switch 53 is controlled in accordance with the direction of the current, an electronic part can be protected against an overcurrent that flows therein when the secondary battery cell BT is charged or discharged.

At that point, the driving coils L1 and L3 are selected so that the current that flows in the driving coil L3 is lower than the current that flows in the driving coil L1.

Alternatively, the direction of the current can be changed by switching devices instead of the diodes 51 and 52. In this case, the diodes 51 and 52 can be omitted.

Figure 16:
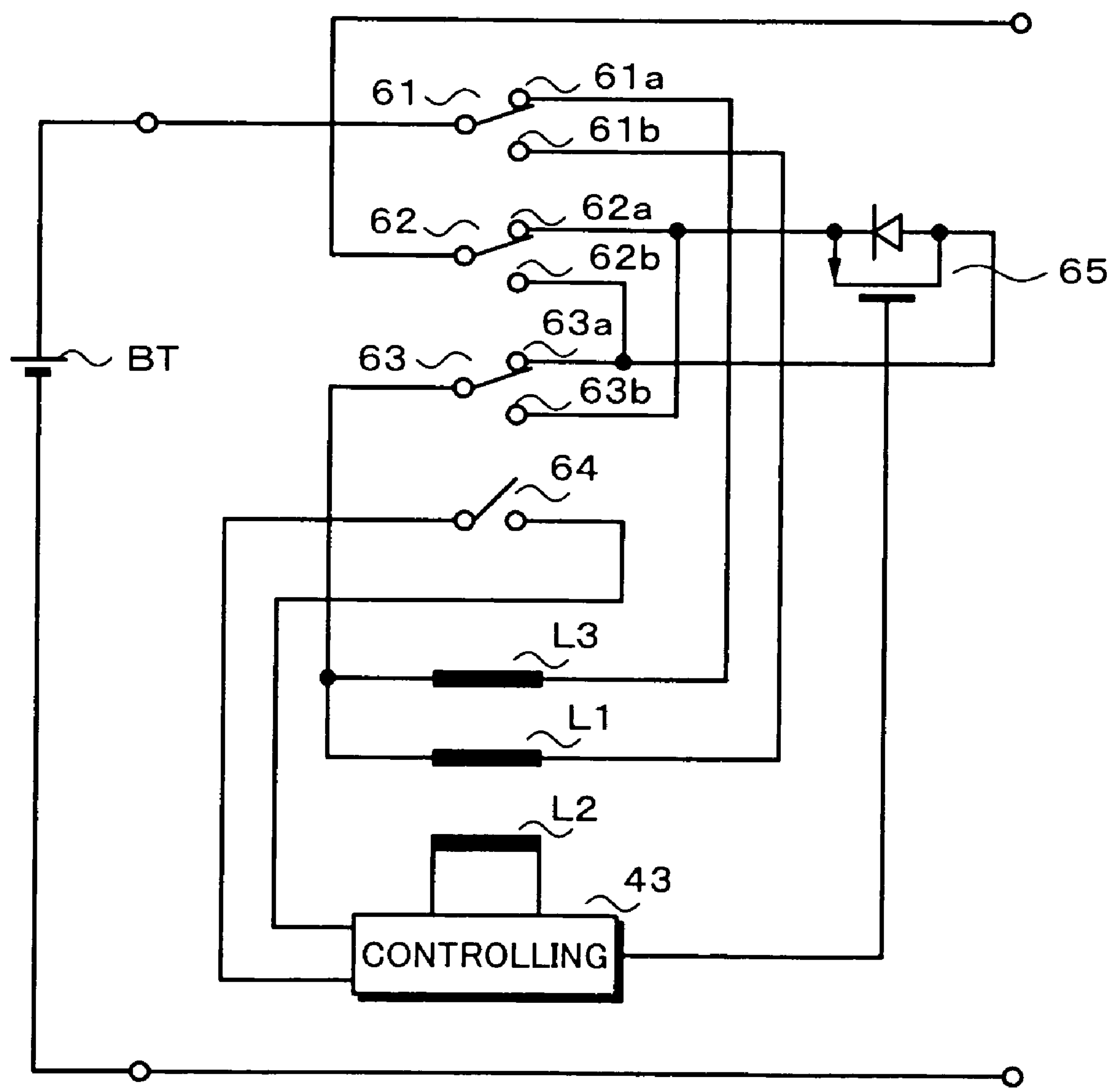
FIG. 16 is a block diagram describing the second embodiment of the present invention.

Next, with reference to FIG. 16, another example of the second embodiment will be described. When a secondary battery cell BT is charged, a terminal 61*a* is selected from a switch 61. A terminal 62*a* is selected from a switch 62. A terminal 63*a* is selected from a switch 63. A current supplied from a charging device (not shown) is supplied to the secondary battery cell BT through the switch 62, an FET (Field Effect Transistor) 65, the switch 63, a driving coil L3, and the switch 61.

When the secondary battery cell BT is charged, a terminal 61*b* is selected from the switch 61. A terminal 62*b* is selected from the switch 62. A terminal 63*b* is selected from the terminal 63. The current supplied from the secondary battery cell BT is output from a positive terminal of the secondary battery cell BT through the switch 61, the driving coil L1, the switch 63, the FET 65, and the switch 62.

The FET 65 has a parasitic diode. The FET 65 is controlled by a controlling circuit 43. The controlling circuit 43 always detects an on state or off state of the switch 64. The controlling circuit 43 controls the FET 65 and/or the driving coil L2 in accordance with the detected result. In the other example, when the secondary battery cell BT is charged and discharged, the FET 65 is turned on. To cause the secondary battery cell BT to be charged or discharged, the two FETs 65 are connected in series so that they face in different directions.

Figure 17:
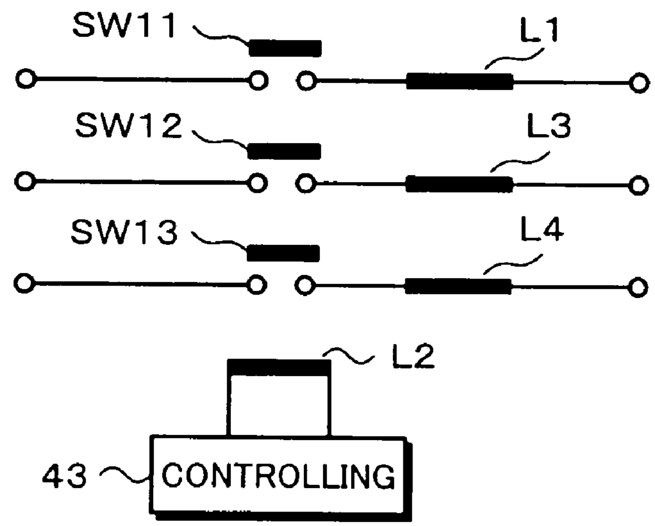
FIG. 17 is a block diagram describing a solenoid type switch according to a third embodiment of the present invention.

Next, with reference to FIG. 17, a third embodiment of which on/off states of a plurality of switches SW11, 12, and 13 are controlled by the driving coil L2 will be described. In this example, when an overcurrent is supplied to the switch SW11, the driving coil L1 turns off the switch SW11. When an overcurrent is supplied to the switch SW12, the driving coil L3 turns off the switch SW12. When an overcurrent is supplied to the switch SW13, the driving coil L4 turns off the switch SW13.

Figure 18:
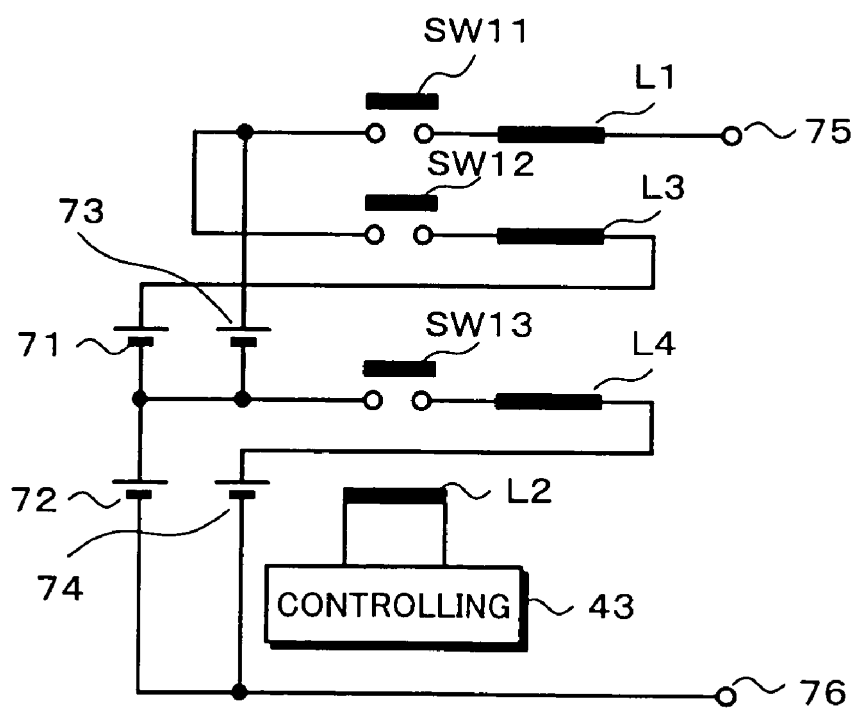
FIG. 18 is a block diagram describing the third embodiment of the present invention.

FIG. 18 shows an example of the third embodiment. In FIG. 18, four battery cells 71, 72, 73, and 74 are connected in parallel and in series so that two battery cells connected in parallel are connected in series with other two battery cells connected in parallel. The driving coil L1 and the switch SW11 that are connected in series are disposed between a terminal 75 and a positive terminal of the battery cell 73. The driving coil L3 and the switch SW12 that are connected in series are disposed between a positive terminal of the battery cell 71 and a positive terminal of the battery cell 73. A negative terminal of the battery cell 71 and a negative terminal of the battery cell 73 are connected. The driving coil L4 and the switch SW13 that are connected in series are disposed between a negative terminal of the battery cell 71 and a positive terminal of the battery cell 74. A positive terminal of the battery cell 72 and a negative terminal of the battery cell 71 are connected. A negative terminal of the battery cell 72 and a negative terminal of the battery cell 74 are connected to a terminal 76. On/off states of the switches SW11, SW12, and SW13 are controlled by the driving coil L2. In such a manner, the present invention can be applied to such a battery pack of which a plurality of battery cells are connected in parallel and in series.

Figure 19:
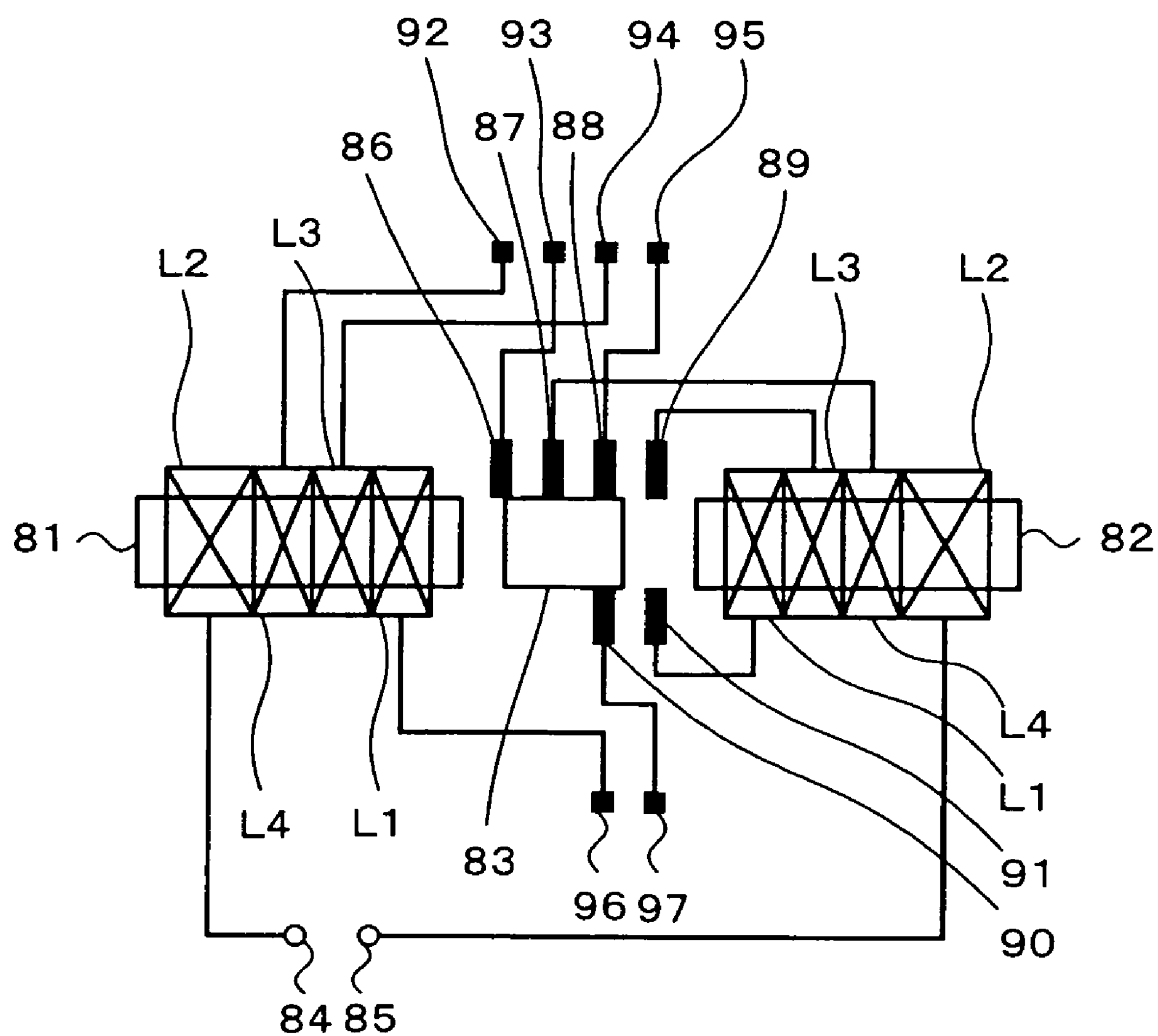
FIG. 19 is a schematic diagram describing an outlined structure of the solenoid type switch according to the third embodiment of the present invention.

FIG. 19 shows an outlined structure of a solenoid type switch that has driving coils L1, L2, L3, and L4. The driving coils L1, L2, L3, and L4 are disposed around iron cores 81 and 82. A magnetic substance 83 is movably disposed between the iron cores 81 and 82. Terminals 84 and 85 are connected from the driving coil L2. A current is supplied through the terminals 84 and 85.

The terminals 86, 87, 88, 89, 90, and 91 are disposed at positions where they contact the magnetic substance 83. The terminal 86 is connected to a terminal 93. The terminal 87 is connected to one end of the driving coil L4. The terminal 88 is connected to a terminal 95. The terminal 89 is connected to one end of the driving coil L3. The terminal 90 is connected to a terminal 97. The terminal 91 is connected to one end of the driving coil L1. The terminal 92 is connected to another end of the driving coil L4. The terminal 94 is connected to another end of the driving coil L3. The terminal 96 is connected to another end of the driving coil L1.

In the example shown in FIG. 19, the terminals 96 and 97 are terminals of the switch SW11. The terminals 94 and 95 are terminals of the switch SW12. The terminals 92 and 93 are terminals of the switch SW13.

A current value with which the switches SW11, 12, and 13 are turned on by the driving coil L1 is designated so that an overcurrent does not cause a contact of a switch to melt-adhere.

Next, with reference to FIG. 20, an example of the driving circuit 2 will be described. A differential amplifying circuit is composed of NPN type transistors 101, 102, 103, and 104. One end of a driving coil L2 is connected to an emitter of the transistor 101. Another end of the driving coil L2 is connected to an emitter of the transistor 103.

A base of the transistor 101 is connected to a terminal SW22*a* of a switch SW22. A base of the transistor 102 is connected to a terminal SW22*b* of the switch SW22 through a resistor 108. A base of the transistor 103 is connected to the terminal SW22*b* of the switch 22 through a resistor 105. A base of the transistor 104 is connected to the terminal SW22*a* of the switch 22 through a resistor 107.

A collector of the transistor 101 and a collector of the transistor 103 are connected to an emitter of a PNP type transistor 110. A collector of the transistor 110 is connected to the switch SW22 through a resistor 111. A base of the transistor 110 is connected to a signal circuit 112. A positive terminal of a DC power supply E is connected to the collector of the transistor 101 and the collector of the transistor 103. A negative terminal of the DC power supply E is connected to an emitter of the transistor 102 and an emitter of the transistor 104.

Figure 20:
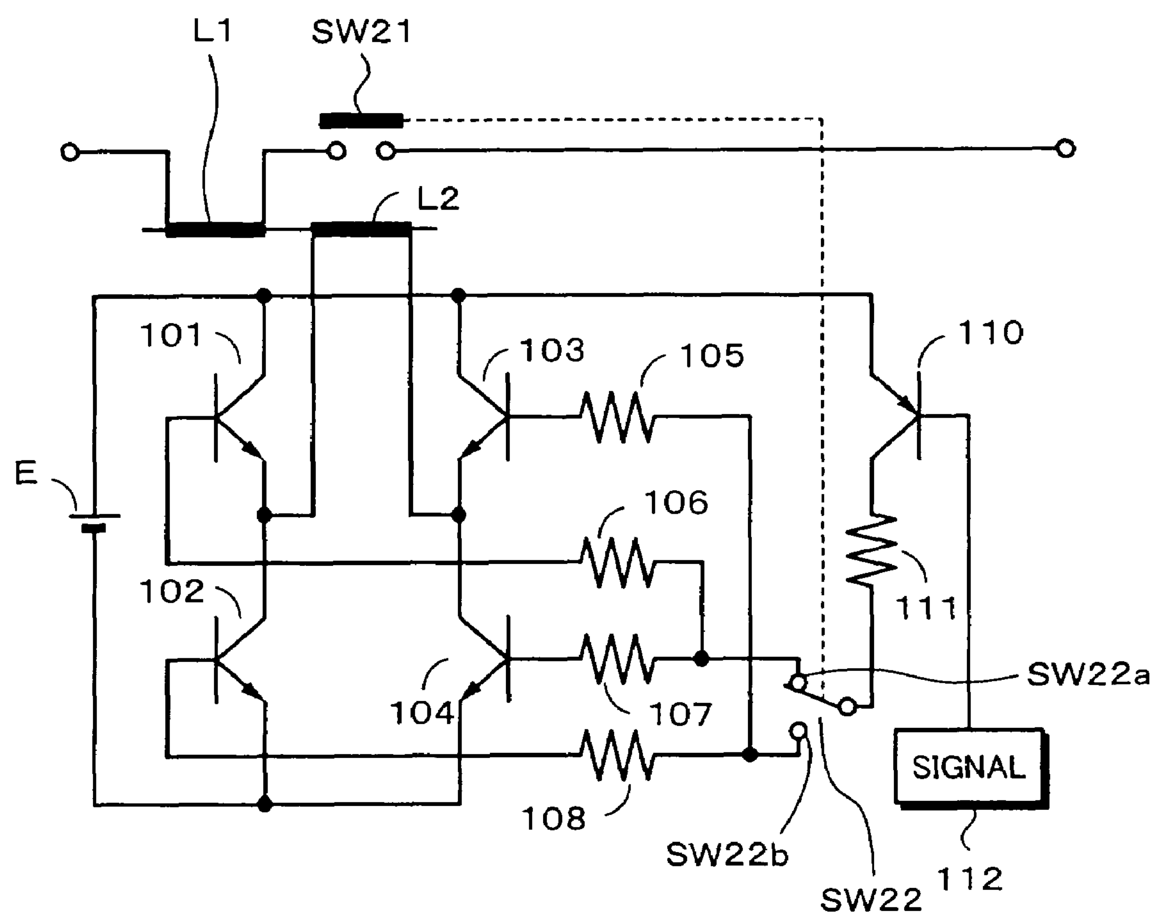
FIG. 20 is a block diagram describing a control according to the present invention.

The switches SW21 and SW22 are interlocked switching circuits as denoted by a dotted line shown in FIG. 20.

Figure 21:
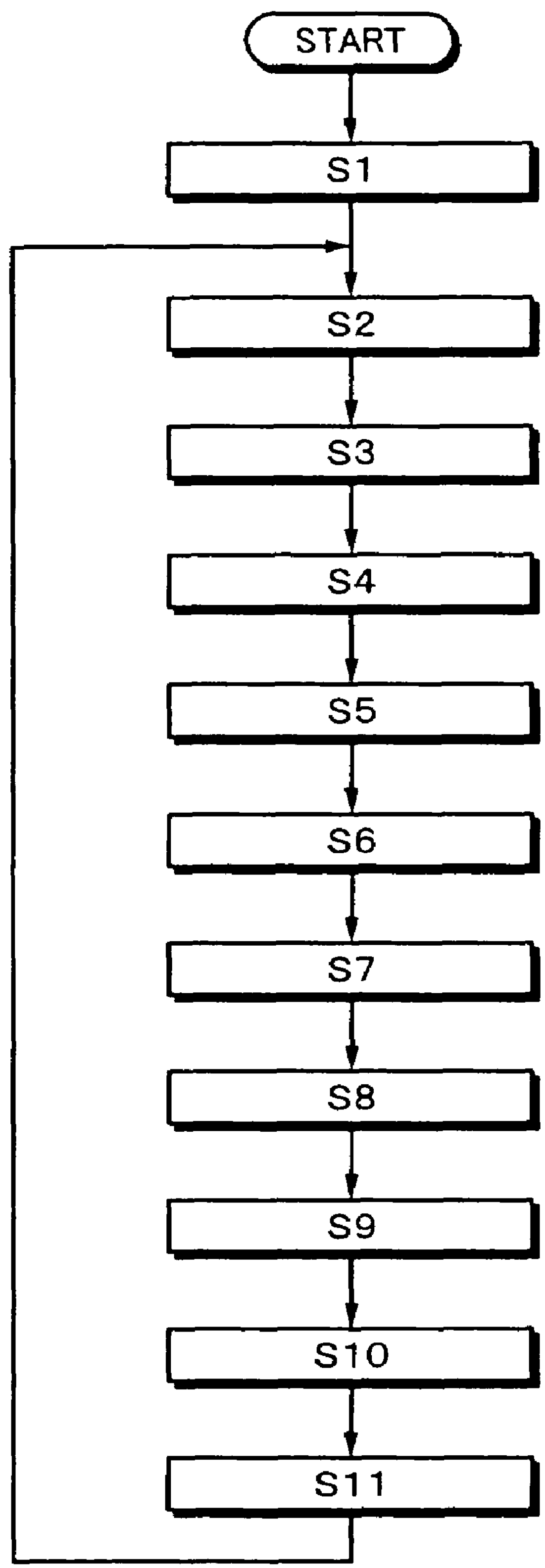
FIG. 21 is a flow chart describing the control according to the present invention.

With reference to a flow chart shown in FIG. 21, an operation of the driving circuit 2 shown in FIG. 20 will be described. At step S1, it is determined that the switch SW21 has been turned off and that the terminal SW22*a* has been selected from the switch SW22. At step S2, a signal that causes the switch SW21 to be turned on is supplied from the signal circuit 112 to the base of the transistor 110. At step S3, the transistor 110 is turned on for ΔT time in accordance with the signal supplied from the signal circuit 112.

At step S4, the transistor 110 is turned on. Since the terminal SW22*a* has been selected from the switch SW22, the transistors 101 and 104 are turned on. At step S5, since a current that is output from the DC power supply E flows through the transistor 101, the driving coil L2, and the transistor 104, the switch SW21 is turned on.

At step S6, the switch SW21 that has been turned off is turned on. Since the switch SW22 is interlocked with the SW21, the terminal SW22*a* that has been selected from the switch SW22 is switched to the terminal SW22*b*. At step S7, the signal that causes the switch SW21 to be turned off is supplied from the signal circuit 112 to the base of the transistor 110. At step S8, the transistor 110 is turned on for time ΔT in accordance with the signal supplied from the signal circuit 112.

At step S9, the transistor 110 is turned on. The terminal SW22*b* has been selected from the switch SW22. Thus, the transistors 102 and 103 are turned on. At step S10, since the current that is output from the DC power supply E flows through the transistor 103, the driving coil L2, and the transistor 102. Thus, the switch SW21 is turned off. At step S11, the switch SW21 is turned off. Since the switch SW22 is interlocked with the switch SW21, the terminal SW22*b* that has been selected from the switch SW22 is switched to the terminal SW22*a*. Thereafter, the control advances to step S2.

Figure 22:
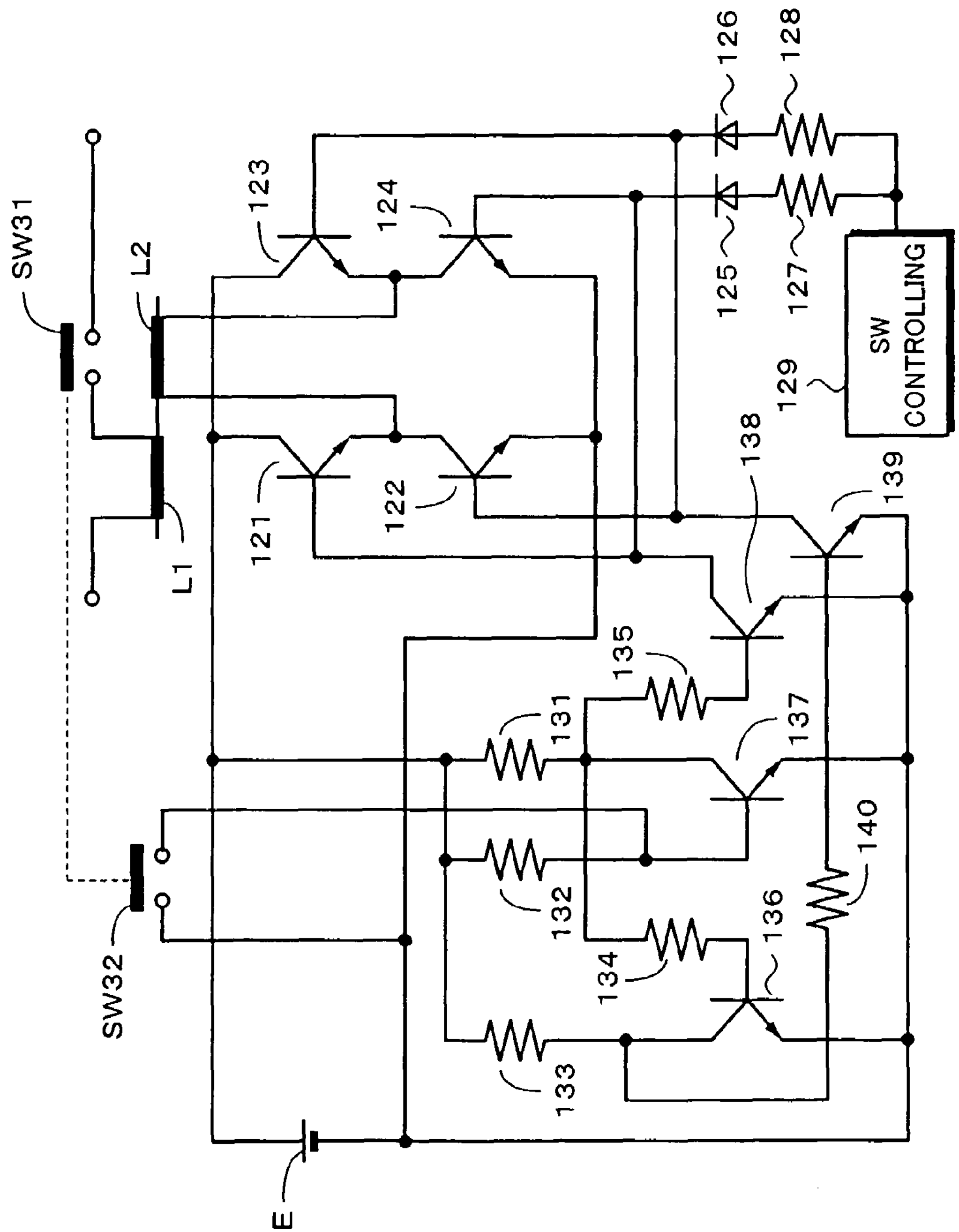
FIG. 22 is a block diagram describing the control according to the present invention.

Next, with reference to FIG. 22, a detecting circuit that detects on/off states of the solenoid type switch will be described. A differential amplifying circuit is composed of transistors 121, 122, 123, and 124. One end of a driving coil L2 is connected to an emitter of the transistor 121. Another end of the driving coil L2 is connected to an emitter of the transistor 123.

A collector of the transistor 121 and a collector of the transistor 123 are connected to a positive terminal of an DC power supply E. A base of the transistor 121 and a base of the transistor 124 are connected to a cathode of a diode 125.

A collector of the transistor 122 is connected to an emitter of the transistor 121. An emitter of the transistor 122 and an emitter of the transistor 124 are connected to a negative terminal of the DC power supply E. A base of the transistor 122 and a base of the transistor 123 are connected to a cathode of a diode 126.

A collector of the transistor 124 is connected to the emitter of the transistor 123. An anode of the diode 125 is connected to a switch controlling circuit 129 through a resistor 127. An anode of the diode 126 is connected to the switch controlling circuit 129 through a resistor 128.

The positive terminal of the DC power supply E is connected to a collector of a transistor 137 through a resistor 131, a base of the transistor 137 through a resistor 132, and a collector of a transistor 136 through a resistor 133. The negative terminal of the DC power supply E is connected to an emitter of the transistor 136, an emitter of the transistor 137, an emitter of a transistor 138, and an emitter of a transistor 139.

A collector of the transistor 137 is connected to a base of the transistor 136 through a resistor 134 and a base of the transistor 138 through a resistor 135. A collector of the transistor 138 is connected to the base of the transistor 121 and the base of the transistor 124. A base of a transistor 139 is connected to the collector of the transistor 136 through a resistor 140. A collector of the transistor 139 is connected to the base of the transistor 122 and the base of the transistor 123.

One terminal of a switch SW32 is connected to the negative terminal of the DC power supply E. Another terminal of the switch SW32 is connected to the base of the transistor 137. The switch SW32 is interlocked with a switch SW31. Thus, when the switch SW31 is turned on, the switch SW32 is also turned on. Likewise, when the switch SW31 is turned off, the switch SW32 is also turned off.

Next, an example of the detecting operation will be described. When the switch SW32 is turned off, the transistor 137 is turned on. Thus, the transistor 138 is turned off. At that point, since the transistor 136 is turned off, the transistor 139 is turned on. As a result, the transistors 121 and 124 are turned on in accordance with a relay operation signal.

When the switch SW32 is turned on, the transistor 137 is turned off. Thus, the transistor 138 is turned on. At that point, since the transistor 136 is turned on, the transistor 139 is turned off. As a result, the transistors 122 and the 123 are turned on in accordance with the relay operation signal.

The structure of the switches SW21 and SW22 that are interlocked is the same as the structure of the switches SW31 and SW32 that are interlocked except that the former switches are selection type switches and the latter switches are on/off switches. Thus, they can be structured in the same manner. Consequently, instead of the switch SW22, the switch SW32 can be used. Likewise, instead of the switch SW32, the switch SW22 can be used.

Figure 23:
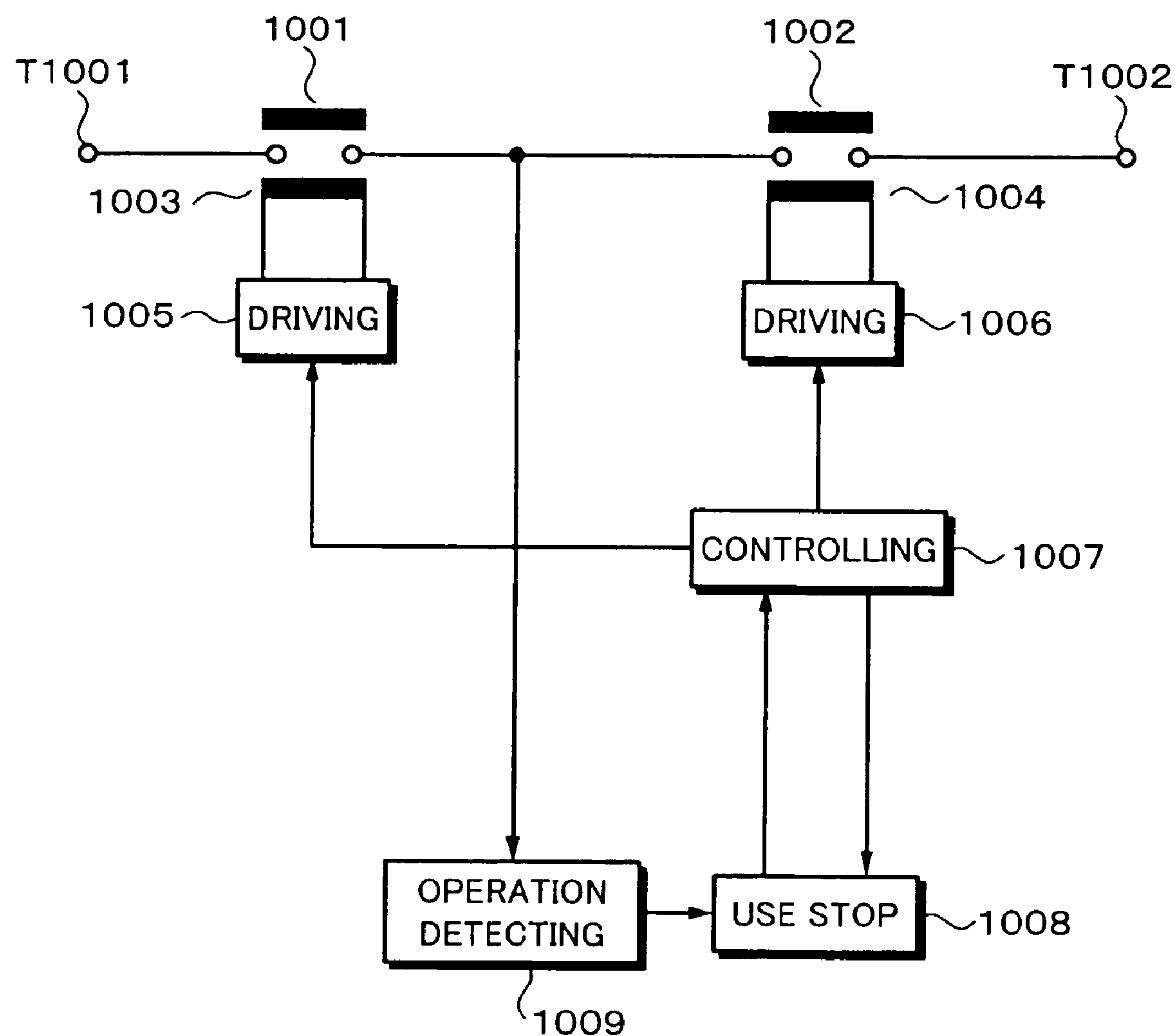
FIG. 23 is a block diagram describing a fourth embodiment of the present invention.

FIG. 23 is a block diagram showing a fourth embodiment according to the present invention. Switches 1001 and 1002 connected in series are disposed between terminals T1001 and T1002 in a part of a path of an overcurrent.

On/off states of the switch 1001 are controlled with a drive current that flows in a driving coil 1003. A drive current is supplied to the driving coil 1003 connected from a driving circuit 1005 with a control signal supplied from a controlling circuit 1007.

Likewise, on/off states of the switch 1002 are controlled with a drive current that flows in a driving coil 1004. A drive current is supplied to the driving coil 1004 connected from a driving circuit 1006 with a control signal supplied from the controlling circuit 1007. Relays, relay switches, solenoid type switches, or the like are used as examples of the switches 1001 and 1002.

An operation detecting circuit 1009 (operation state detecting means) that is connected to a connection point of the switches 1001 and 1002 detects operation states of the switches 1001 and 1002, namely, on/off states thereof. The operation states are supplied to a use stop circuit 1008. The operation detecting circuit 1009 determines whether or not the switches 1001 and 1002 are normally operating with potentials that vary when the switches 1001 and 1002 are turned on/off.

The use stop circuit 1008 (state determining means) receives the operation states of the switches 1001 and 1002 from the operation detecting circuit 1009 and control states of the switches 1001 and 1002 from the controlling circuit 1007. The use stop circuit 1008 determines whether or not the switches 1001 and 1002 are normally operating with the operation states and control states that have been supplied. The determined result is supplied from the use stop circuit 1008 to the controlling circuit 1007.

The controlling circuit 1007 supplies a control signal that causes the switches 1001 and 1002 to be turned on or off to the driving circuits 1005 and 1006 in accordance with the determined result supplied from the use stop circuit 1008.

When the supplied operation states and control states do not match, the use stop circuit 1008 determines that at least one of the switches 1001 and 1002 breaks. The determined result is supplied to the controlling circuit 1007. The switches 1001 and 1002 are turned off in accordance with the control signal supplied from the controlling circuit 1007.

According to the fourth embodiment, safety is maintained with a switching circuit. When the switching circuit is used for a safety circuit of a battery pack, safety can be highly maintained.

Figure 24:
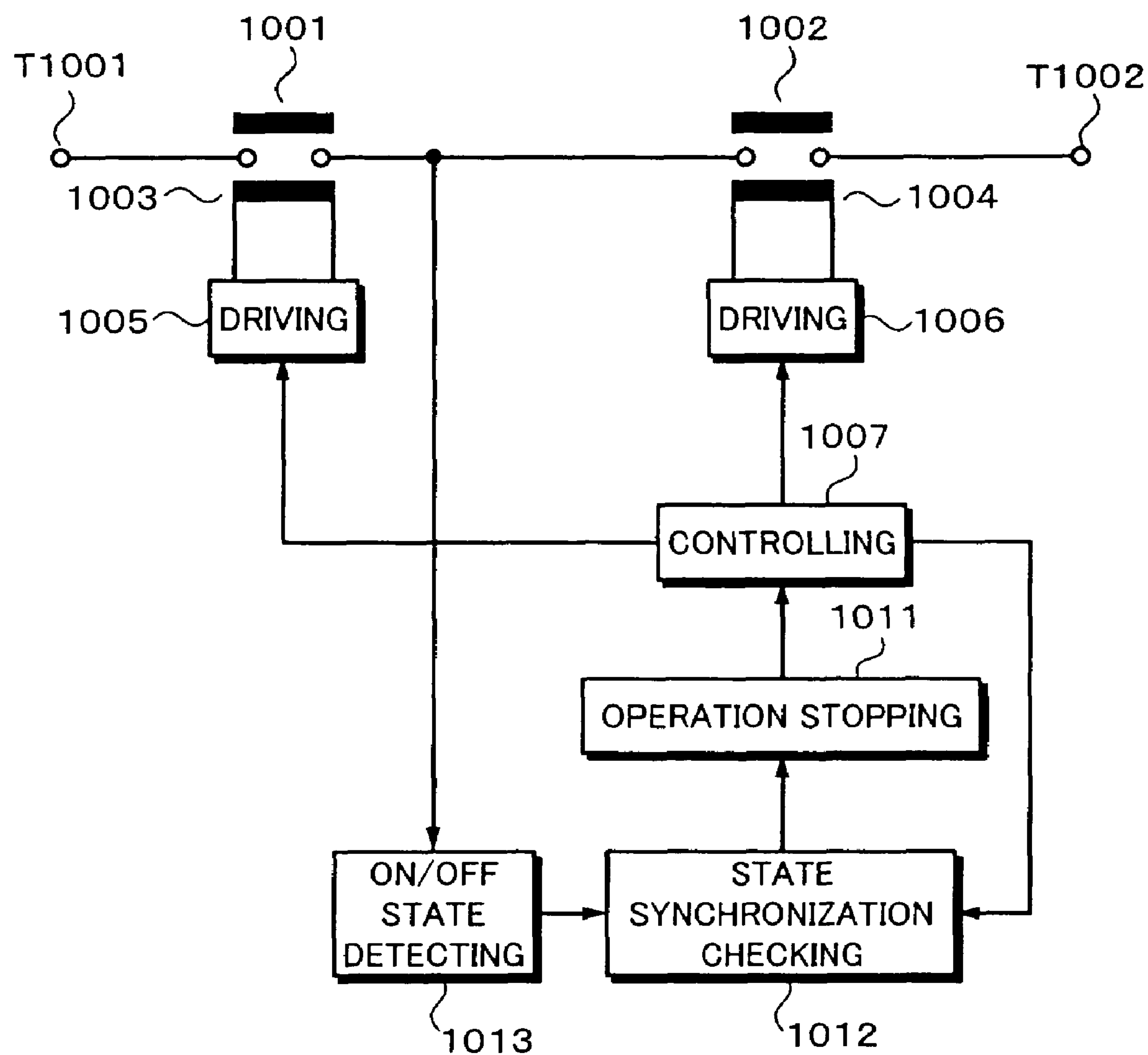
FIG. 24 is a block diagram describing another example of the fourth embodiment of the present invention.

FIG. 24 is a block diagram showing another example of the fourth embodiment of the present invention. An on/off state detecting circuit 1013 (operation state detecting means) connected to a connection point of switches 1001 and 1002 detects on/off operation states of the switches 1001 and 1002. The detected operation states are supplied from the on/off state detecting circuit 1013 to a state synchronization checking circuit 1012.

The state synchronization checking circuit 1012 (state determining means) receives the operation states of the switches 1001 and 1002 from the on/off state detecting circuit 1013 and receives control states of the switches 1001 and 1002 from the controlling circuit 1007. The state synchronization checking circuit 1012 determines whether the supplied operation states and control states are synchronized, namely, the switches 1001 and 1002 are normally operating. The determined result is supplied to an operation stopping circuit 1011.

When the supplied determined result represents that the operation states and control states are not synchronized, the operation stopping circuit 1011 stops the operations of the switches 1001 and 1002. In other words, the operation stopping circuit 1011 supplies a signal that causes the switches 1001 and 1002 to be turned off to the controlling circuit 1007.

The controlling circuit 1007 supplies a control signal that uses the switches 1001 and 1002 to be turned off to the driving circuits 1005 and 1006 in accordance with the signal supplied from the operation stopping circuit 1011.

When the supplied operation states and control states are not synchronized, the state synchronization checking circuit 1012 determines that at least one of the switches 1001 and 1002 breaks and melt-adheres and turns off the switches 1001 and 1002.

Next, with reference to FIG. 25, a first example of a structure using the foregoing operation detecting circuit 1009 and on/off state detecting circuit 1013 will be described. A terminal connected from a voltage detecting circuit 1021 is connected to both ends of a switch 1001. A terminal connected from a voltage detecting circuit 1022 is connected to both terminals of a switch 1002. One terminal of a capacitor 1024 is connected to a positive terminal of a secondary battery cell 1023 through the switch 1001. Another terminal of the capacitor 1024 is connected to a negative terminal of the secondary battery cell 1023 and a terminal T1004.

Figure 25:
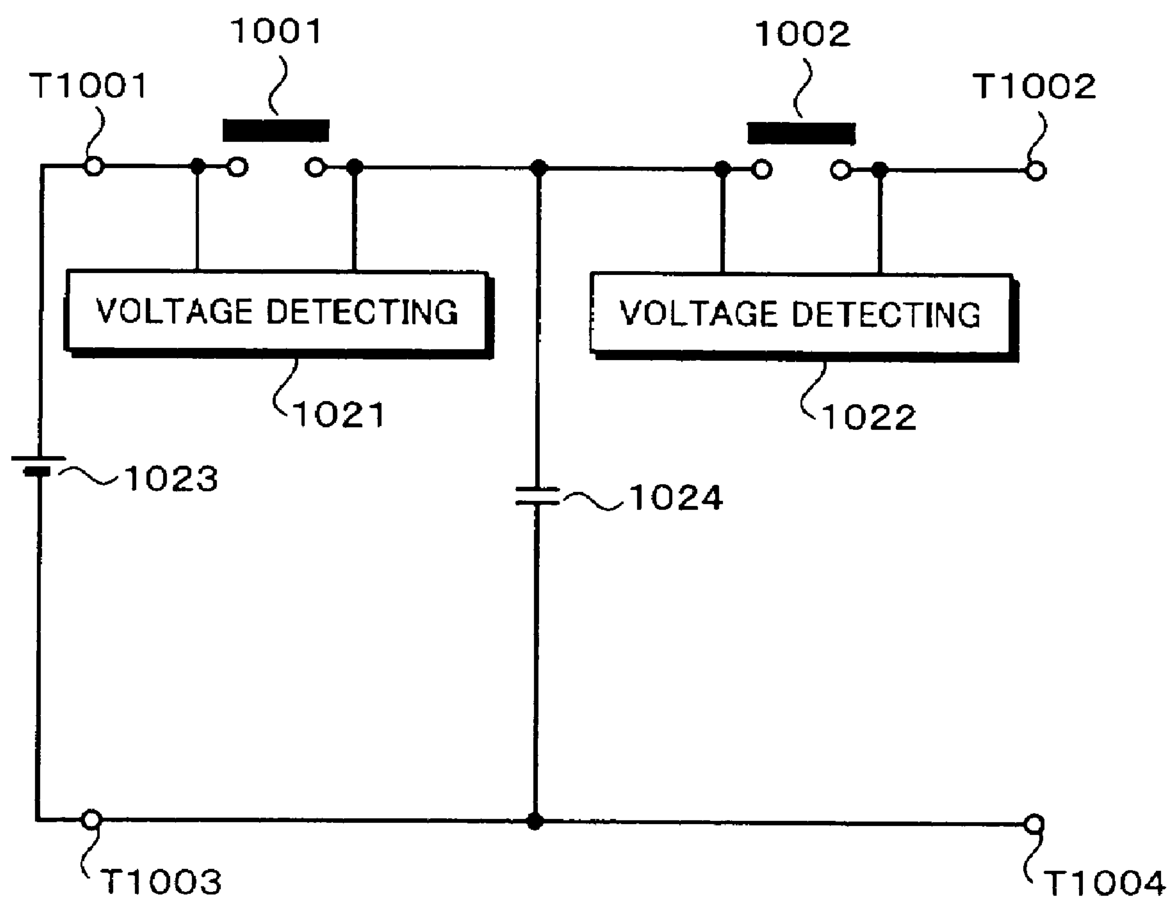
FIG. 25 is a block diagram describing a first example of a structure of an operation detecting circuit and an on/off state detecting circuit according to the present invention.

In FIG. 25, a terminal T1001 is disposed between the switch 1001 and the positive terminal of the secondary battery cell 1023. A terminal T1003 is disposed between the negative terminal of the secondary battery cell 1023 and another terminal of the capacitor 1024. In addition, a terminal T1002 is connected through a switch 1002.

In the foregoing structure, when the switches 1001 and 1002 are turned on, the potential between the terminals of the switches 1001 and 1002 is zero. When the switch 1001 is turned off, electric charges stored in the capacitor 1024 are slightly discharged. As a result, a potential takes place between the terminals of the switch 1001. When the switch 1002 is turned off, electric charges stored in the capacitor 1024 cause a potential to take place between the terminals of the switch 1002. The capacitor 1024 is used to detect operation states of the switches 1001 and 1002.

Thus, the operation states of the switches 1001 and 1002 can be determined in accordance with the detected results of the voltage detecting circuits 1021 and 1022.

The capacitance of the capacitor 1024 should be selected so that the secondary battery cell 1023 is not overcharged. The same operation can be accomplished by a secondary battery cell instead of the capacitor 1024.

Next, with reference to a flow chart shown in FIG. 26, an operation of the fourth embodiment will be described. At step S1001, a drive current is supplied to the driving coils 1003 and 1004 connected from the driving circuits 1005 and 1006, respectively. Alternatively, a drive current supplied to the driving coils 1003 and 1004 is stopped. As a result, the switches 1001 and 1002 are turned on.

At step S1003, electric charges are stored in the capacitor 1024. At step S1003, the voltage detecting circuits 1021 and 1022 detect potentials in on states of the switches 1001 and 1002.

At step S1004, it is determined whether or not the detected potentials are zero. When the determined result represents that the detected potentials are zero, the control advances to step S1005. When the determined result represents that the detected potentials are not zero, the control advances to step S1012. At step S1012, a defect signal that represents that at least one of the switches 1001 and 1002 breaks is sent.

At step S1005, a drive current is supplied to the driving coils 1003 and 1004 connected from the driving circuits 1005 and 1006, respectively. Alternatively, a drive current supplied to the driving coils 1003 and 1004 is stopped. As a result, the switches 1001 and 1002 are turned off.

At step S1006, the voltage detecting circuits 1021 and 1022 detect a potential between the terminals of the switch 1001 and a potential between the terminals of the switch 1002. At that point, when the voltage detecting circuit 1021 detects a potential between the terminals of the switch 1001, electric charges stored in the capacitor 1024 are slightly discharged.

At step S1007, it is determined whether or not the potential between the terminals of the switch 1001 is zero. When the determined result represents that the potential is zero, the control advances to step S1009. When the determined result represents that the potential is not zero, the control returns to step S1006.

At step S1008, it is determined whether or not the potential between the terminals of the switch 1002 is zero. When the determined result represents that the potential is zero, the control advances to step S1009. When the determined result represents that the potential is not zero, the control returns to step S1006.

At step S1009, operation states of the switches 1001 and 1002 are determined with the detected potentials. The operation states of the switches 1001 and 1002 are compared with the control states received from the controlling circuit 1007.

At step S1010, it is determined whether or not the operation states of the switches 1001 and 1002 match the control states received from the controlling circuit 1007. When the determined result represents that the operation states match the control states, the control returns to step S1009. When the determined result represents that the operation states match the control states, the control advances to step S1011.

At step S1011, the switches 1001 and 1002 are turned off.

Next, with reference to FIG. 27, a first example of a fifth embodiment will be described. A voltage detecting circuit 1031 (operation state detecting means) is connected to terminals T1001, T1002, T1003, and T1004. A collector of an NPN type transistor 1032 is connected to a connection point of switches 1001 and 1002. A base of the transistor 1032 is connected to a cathode of a constant voltage diode 1034. An emitter of the transistor 1032 is connected to the terminals T1003 and T1004 through a capacitor 1033. An anode of the 1034 of the constant voltage diode 1034 is connected to the terminals T1003 and T1004. A voltage detecting circuit 1035 is connected to both ends of the capacitor 1033.

On/off states of the transistor 1032 are controlled by the low voltage diode 1034. Electric charges ($V_{1033}$) stored in the capacitor 1033 that detects operation states of the switches 1001 and 1002 are designated so that $V_{1033}$ is lower than a terminal voltage $V_{1023}$ of the secondary battery cell 1023. In other words, the electric charges ($V_{1033}$) are designated so that the following relation is satisfied.

$$V_{1033} < V_{1023}$$

Thus, the operation states of the switches 1001 and 1002 can be easily detected with the terminal voltage $V_{1023}$ of the secondary battery cell 1023 connected to the terminals T1001 and T1003 and detected by the voltage detecting circuit 1031 and the potential $V_{1033}$ between the terminals of the capacitor 1033 detected by the voltage detecting circuit 1035.

Figure 27:
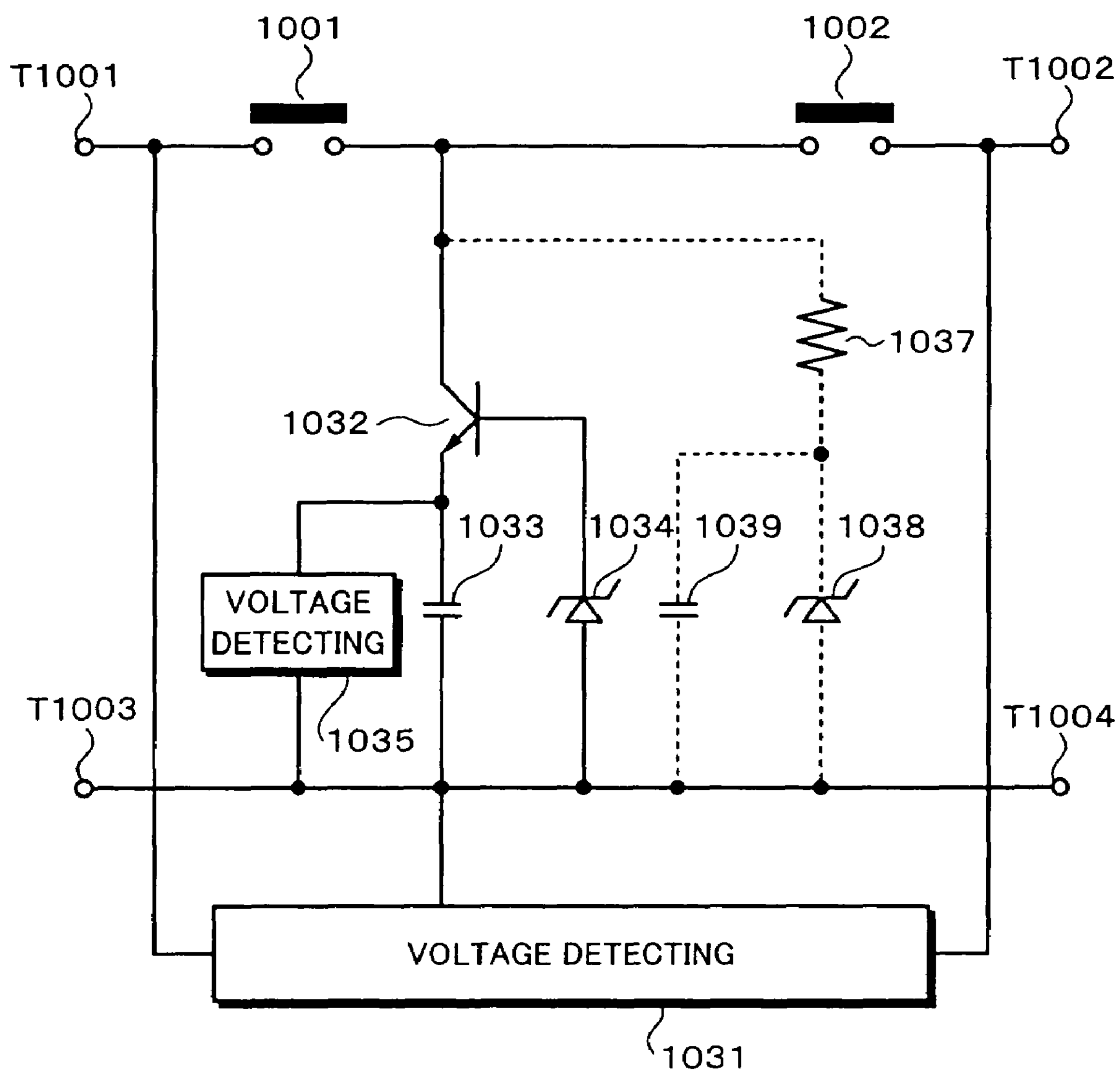
FIG. 27 is a block diagram describing a first example of a fifth embodiment of the present invention.

In addition, as represented by a dotted line shown in FIG. 27, a cathode of a constant voltage diode 1038 is connected to the connection point of the switches 1001 and 1002 through a resistor 1037. An anode of the constant voltage diode 1038 is connected to the terminals T1003 and T1004. Both ends of a capacitor 1039 is connected to the anode and cathode of the constant voltage diode 1038.

In such a structure, electric charges ($V_{1039}$) stored in the capacitor 1039 are designated so that $V_{1039}$ is lower than the terminal voltage $V_{1023}$ of the secondary battery cell 1023.

Figure 28:
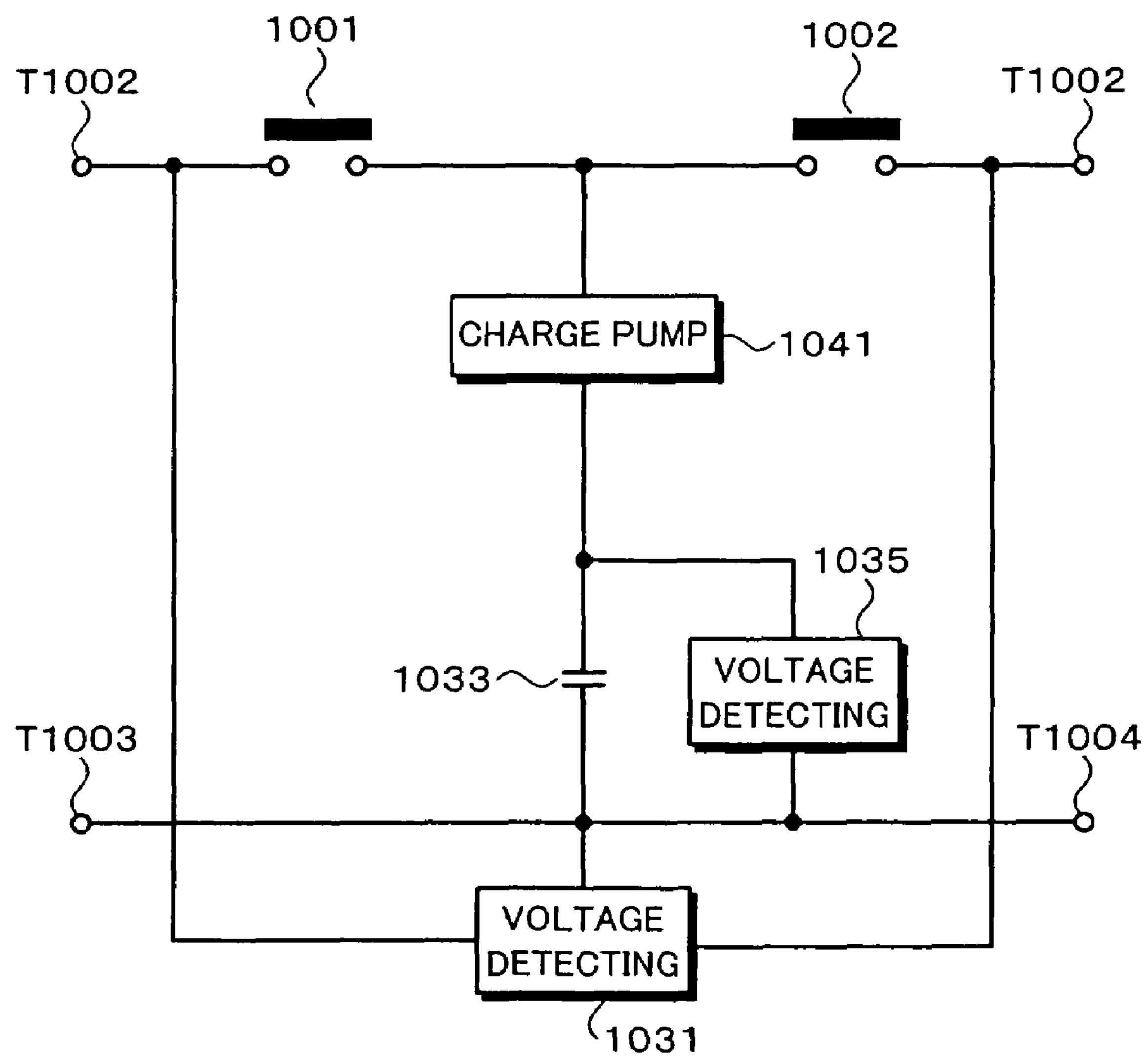
FIG. 28 is a block diagram describing a modification of the first example of the fifth embodiment of the present invention.

FIG. 28 shows a modification of the first example of the fifth embodiment. A charge pump 1041 is disposed between a connection point of switches 1001 and 1002 and a capacitor 1033. The charge pump 1041 causes electric charges ($V_{1033}$) whose voltage is higher than a terminal voltage $V_{1023}$ of a secondary battery cell 1023 to be stored in the capacitor 1033. In other words, the charge pump 1041 causes electric charges that satisfy the following relation to be stored in the capacitor 1033.

$$V_{1033}>V_{1023}$$

In this example, the operation states of the switches 1001 and 1002 can be easily detected.

Figure 29:
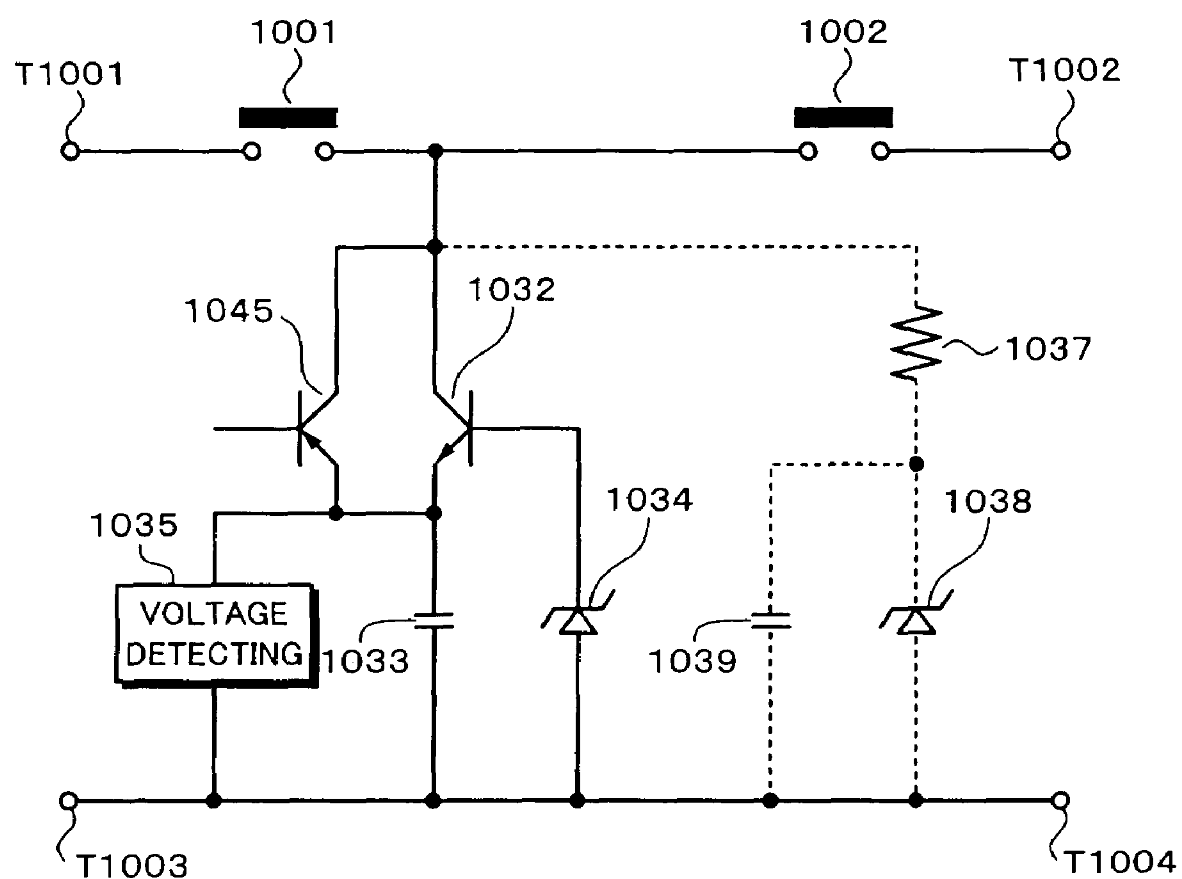
FIG. 29 is a block diagram describing a second example of the fifth embodiment of the present invention.

Next, with reference to FIG. 29, a second example of the fifth embodiment will be described. According to the second example of the fifth embodiment, in the circuit shown in FIG. 27, a PNP type transistor 1045 is disposed. An emitter of the transistor 1045 is connected to an emitter of a transistor 1032. A collector of the transistor 1045 is connected to a collector of a transistor 1032. A base of the transistor 1045 is connected to a controlling portion (not shown).

In the second example, after the transistor 1045 is turned on, the operation states of switches 1001 and 1002 are detected. As a result, the operation states of the switches 1001 and 1002 can be easily detected.

Figure 30:
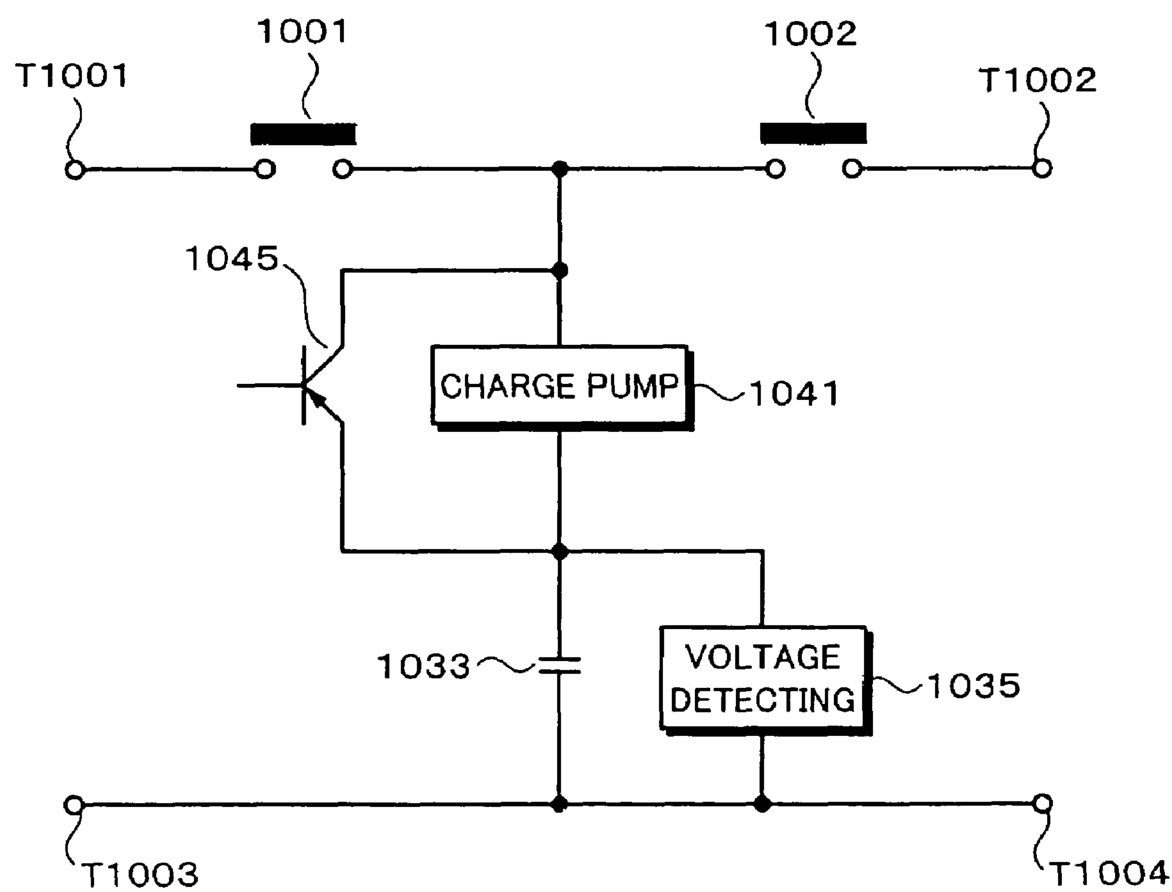
FIG. 30 is a block diagram describing a modification of the second example of the fifth embodiment of the present invention.

FIG. 30 shows a modification of the second example of the fifth embodiment of the present invention. In FIG. 30, a transistor 1045 is disposed. An emitter of the transistor 1045 is connected to a capacitor 1033. A collector of the transistor 1045 is connected to a connection point of switches 1001 and 1002. A base of the transistor 1045 is connected to a controlling portion (not shown).

According to the modification of the second example of the fifth embodiment, after the transistor 1045 is turned on, the operation states of the switches 1001 and 1002 are detected. Thus, the operation states of the switches 1001 and 1002 can be easily detected.

Figure 31:
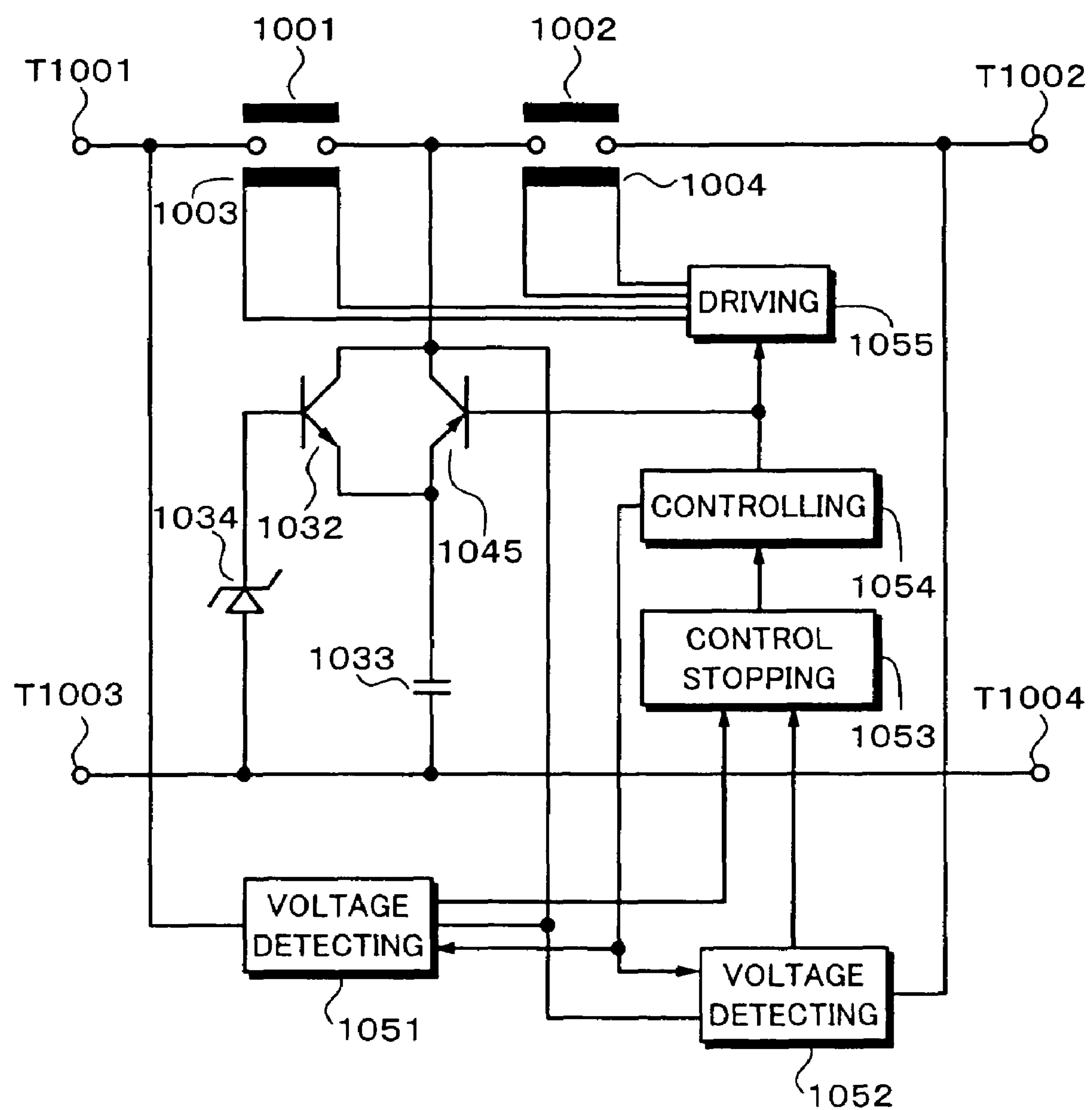
FIG. 31 is a block diagram describing a third example of the fifth embodiment of the present invention.

FIG. 31 shows a third example of the fifth embodiment of the present invention. A voltage detecting circuit 1051 (operation state detecting means, state determining means) are connected to both ends of a switch 1001. The voltage detecting circuit 1051 detects a potential between terminals of a switch 1001. A control state of the switch 1001 is supplied from a controlling circuit 1054 to the voltage detecting circuit 1051. The operation state of the switch 1001 is determined with the detected potential. It is determined whether or not the operation state of the switch 1001 matches the control state of the switch 1001. When the determined result represents that the operation state does not match the control state, a signal is supplied to a control stopping circuit 1053.

A voltage detecting circuit 1052 (operation state detecting means, state determining means) is connected to both ends of a switch 1002. The voltage detecting circuit 1052 detects a potential between terminals of the switch 1002. A control state of the switch 1002 is supplied from the controlling circuit 1054 to the voltage detecting circuit 1052. The voltage detecting circuit 1052 determines an operation state of the switch 1002 with the detected potential and determines whether or not the operation state of the switch 1002 matches the control state of the switch 1002. When the determined result represents that the operation sate does not match the control state, a signal is supplied to the control stopping circuit 1053.

When a signal that represents that the operation state does not match the control state is supplied from at least one of the voltage detecting circuits 1051 and 1052, a stop signal that causes the switches 1001 and 1002 to be turned off is supplied to the controlling circuit 1054.

When the stop signal is supplied from the control stopping circuit 1053 to the controlling circuit 1054, a control signal that causes the switches 1001 and 1002 to be turned off is supplied to a driving circuit 1055. The control signal supplied from the controlling circuit 1054 to the driving circuit 1055 is also supplied to a base of the transistor 1045.

Figure 32:
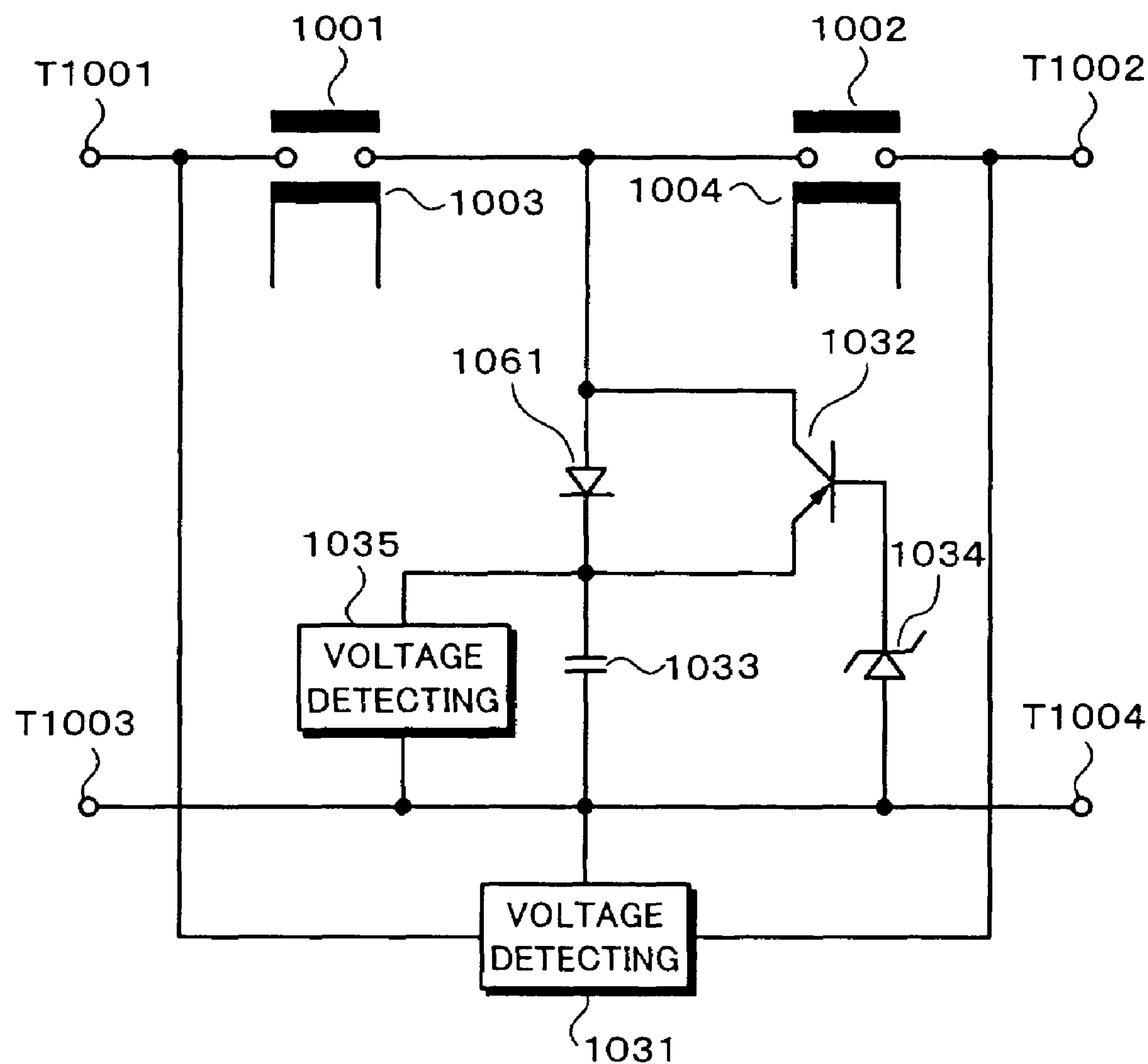
FIG. 32 is a block diagram describing a sixth-embodiment of the present invention.

Next, with reference to FIG. 32, a sixth embodiment of the present invention will be described. In FIG. 32, switches 1001 and 1002 are disposed in an AC circuit. To detect operation states of the switches 1001 and 1002 in the AC circuit, an AC current is rectified by a diode 1061 connected in series to a capacitor 1033. Electric charges are stored in the capacitor 1033. Thus, the foregoing operation can be accomplished.

Figure 33:
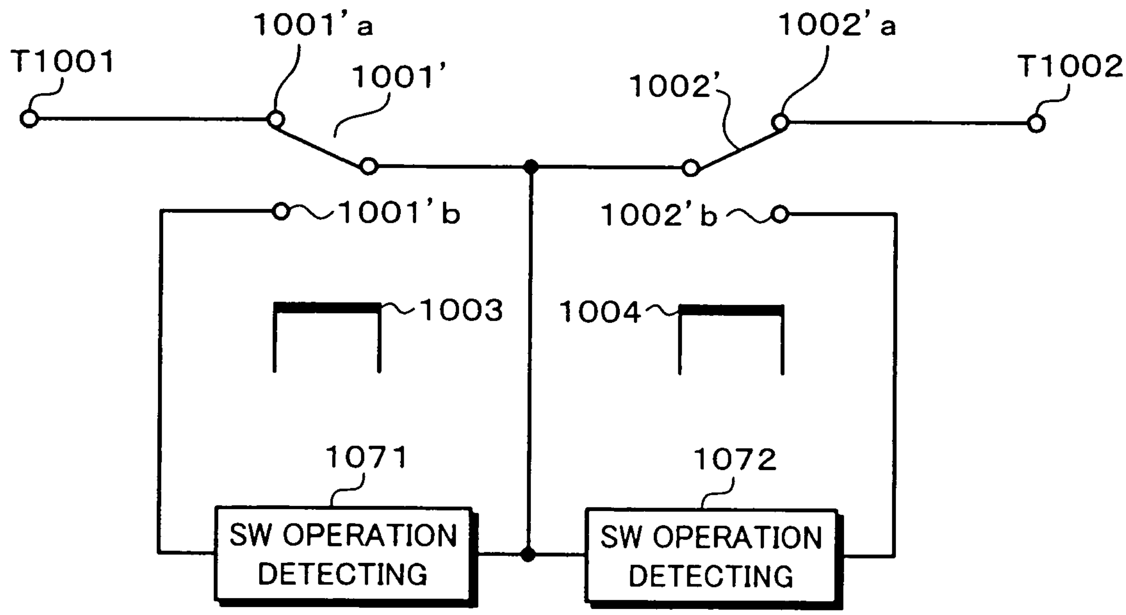
FIG. 33 is a block diagram describing a first example of a seventh embodiment of the present invention.

Next, with reference to FIG. 33, a first example of a seventh embodiment of the present invention will be described. According to the first example of the seventh embodiment, switches that select terminals (hereinafter referred to as "selection type switches") are used instead of switches 1001 and 1002. The selection type switches 1001' and 1002' are controlled so that when the switches 1001 and 1002 are turned on, terminals 1001'*a* and 1002'*b* are connected and when the switches 1001 and 1002 are turned off, terminals 1001'*b* and 1002'*b* are connected, respectively.

A switch operation detecting circuit 1071 (operation state detecting means) is disposed between a connection point of the selection type switches 1001' and 1002' and the terminal 1001'*b*. The switch operation detecting circuit 1071 detects an operation state of the selection type switch 1001'. A switch operation detecting circuit 1072 (operation state detecting means) is disposed between a connection point of the selection type switches 1001' and 1002' and the terminal 1002'*b*. The switch operation detecting circuit 1072 detects an operation state of the selection type switch 1002'. The switch operation detecting circuits 1071 and 1072 detects impedances so as to detect the operation states of the selection type switches 1001' and 10002'.

Figure 26:
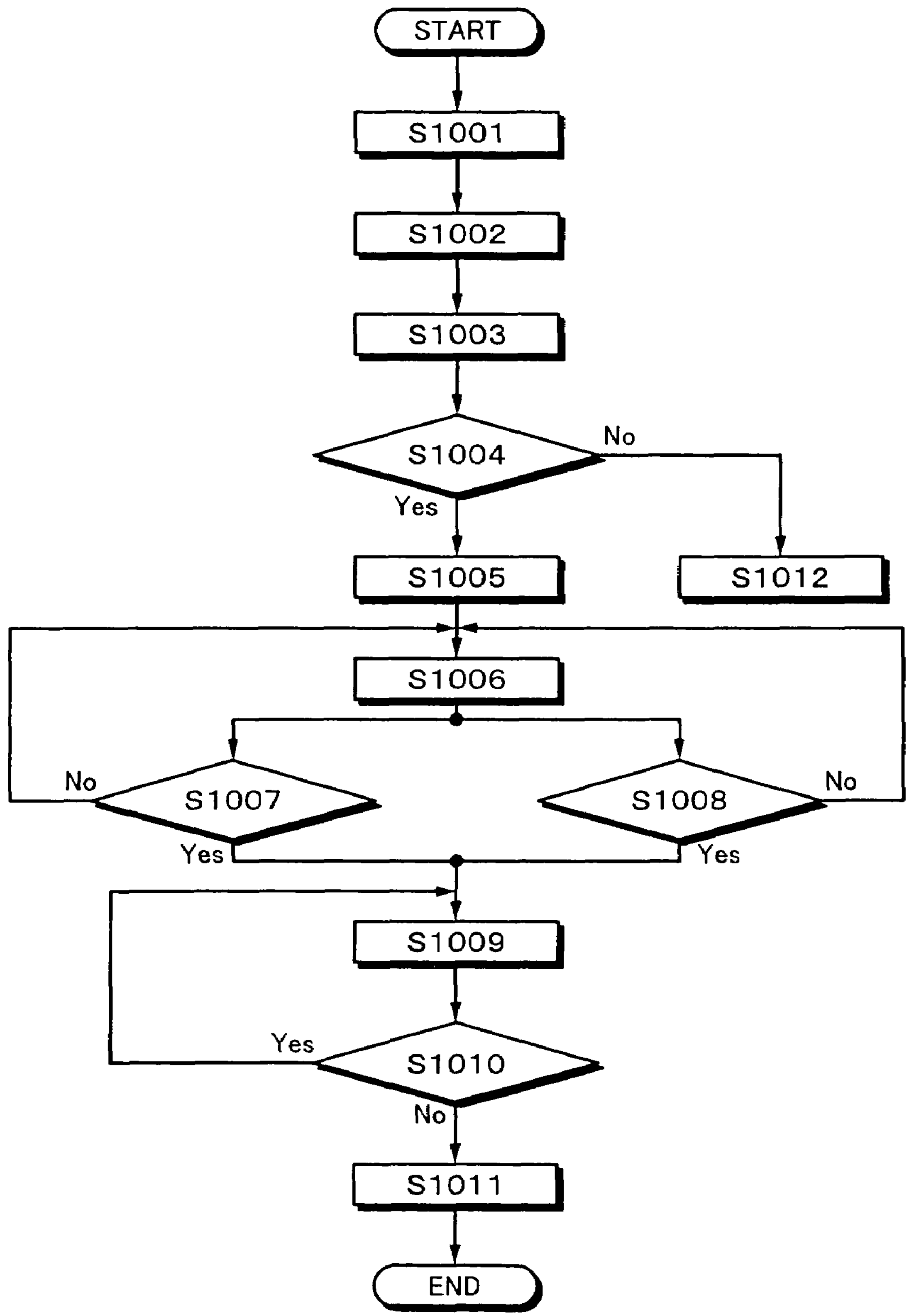
FIG. 26 is a flow chart describing an operation according to the fourth embodiment of the present invention.

The operation of the seventh embodiment is the same as the operation described with the flow chart shown in FIG. 26.

Figure 34:
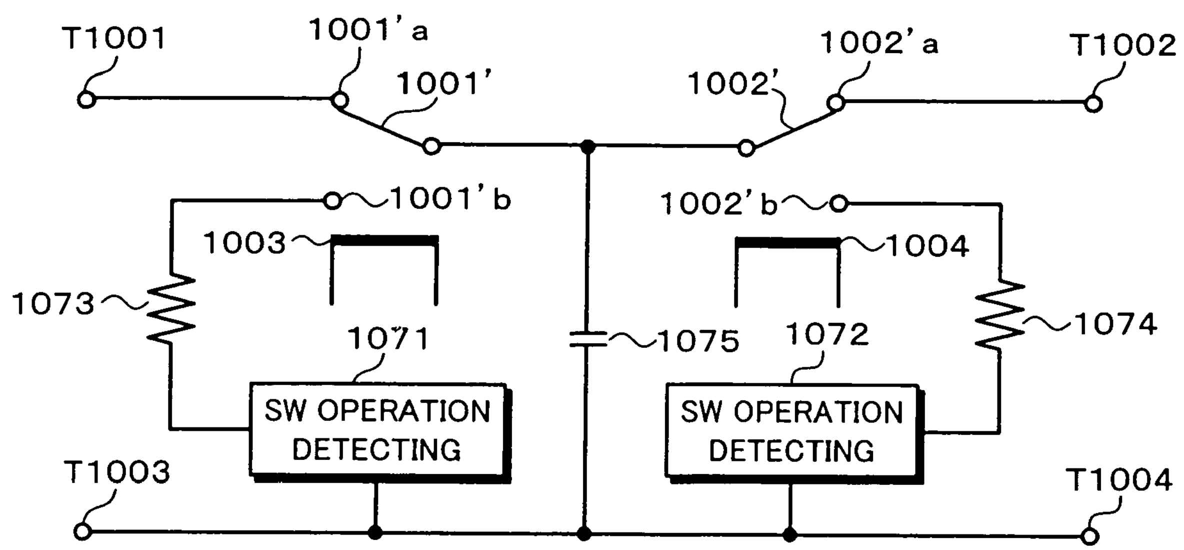
FIG. 34 is a block diagram describing a second example of the seventh embodiment of the present invention.

Next, with reference to FIG. 34, a second example of the seventh embodiment will be described. According to the second example of the seventh embodiment, a resistor 1073 is disposed between a terminal 1001'*b* and a switch operation detecting circuit 1071. A resistor 1074 is disposed between a terminal 1002'*b* and a switch operation detecting circuit 1072. The switch operation detecting circuits 1071 and 1072 are connected to terminals T1003 and T1004. A capacitor 1075 is disposed between a connection point of selection type switches 1001' and 1002' and a connection point of terminals T1003 and T1004.

According to the second example of which a capacitor 1075 is disposed, the switch operation detecting circuits 1071 and 1072 detect a current that flows from the capacitor 1075 so as to detect operation states of the selection type switches 1001' and 1002'.

Figure 35:
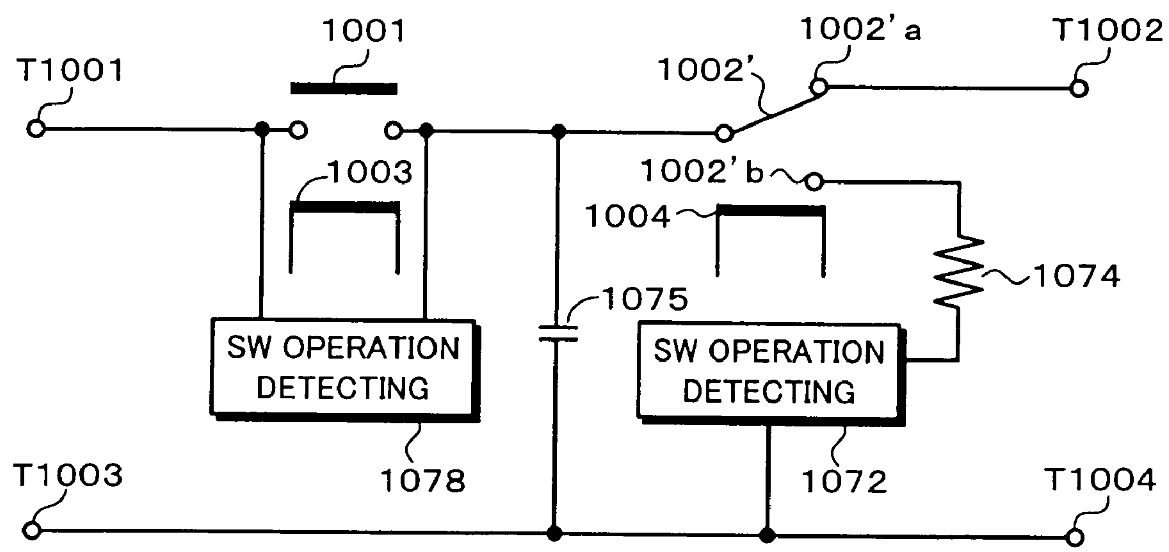
FIG. 35 is a block diagram describing a third example of the seventh embodiment of the present invention.

Next, with reference to FIG. 35, a third example of the seventh embodiment will be described. According to the third example of the seventh embodiment, a switch 1001 and a selection type switch 1002' are used. A switch operation detecting circuit 1078 (operation state detecting means) is connected to both ends of the switch 1001 so as to detect an operation state of the switch 1001.

Even if a solenoid type switch and a selection switch are used in combination as described above, the same operation as the foregoing examples can be accomplished.

Figure 36:
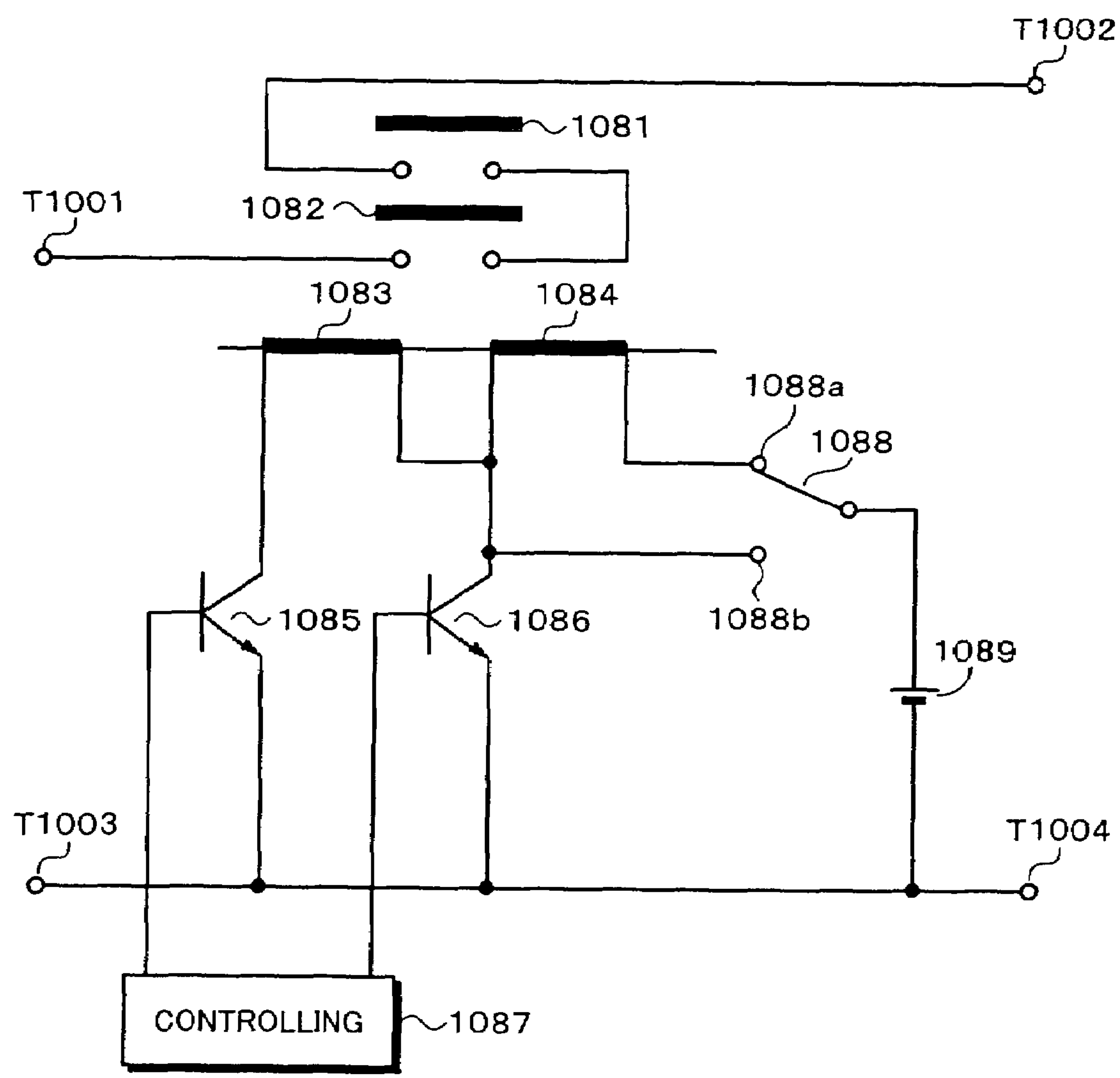
FIG. 36 is a block diagram describing a first example of an eighth embodiment of the present invention.

Next, with reference to FIG. 36, a first example of an eighth embodiment of the present invention will be described. Switches 1081 and 1082 are disposed in series between terminals T1001 and T1002 so that on/off operations of the switches 1081 and 1082 can be controlled by both or at least one of driving coils 1083 and 1084.

First ends of the driving coils 1083 and 1084 are connected to each other. A connection point of the driving coils 1083 and 1084 is connected to a collector of an NPN type transistor 1086. A second end of the driving coil 1083 is connected to a collector of an NPN type transistor 1085. A second end of the driving coil 1084 is connected to a positive terminal of a power supply portion 1089 through a terminal 1088a of a switching circuit 1088.

An emitter of the transistor 1085 is connected to terminals T1003 and T1004. A base of the transistor 1085 is connected to a controlling circuit 1087. Likewise, an emitter of the transistor 1086 is connected to the terminals T1003 and T1004. A base of the transistor 1086 is connected to the controlling circuit 1087. The collector of the transistor 1086 is connected to the positive terminal of the power supply portion 1089 through a terminal 1088*b* of the switching circuit 1088. A negative terminal of the power supply portion 1089 is connected to the terminals T1003 and T1004.

If one of the driving coils 1083 and 1084 breaks, the switching circuit 1088 is connected to the terminal 1088*a*. As a result, since the transistor 1085 is turned off and the transistor 1086 is turned on, the switches 1081 and 1082 are turned off. When the switches 1081 and 1082 are not turned off, the switching circuit 1088 is connected to the terminal 1088*b*. As a result, since the transistor 1085 is turned on and the transistor 1086 is turned off, the switches 1081 and 1082 are turned off.

Thus, according to the first example of the eighth embodiment, a solenoid type switch that has divided driving coils is used. Thus, even if one of driving coils breaks, the switches 1081 and 1082 can be turned off.

Figure 37:
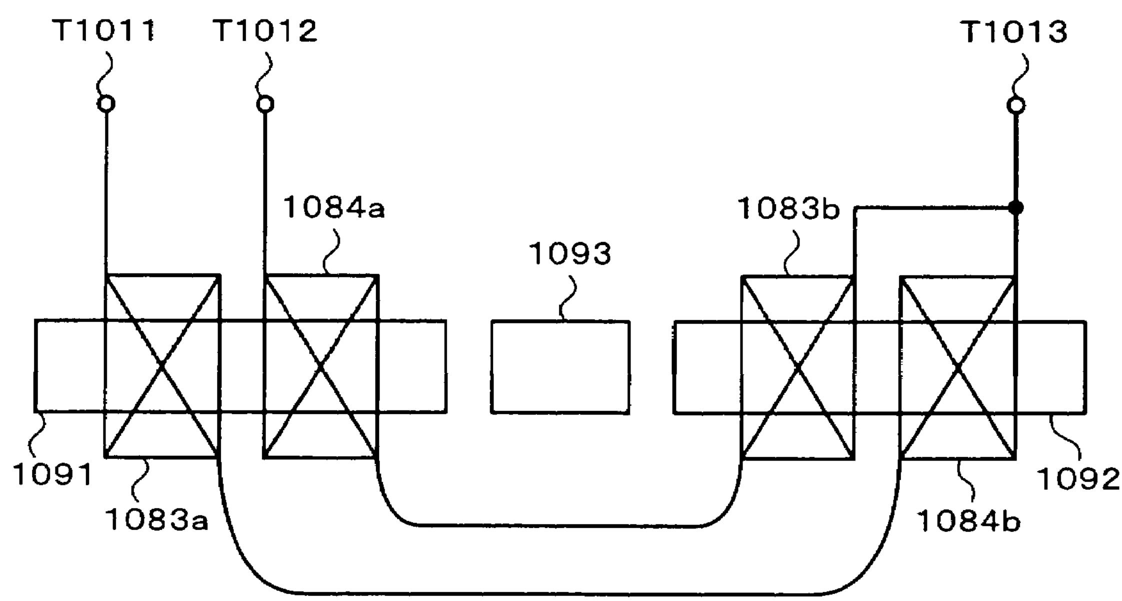
FIG. 37 is a schematic diagram showing an example of a solenoid type switch according to the eighth embodiment of the present invention.

Next, with reference to FIG. 37, an example of which a solenoid type switch that has divided driving coils will be described. Driving coils 1083*a*, 1083*b*, 1084*a*, and 1084*b* are disposed around iron cores 1091 and 1092. A magnetic substance 1093 is movably disposed between the iron cores 1091 and 1092. A terminal T1011 is connected from the driving coil 1083*a*. The terminal T1011 is connected to a collector of a transistor 1085. The driving coils 1083*a* and 1084*b* are connected.

The driving coils 1083*b* and 1084*b* are connected. A terminal T1013 is connected from a connection point of the driving coils 1083*b* and 1084*b*. The terminal T1013 is connected to a collector of a transistor 1086. The driving coils 1083*b* and 1084*a* are connected. A terminal T1012 is connected from the driving coil 1084*a*. The terminal T1012 is connected to a terminal 1088*a* of the switching circuit 1088.

Figure 38:
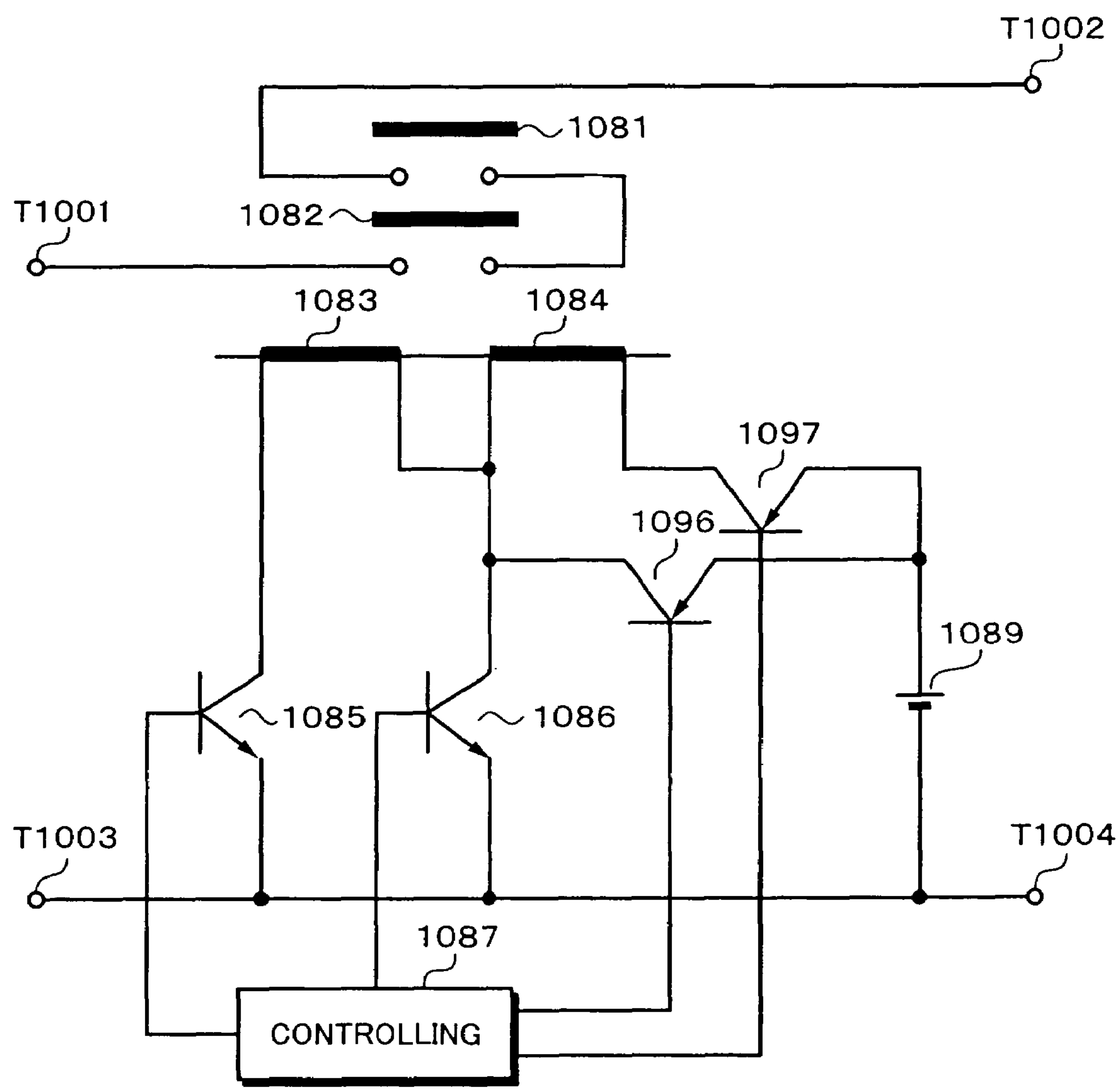
FIG. 38 is a block diagram describing a second example of the eighth embodiment of the present invention.

Next, with reference to FIG. 38, a second example of the eighth embodiment of the preset invention will be described. A collector of a PNP type transistor 1096 is connected to a collector of a transistor 1086. An emitter of the transistor 1096 is connected to a positive terminal of a power supply portion 1089. A base of the transistor 1096 is connected to a controlling circuit 1087. A collector of a PNP type transistor 1097 is connected to a driving coil 1084. An emitter of the transistor 1097 is connected to a positive terminal of the power supply portion 1089. A base of the transistor 1097 is connected to the controlling circuit 1087.

According to the second example of the eighth embodiment of the present invention, the foregoing switching circuit 1088 is replaced with transistors 1096 and 1097.

If one of driving coils 1083 and 1084 breaks, transistors 1085 and 1096 are turned off. Transistors 1086 and 1097 are turned on. As a result, switches 1081 and 1082 are turned off. When the switches 1081 and 1082 are not turned off, the transistors 1085 and 1096 are turned on. The transistors 1086 and 1087 are turned off. As a result, the switches 1081 and 1082 are turned off.

Thus, even if one driving coil breaks, the switches 1081 and 1082 can be turned off. In this case, a current (power supply) that causes one driving coil to turn off the switches 1081 and 1082 is supplied to the driving coils. Although the driving coils 1083 and 1084 may be connected in parallel or in series, their operations are the same.

Figure 39:
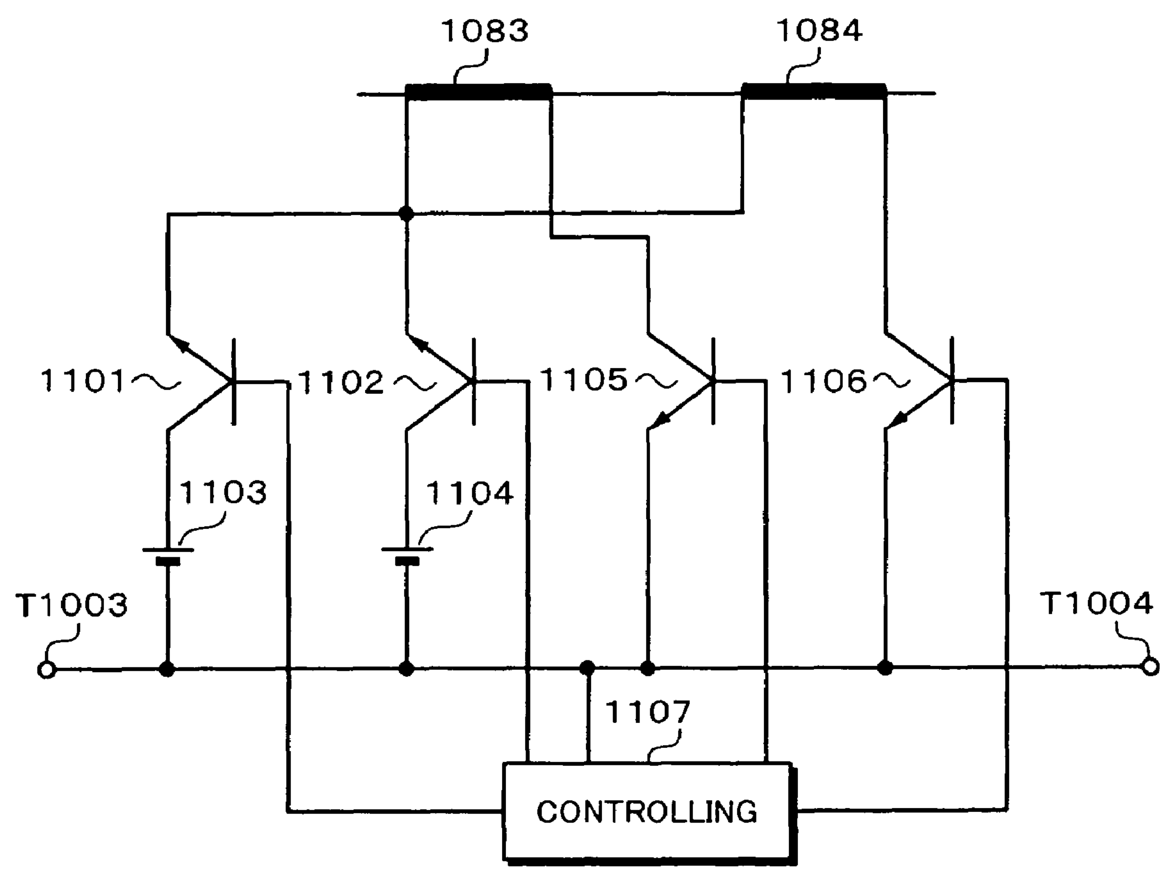
FIG. 39 is a block diagram describing a third example of the eighth embodiment of the present invention.

Next, with reference to FIG. 39, a third example of the eighth embodiment will be described. A collector of an NPN type transistor 1101 is connected to a positive terminal of a power supply portion 1103. An emitter of the transistor 1101 is connected to first terminals of driving coils 1083 and 1084. A base of the transistor 1101 is connected to a controlling circuit 1107. A negative terminal of the power supply portion 1103 is connected to terminals T1003 and T1004.

A collector of an NPN type transistor 1102 is connected to a positive terminal of a power supply portion 1104. An emitter of the transistor 1102 is connected to the first terminals of the driving coils 1083 and 1084. A base of the transistor 1102 is connected to the controlling circuit 1107. A negative terminal of the power supply portion 1104 is connected to the terminals T1003 and T1004.

A collector of an NPN type transistor 1105 is connected to a second terminal of the driving coil 1083. An emitter of the transistor 1105 is connected to the terminals T1003 and T1004. A base of the transistor 1105 is connected to the controlling circuit 1107.

A collector of an NPN type transistor 1106 is connected to a second terminal of the driving coil 1084. An emitter of the transistor 1106 is connected to the driving coils 1003 and 1004. A base of the transistor 1106 is connected to the controlling circuit 1107.

According to the third example of the eighth embodiment, the driving coils 1083 and 1084 are connected in parallel. When the driving coils 1083 and 1084 are connected in parallel, a high voltage (power supply) that causes one driving coil to control the switches 1081 and 1082 is required. Thus, it is necessary to vary voltages of the power supply portions 1103 and 1104.

When on/off states of the switches 1081 and 1082 are controlled by one driving coil, on/off states of the transistors 1101 and 1102 is changed. The transistors 1105 and 1106 are turned on at a time. Thus, even if the driving coils 1083 and 1084 are connected in parallel, the same operation as they are connected in series can be performed.

Figure 40:
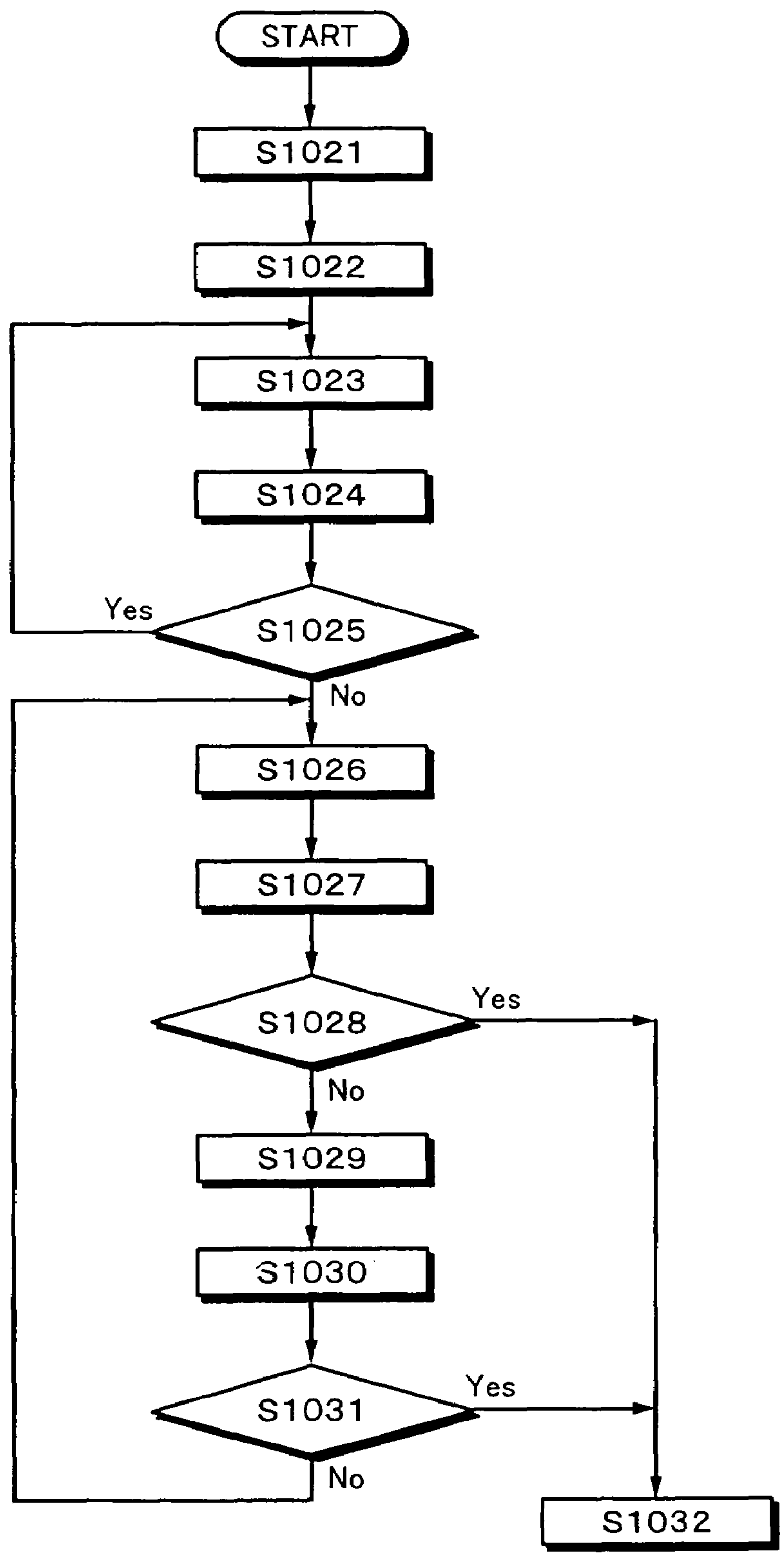
FIG. 40 is a flow chart describing an operation of the eighth embodiment of the present invention.

Next, with reference to a flow chart shown in FIG. 40, an operation of the eighth embodiment will be described. At step S1021, the switches 1081 and 1082 are turned on. At step S1022, a control signal that causes the switches 1081 and 1082 to be turned off is supplied from the controlling circuit 1087 to the transistors 1085, 1086, 1096, and 1097.

At step S1023, a drive current that causes the switches 1081 and 1082 to be turned off is supplied to the driving coils 1083 and 1084. At step S1024, operation states of the switches 1081 and 1082 are detected.

At step S1025, it is determined whether or not the switches 1081 and 1082 are turned off in accordance with the detected operation states. When the determined result represents that both the switches 1081 and 1082 are turned off, the control returns to step S1023. When the determined result represents that at least one of the switches 1081 and 1082 or both thereof are turned on, the control advances to step S1026.

At step S1026, the transistors 1085 and 1096 are turned off. The transistors 1086 and 1097 are turned on. At step S1027, operation states of the switches 1081 and 1082 are detected.

At step S1028, it is determined whether or not the switches 1081 and 1082 are turned off in accordance with the detected operation states. When the determined result represents that both the switches 1081 and 1082 are turned off, the control advances to step S103. When the determined result represents that at least one of the switches 1081 and 1082 or both thereof are turned on, the control advances to step S1029.

At step S1029, the transistors 1085 and 1096 are turned on. The transistors 1086 and 1097 are turned off. At step S1030, the operation states of the switches 1081 and 1082 are detected.

At step S1031, it is determined whether or not the switches 1081 and 1082 are turned off in accordance with the detected operation states. When the determined result represents that both the switches 1081 and 1082 are turned off, the control advances to step S1032. When the determined result represents that at least one of the switches 1081 and 1082 or both thereof are turned on, the control returns to step S1026.

At step S1032, the controls of the switches 1081 and 1082 are stopped.

Figure 41:
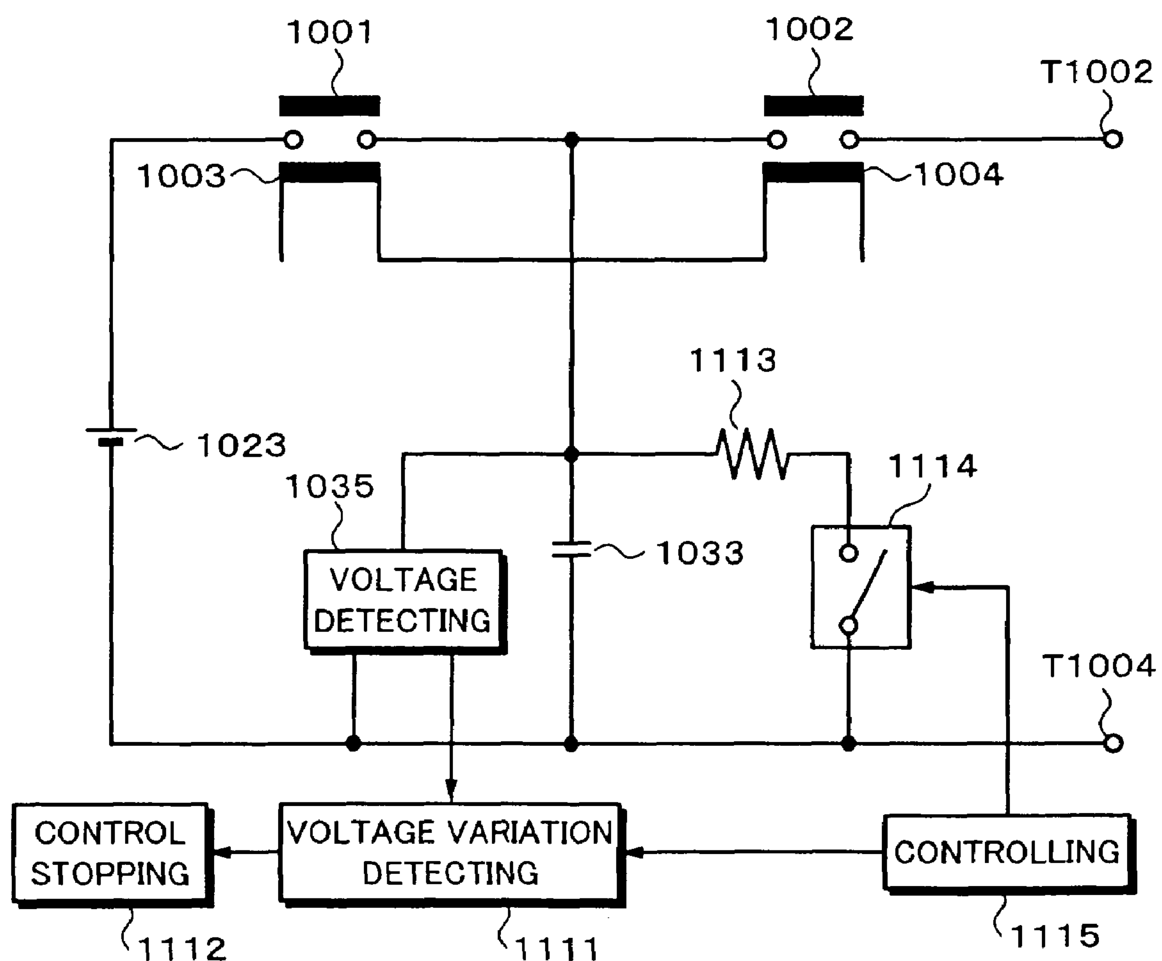
FIG. 41 is a block diagram describing a ninth embodiment of the present invention.

Next, with reference to FIG. 41, a ninth embodiment of the present invention will be described. A resistor 1113 and a switching circuit 1114 connected in series are disposed in parallel with a capacitor 1033. A potential $V_{1033}$ between terminals of the capacitor 1033 is detected by a voltage detecting circuit 1035 and supplied to a voltage variation detecting circuit 1111. A controlling circuit 1115 controls on/off states of the switching circuit 1114. In addition, the controlling circuit 1115 supplies a control state of the switching circuit 1114 to the voltage variation detecting circuit 1111.

The voltage variation detecting circuit 1111 (state determining means) detects a state of whether or not the capacitor 1033 breaks in accordance with the potential $V_{1033}$ supplied from the voltage detecting circuit 1035 and the control state supplied from the controlling circuit 1115. When the determined result represents that the capacitor 1033 breaks, a signal is supplied from the voltage variation detecting circuit 1111 to a control stopping circuit 1112. The control stopping circuit 1112 controls switches 1001 and 1002 with the signal supplied from the voltage variation detecting circuit 1111 so that they are turned off.

Next, an operation of the ninth embodiment will be described. When the potential $V_{1033}$ between the terminals of the capacitor 1033 is detected, the switches 1001 and 1002 are turned off. The switch 1114 is turned on. As a result, a resistor 1113 causes the capacitor 1033 to discharge electric charges a little. When the voltage variation detecting circuit 1111 has detected a small decrease of the potential $V_{1033}$ between the terminals of the capacitor 1033, it is determined that the capacitor 1033 does not break. When the potential $V_{1033}$ does not decrease, it is determined that the capacitor 1033 breaks.

When the potential $V_{1033}$ decreases a little, the switching circuit 1114 is turned off. As a result, operation states of the switches 1001 and 1002 are detected. In such a manner, according to the ninth embodiment, it is determined whether or not the capacitor 1033 breaks so as to detect the operation states of the switches 1001 and 1002.

Figure 42:
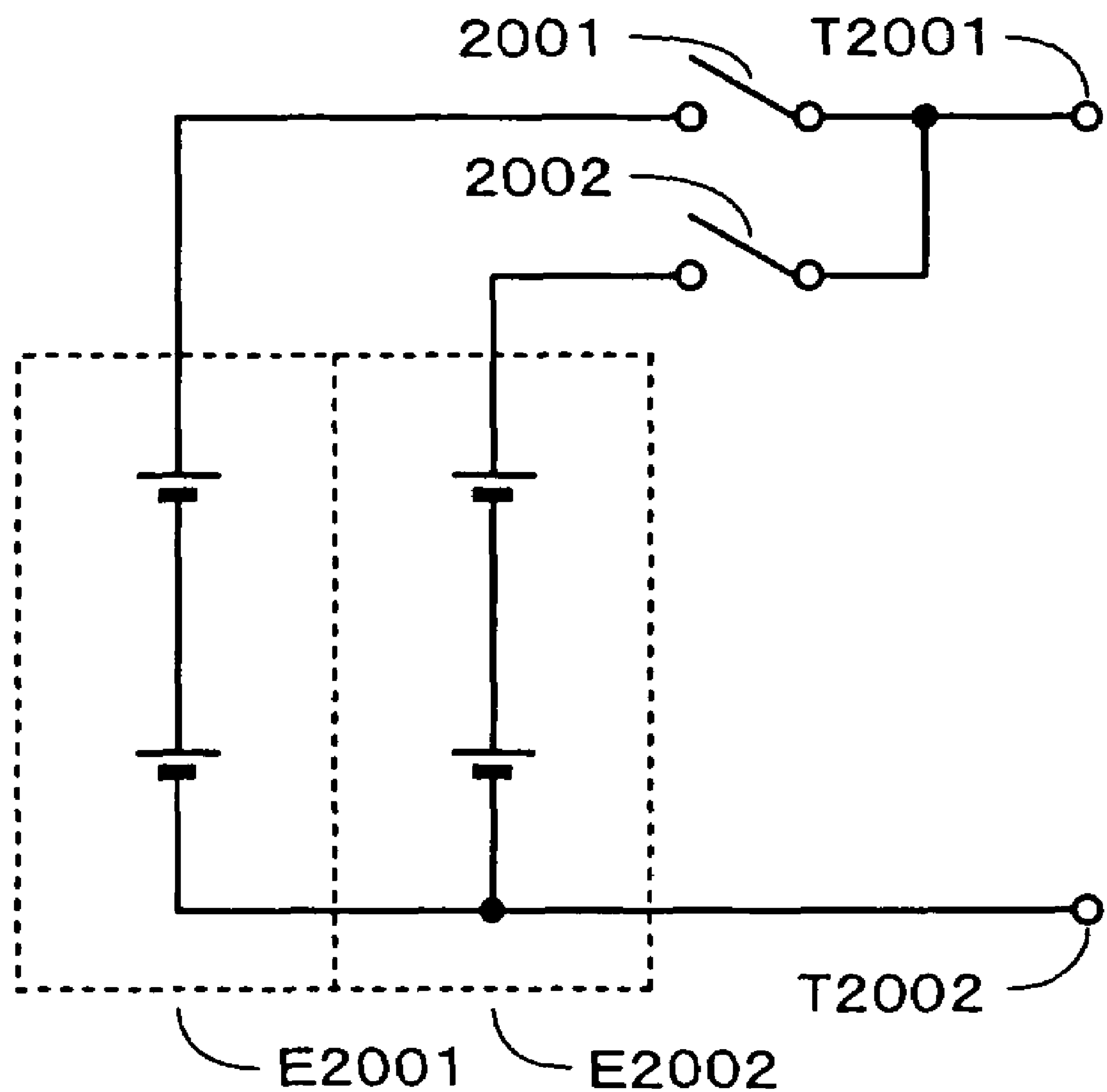
FIG. 42 is a block diagram describing an outlined structure of a battery pack according to a first embodiment of the present invention.

Next, with reference to the accompanying drawings, battery packs according to embodiments of the present invention will be described. FIG. 42 shows an outlined structure of a battery pack according to a first embodiment of the present invention. Battery blocks E2001 and E2002 are disposed in parallel. Each of the battery blocks E2001 and E2002 is composed of two secondary battery cells that are connected in series. A positive terminal of the battery block E2001 is connected to a battery terminal T2001 through a switching circuit 2001. A negative terminal of the battery block E2001 is connected to another battery terminal T2002. A positive terminal of the battery block E2002 is connected to the battery terminal T2001 through a switching circuit 2002. A negative terminal of the battery block E2002 is connected to the battery terminal T2002. In this structure, a discharging operation and a charging operation can be selectively performed for each battery block with safety.

The switching circuits 2001 and 2002 are for example the foregoing solenoid type switches.

Figure 43:
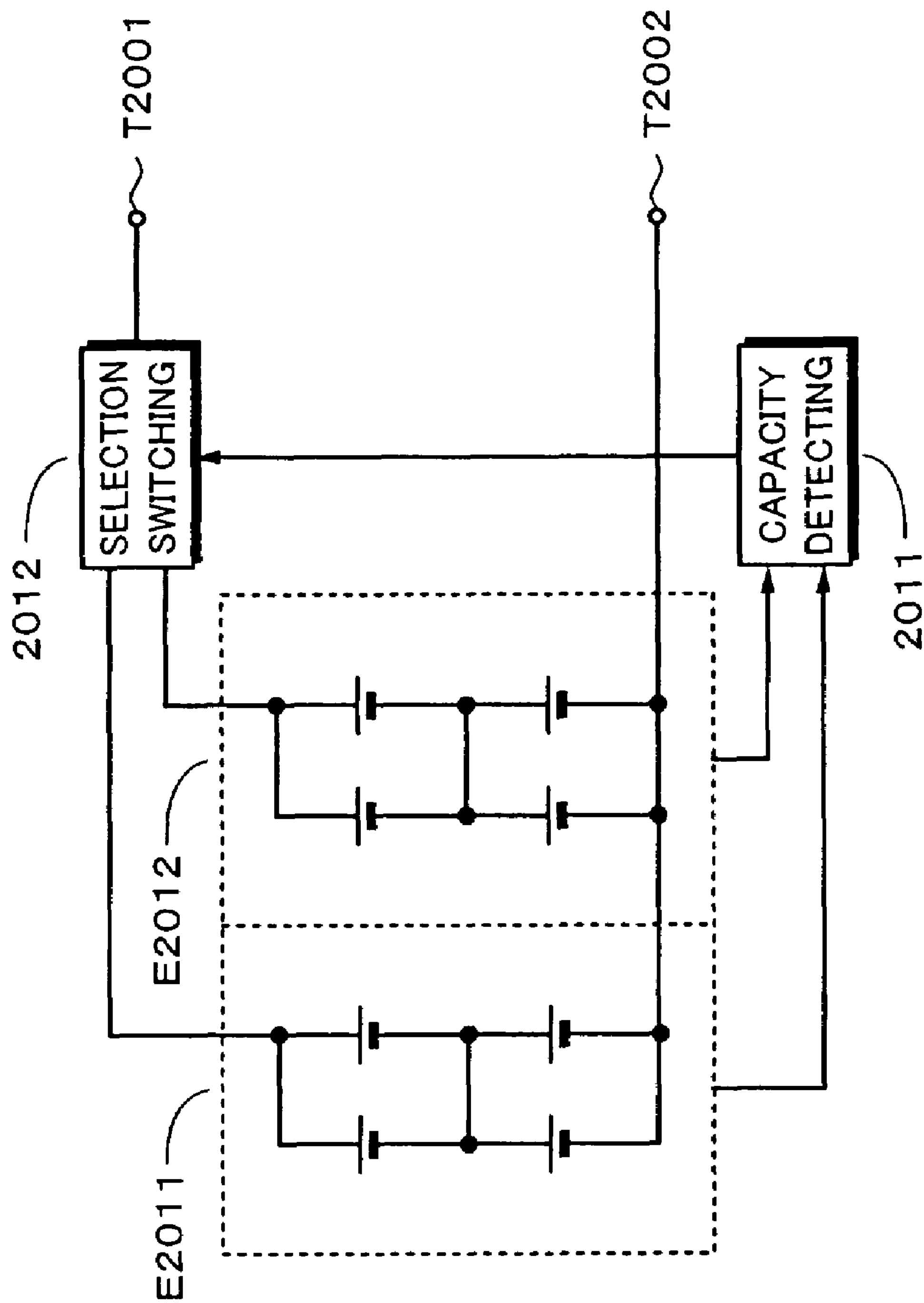
FIG. 43 is a block diagram describing the battery pack according to the first embodiment of the present invention.

Next, with reference to FIG. 43, a battery pack according to a first embodiment will be described. In FIG. 43, battery blocks E2011 and E2012 are used. In each of the battery blocks E2011 and E2012, four secondary battery cells are connected so that two secondary battery cells are connected in series and in parallel. A positive terminal of the battery block E2011 is connected to a battery terminal T2001 through a selection switching circuit 2012. A negative terminal of the battery block E2011 is connected to a battery terminal T2002. A positive terminal of the battery block E2012 is connected to the battery terminal T2001 through the selection switching circuit 2012. A negative terminal of the battery block E2012 is connected to the battery terminal T2002. A capacity detecting circuit 2011 detects battery capacities of the battery blocks E2011 and E2012. A control signal that causes the selection switching circuit 2012 to select a path in accordance with the detected battery capacities is supplied from the capacity detecting circuit 2011 to the selection switching circuit 2012.

When the battery block E2011 starts discharging electric charges, if the difference between the capacities of the battery blocks E2011 and E2012 is equal to or higher than a reference value, the selection switching circuit 2012 is controlled so that the battery block E2012 discharges electric charges. When the difference between the capacity of a battery block that is discharging electric charges and the capacity of a battery block that is not discharging electric charges is equal to or higher than a reference value, the selection switching circuit 2012 is controlled so that a battery block that discharges electric charges is changed. By repeating this operation, the battery blocks E2011 and E2012 discharge electric charges. Likewise, when the charging operation is performed, the selection switching circuit 2012 is controlled so that the battery blocks E2011 and E2012 charge electric charges.

The selection switching circuit 2012 is for example the foregoing solenoid type switch.

Figure 44:
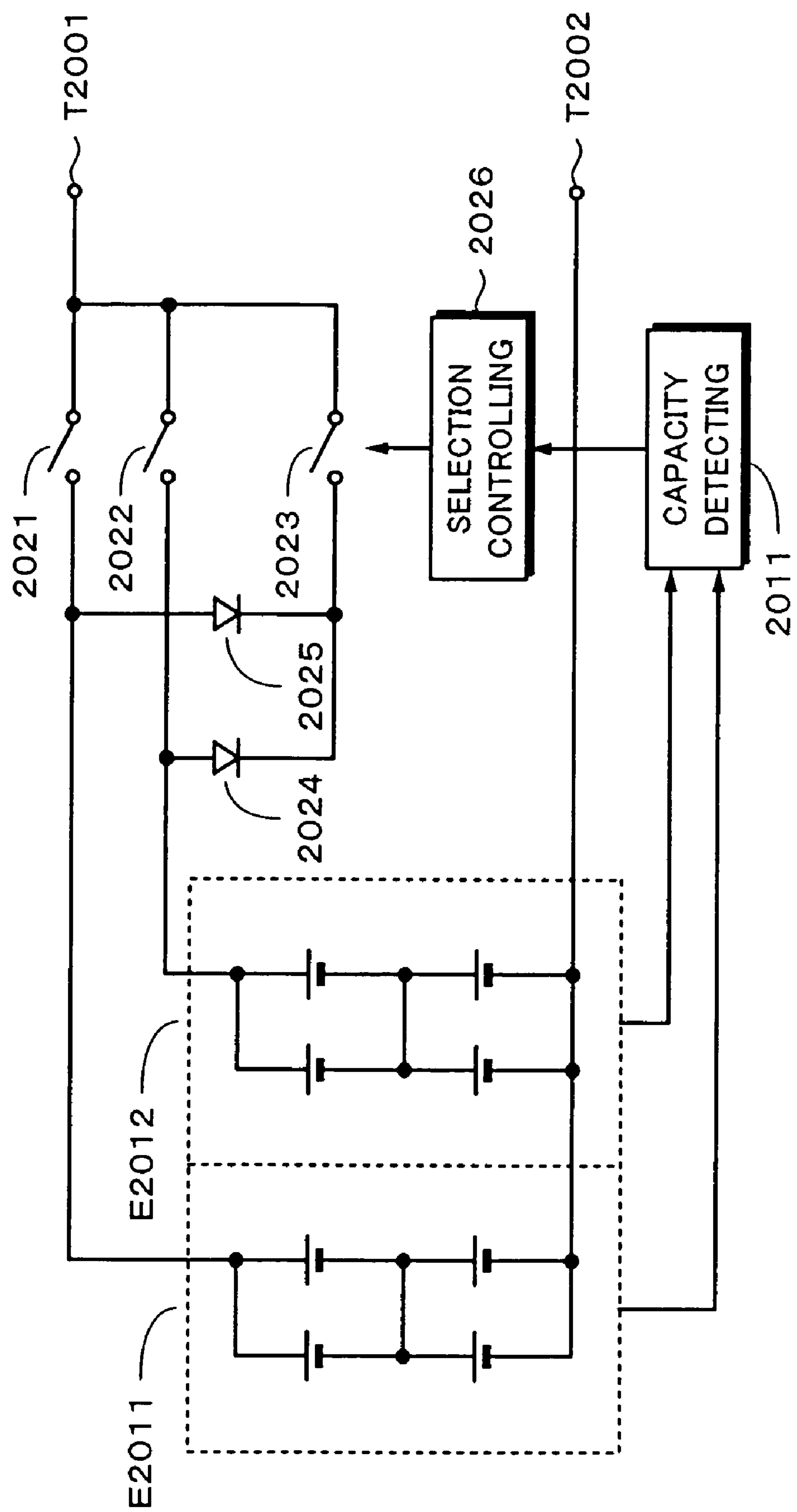
FIG. 44 is a block diagram describing a battery pack according to a second embodiment of the present invention.

Next, with reference to FIG. 44, a battery pack according to a second embodiment of the present invention will be described. A positive terminal of a battery block E2011 is connected to a battery terminal T2001 through a switching circuit 2021. In addition, the positive terminal of the battery block E2011 is connected to an anode of a diode 2025. A cathode of the diode 2025 is connected to the battery terminal T2001 through a switching circuit 2023. A negative terminal of the battery block E2011 is connected to a battery terminal T2002.

A positive terminal of the battery block E2012 is connected to the battery terminal T2001 through a switching circuit 2022. In addition, the positive terminal of the battery block E2012 is connected to an anode of a diode 2024. A cathode of the diode 2024 is connected to the battery terminal T2001 through the switching circuit 2023. A negative terminal of the battery block E2012 is connected to the battery terminal T2002.

A capacity detecting circuit 2011 detects battery capacities of the battery blocks E2011 and E2012. When the difference between the battery capacities of the battery blocks E2011 and E2012 is equal to or higher than a reference value, a control signal is supplied to a selection controlling circuit 2026.

Figure 45:
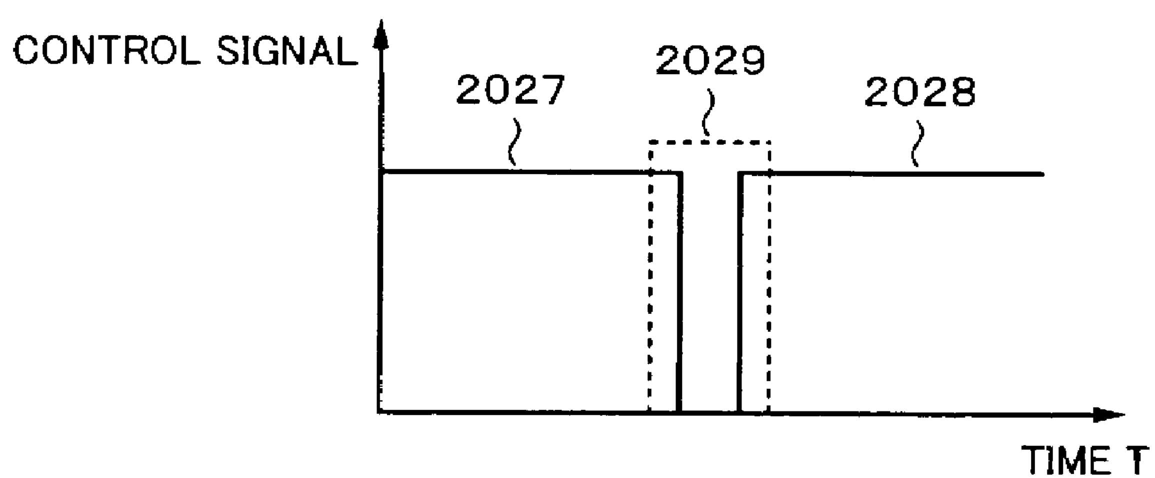
FIG. 45 is a schematic diagram describing a control of a switching circuit according to the second embodiment of the present invention.
Figure 46:
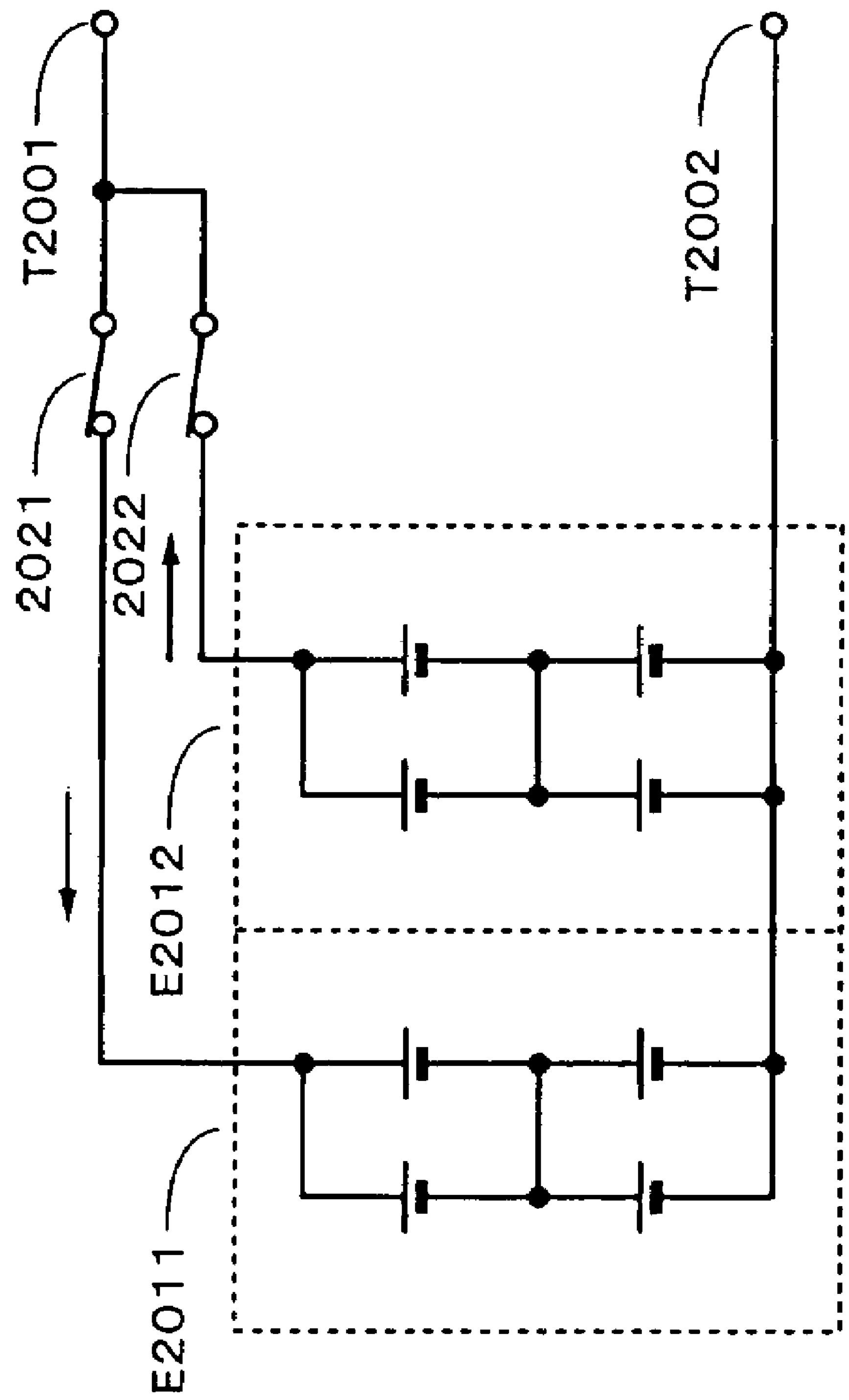
FIG. 46 is a block diagram describing the control of the switching circuit of the battery pack according to the second embodiment of the present invention.

For example, when a discharging operation is performed, as shown in FIG. 45, a selection signal is output from the selection controlling circuit 2026 so that the switching circuits 2021, 2022, and 2023 are turned on. When a control signal is in a high level denoted by reference numeral 2027 shown in FIG. 45, the switching circuit 2021 is turned on. When the control signal is in a high level denoted by reference numeral 2028, the switching circuit 2022 is turned on. When the control signal is in a high level denoted by reference numeral 2029, the switching circuit 2023 is turned on.

Thus, the switching circuits 2021, 2022, and 2023 are controlled so that the switching circuits 2021 and 2022 are not turned on at a time. In the condition that the relation between the voltage of the battery block E2011 and the voltage of the battery block E2012 satisfies for example:

$$E2011<E2012$$

when the switching circuits 2021 and 2022 are turned on at a time, the battery blocks E2011 and E2012 are connected. At that point, since the internal resistance of the battery block E2011 decreases by around 100 mΩ, an overcurrent flows from the battery block E2012 to E2011.

Thus, when the switching circuits 2021 and 2022 are turned on at a time, the battery blocks E2011 and 2012 are connected. As a result, safety of the battery block cannot be maintained. Thus, in the battery pack according to the first embodiment, the switching circuits 2021 and 2022 are controlled so that they are not turned on at a time. When a discharging operation is performed, a switching circuit 23 is turned on while the switching circuits 2021 and 2022 are turned on so that the battery blocks E2011 and E2012 continuous discharge electric charges.

Figure 47:
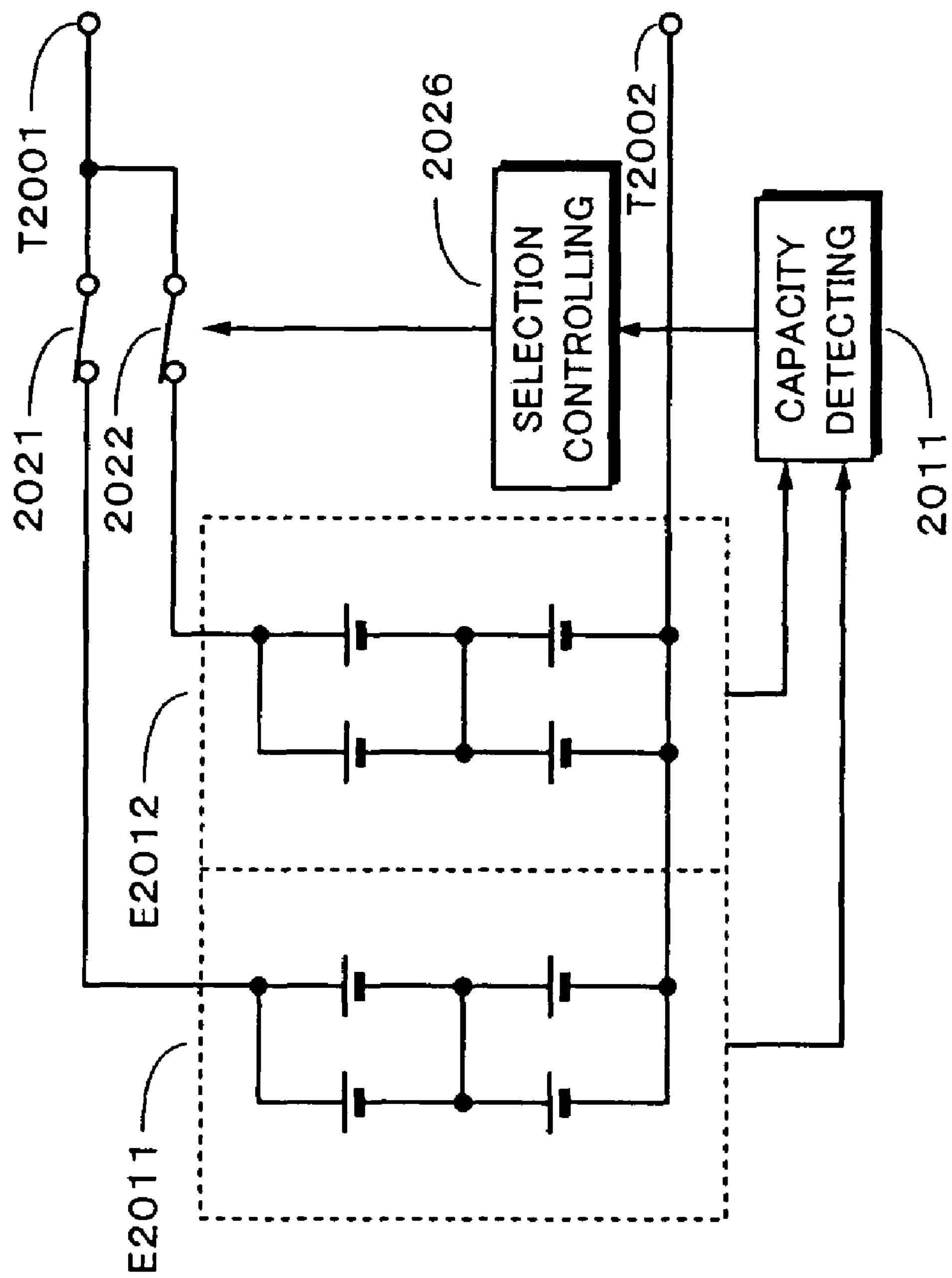
FIG. 47 is a block diagram describing a battery pack according to a third embodiment of the present invention.

Next, with reference to FIG. 47, a battery pack according to a third embodiment of the present invention will be described. When detected battery capacities of battery blocks E2011 and E2012 are equal to or lower than a reference value and the detected battery capacities are the same, a control signal may be output from a selection controlling circuit 2026 so that the battery blocks E2011 and E2012 discharge or charge electric charges at a time.

Figure 48:
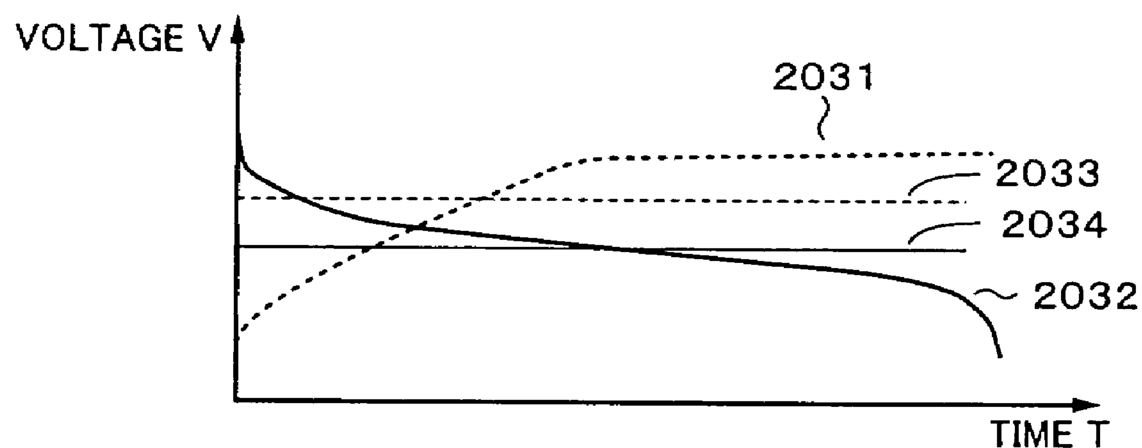
FIG. 48 is a characteristic chart describing a control of a switching circuit of the battery pack according to the third embodiment of the present invention.

For example, as shown in FIG. 48, when voltages of battery blocks E2011 and E2012 match a reference line 2033, switching circuits 2021 and 2022 may be turned on so that the battery blocks E2011 and E2012 charge electric charges at a time. On the other hand, when the voltages of the battery blocks E2011 and E2012 match a reference line 2034, the switching circuits 2021 and 2022 may be turned on so that the battery blocks E2011 and E2012 charges electric charges at a time.

In a characteristic chart of FIG. 48, a charging characteristic is denoted by reference numeral 2031, whereas a discharging characteristic is denoted by reference numeral 2032. A reference line for which the switching circuits 2021 and 2022 are turned on and both the battery blocks E2011 and E2012 charge electric charges at a time is denoted by reference numeral 2033. A reference line for which the switching circuits 2021 and 2022 are turned on and both the battery blocks E2011 and E2012 discharge electric charges at a time is denoted by reference numeral 2034.

The reference value for which the battery blocks E2011 and E2012 charge or discharge electric charges at a time may be set to half the battery capacity of each of the battery blocks E2011 and E2012.

Alternatively, when the battery blocks have been almost fully charged for around 80% to 90% or more, the switching circuits 2021 and 2022 may be turned on so that the battery packs E2011 and E2012 are charged at a constant voltage for example 4.2 V as a reference voltage. The charging capacities may be determined by detecting charging currents or battery voltages after charging operation is stopped.

Figure 49:
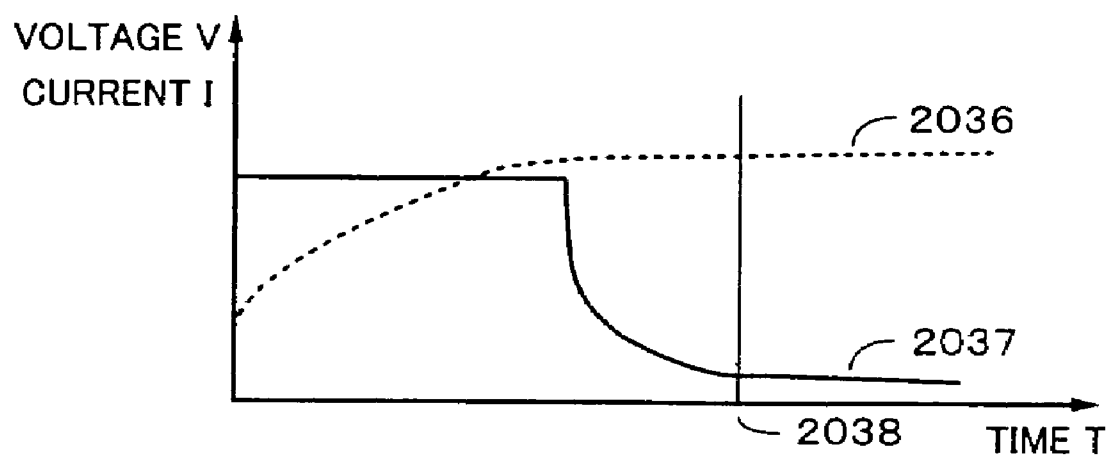
FIG. 49 is a characteristic chart describing a control of a switching circuit according to a fourth embodiment of the present invention.

FIG. 49 is a characteristic chart showing an example of a characteristic of a secondary battery cell. In the characteristic chart shown in FIG. 49, a characteristic of a charged voltage is denoted by reference numeral 2036, whereas a characteristic of a charged current is denoted by reference numeral 2037. A reference line that represents around 80% to 85% of a charging capacity of each of the battery blocks E2011 and E2012 is denoted by reference numeral 2038.

A secondary battery cell that has such characteristics can be safely charged for a battery capacity denoted by the reference line 2038. When the battery capacities of secondary battery cells are small, even if their battery capacities become unbalance by a charging operation, since the difference between the battery capacities is small, a problem about safety does not take place in the secondary battery cells. Thus, when a charging operation is performed for a plurality of secondary battery cells that are connected in series and in parallel, if the battery capacities are close to the reference line 2038, they can be safely used.

Likewise, when a discharging operation is performed for a plurality of secondary battery cells that are connected in serials and in parallel, if the battery capacities are close to around the reference line 2038, they can be safely used. When a discharging operation is performed for secondary battery cells whose battery capacities are small, if the battery capacities of the secondary battery cells are unbalance, the secondary battery cells tend to be overdischarged and overcharged. In contrast, when the battery capacities are large, even if the battery capacities of the secondary battery cells are unbalance, they do not tend to be overdischarged and overcharged.

Figure 50:
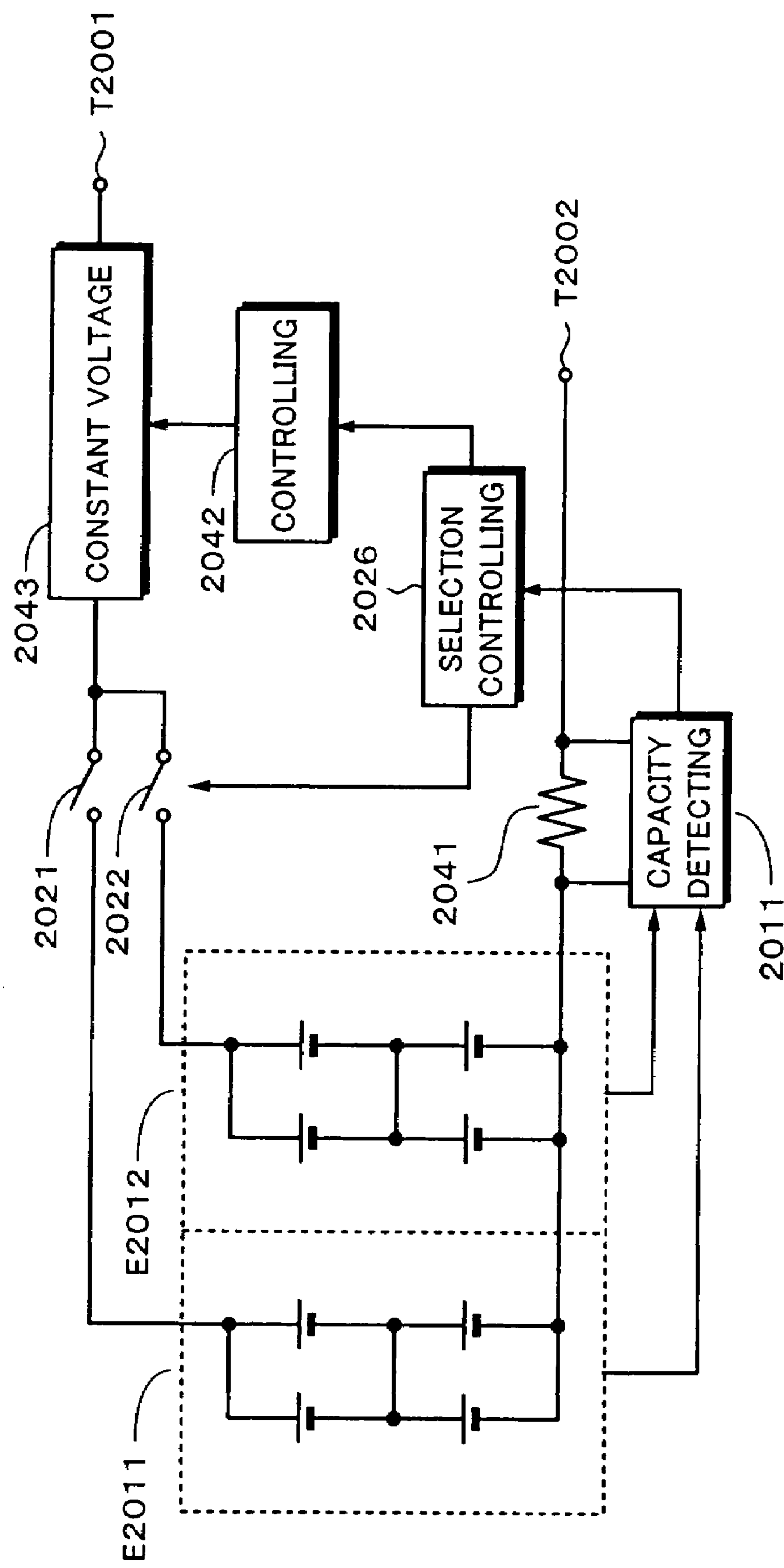
FIG. 50 is a block diagram describing a battery pack according to the fourth embodiment of the present invention.

Next, with reference to a block diagram shown in FIG. 50, a battery pack that performs such a control according to a fourth embodiment of the present invention will be described. A resistor 2041 is used to detect charging capacities of battery blocks E2011 and E2012. A control signal is supplied to a selection controlling circuit 2026 in accordance with a result detected by a capacity detecting circuit 2011. The selection controlling circuit 2026 outputs a selection signal to switching circuits 2021 and 2022 in accordance with the supplied control signal. In addition, the selection controlling circuit 2026 supplies a signal to a controlling circuit 2042. When the controlling circuit 2042 has determined that a charging operation is performed for the battery blocks E2011 and E2012 and they are almost fully charged in accordance with the supplied signal, the controlling circuit 2042 supplies a control signal to a constant voltage circuit 2043. The constant voltage circuit 2043 supplies a constant voltage as a charging voltage to the battery blocks E2011 and E2012. When the battery blocks E2011 and E2012 are charged, the switching circuits 2021 and 2022 are turned on.

Figure 51:
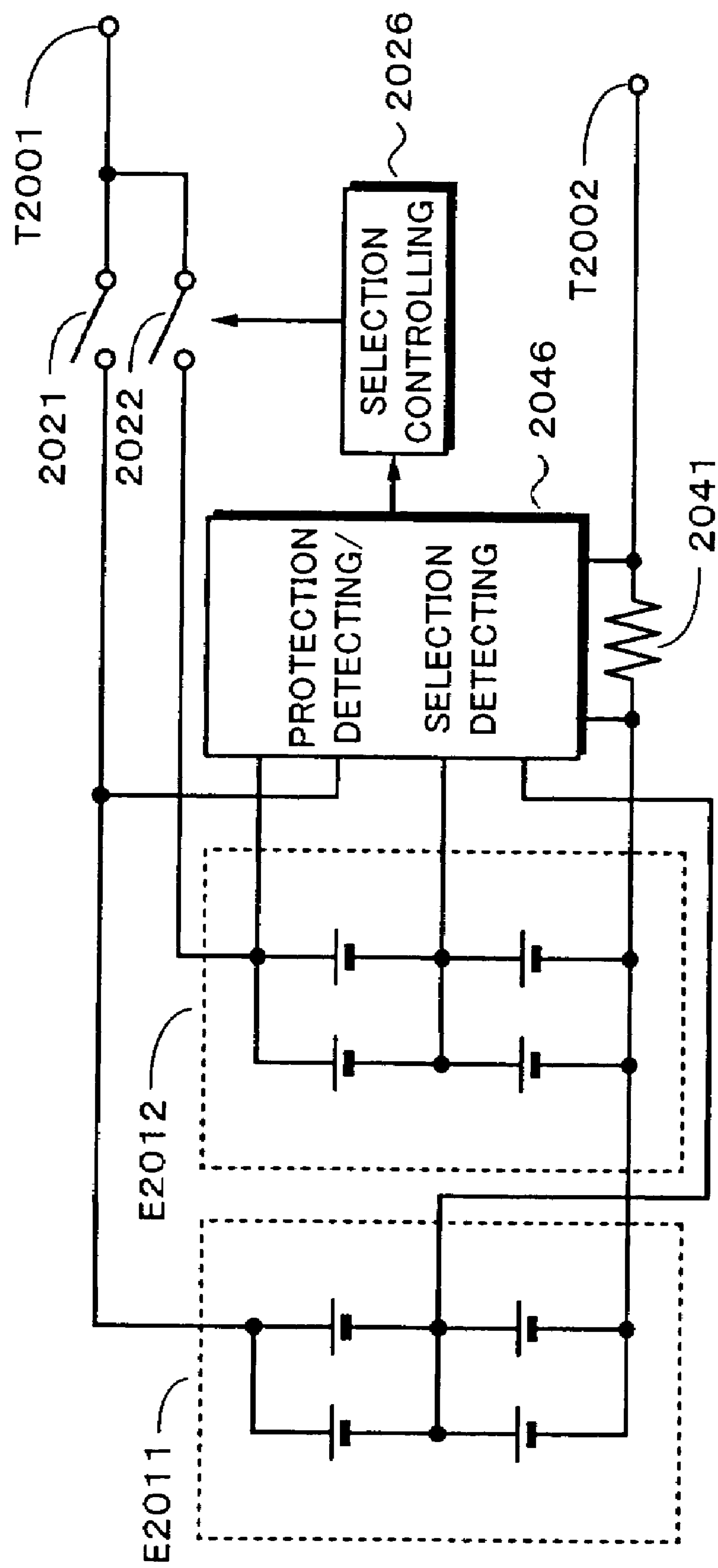
FIG. 51 is a block diagram describing a battery pack according to a fifth embodiment of the present invention.

Next, with reference to FIG. 51, a battery pack according to a fifth embodiment of the present invention will be described. According to the fifth embodiment, battery blocks E2011 and E2012 are protected and their capacities are detected. A protection detecting/selection detecting circuit 2046 detects battery capacities of the battery blocks E2011 and E201 directly from them or in accordance with a current detected with a resistor 2041. The protection detecting/selection detecting circuit 2046 supplies a control signal to a selection controlling circuit 2026 in accordance with the detected results. The selection controlling circuit 2026 supplies a selection signal to switching circuits 2021 and 2022 in accordance with the supplied control signal so as to control the switching circuits 2021 and 2022.

Figure 52:
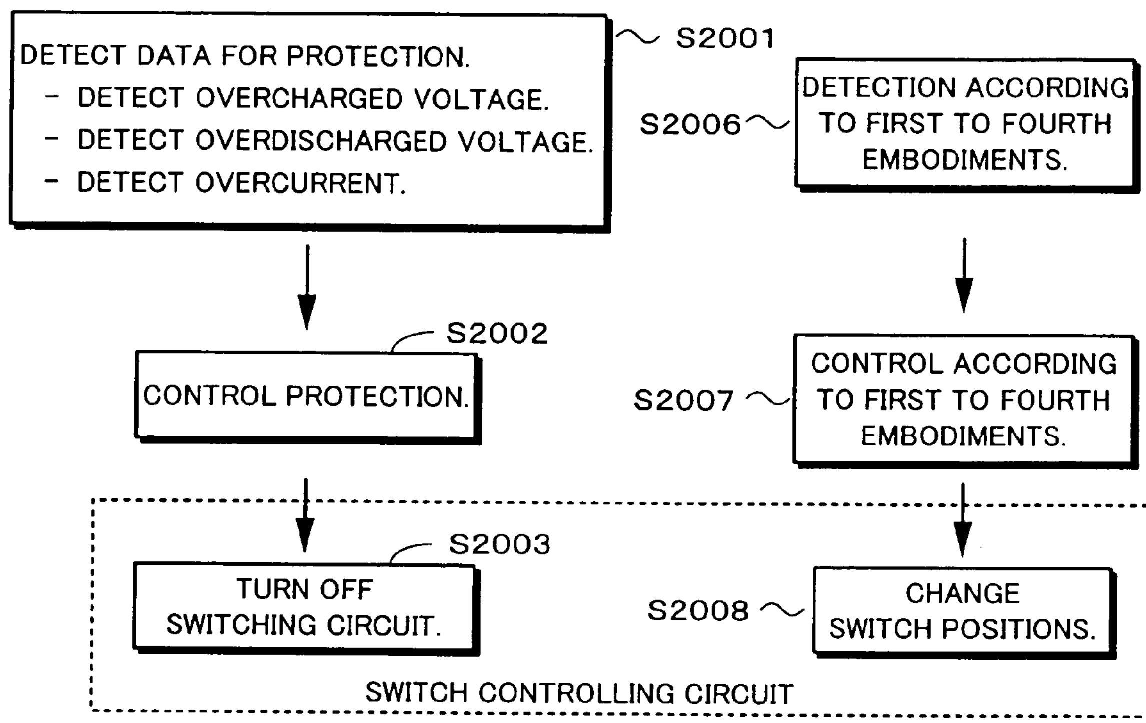
FIG. 52 is a flow chart describing a control of the battery pack according to each of the first to fifth embodiments of the present invention.

The protection detecting/selection detecting circuit 2046 according to the fifth embodiment performs a control as shown in FIG. 52. At step S2001, data necessary for protecting the battery blocks E2011 and E2012 is detected. For example, an overcharged voltage, an overdischarged voltage, and/or an overcurrent is detected. At step S2002, a control for protecting the battery block E2011 and/or E2012 is performed in 56. accordance with the detected result. At step S2003, a selection signal that causes the switching circuit 2021 and/or 2022 to be turned off is output.

Thus, the protection detecting/selection detecting circuit 2046 can detect voltages and currents of the battery blocks E2011 and E2012, perform a charging/discharging operation, and control the switching circuits 2021 and 2022 at a time.

Next, an example of a control for protecting the battery pack according to each of the first to forth embodiments will be described. In the battery block according to the first embodiment, at step S2006, the battery capacities of the battery blocks E2011 and E2012 are detected. At step S2007, it is determined whether or not the difference between the battery capacities is equal to or higher than a reference value. At step S2008, when the determined results represents that the difference between the battery capacities is equal to or higher than the reference value, a selection signal that causes the selection switching circuit 2012 to change one battery block to another is output.

In the battery pack according to the second embodiment, at step S2006, the battery capacities of the battery blocks E2011 and E2012 are detected. At step S2007, it is determined whether or not the difference between the battery capacities is equal to or higher than the reference value. At step S2008, when the determined result represents that the difference between the battery capacities is equal to or higher than the reference value, a selection signal that causes the switching circuits 2021, 2022, and 2023 to change one battery block to another is output. At that point, on/off states of the switching circuits 2021, 2022, and 2023 are controlled so that the battery blocks E2011 and E2012 are not connected.

In the battery pack according to the third embodiment, at step S2006, the battery capacities of the battery blocks E2011 and E2012 are detected. At step S2007, it is determined whether or not each of the battery capacities of the battery blocks E2011 and E2012 is equal to or lower than a reference value and the battery capacities are the same. At step S2008, when the determined result represents that each of the battery capacities is equal to or lower than the reference value and the battery capacities are the same, a selection signal that causes the switching circuits 2021 and 2022 to be turned on is output.

In the battery pack according to the fourth embodiment, at step S2006, the battery capacities of the battery blocks E2011 and E2012 are detected. At step S2007, it is determined whether or not each of the charging capacities of the battery blocks E2011 and E2012 is equal to or higher than 80%. When the determined result at step S2008 represents that each of the charging capacities is equal to or higher than 80%, a selection signal that causes the switching circuits 2021 and 2022 to be turned on is output.

Figure 53:
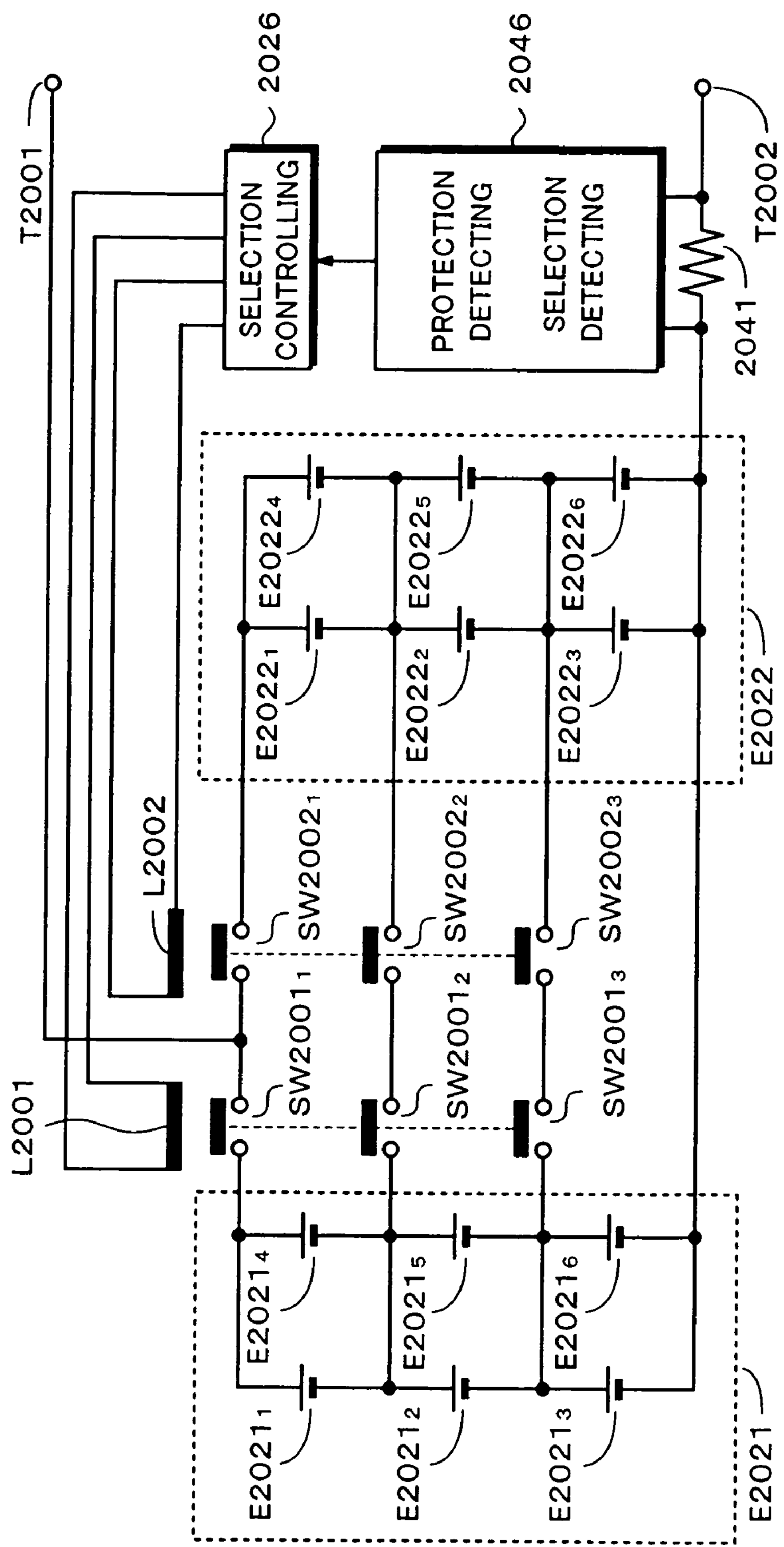
FIG. 53 is a block diagram describing a battery pack according to a sixth embodiment of the present invention.

Next, with reference to FIG. 53, a battery pack according to a sixth embodiment of the present invention will be described. According to the sixth embodiment, the foregoing solenoid type switches are used. Battery blocks E2021 and E2022 are disposed. Each of the battery blocks E2021 and E2022 is composed of six secondary battery cells of which two sets of three secondary battery cells connected in series are connected in parallel.

The battery block E2021 is composed of secondary battery cells E$\mathbf{2021}_1$, E$\mathbf{2021}_2$, E$\mathbf{2021}_3$, E$\mathbf{2021}_4$, E$\mathbf{2021}_5$, and E$\mathbf{2021}_6$. The secondary battery cells E$\mathbf{2021}_1$, E$\mathbf{2021}_2$, and E$\mathbf{2021}_3$ are connected in series. The secondary battery cells E$\mathbf{2021}_4$, E$\mathbf{2021}_5$, and E$\mathbf{2021}_6$ are connected in series. The secondary battery cells E$\mathbf{2021}_1$ and E$\mathbf{2021}_4$ are connected in parallel. The secondary battery cells E$\mathbf{2021}_2$ and E$\mathbf{2021}_5$ are connected in parallel. The secondary battery cells E$\mathbf{2021}_3$ and E$\mathbf{2021}_6$ are connected in parallel.

The battery block E2022 is composed of secondary battery cells E$\mathbf{2022}_1$, E$\mathbf{2022}_2$, E$\mathbf{2022}_3$, E$\mathbf{2022}_4$, E$\mathbf{2022}_5$, and E$\mathbf{2022}_6$. The secondary battery cells E$\mathbf{2022}_1$, E$\mathbf{2022}_2$, and E$\mathbf{2022}_3$ are connected in series. The secondary battery cell E$\mathbf{2022}_4$, E$\mathbf{2022}_5$ and E$\mathbf{2022}_6$ are connected in series. The secondary battery cells E$\mathbf{2022}_1$ and E$\mathbf{2022}_4$ are connected in parallel. The secondary battery cells E$\mathbf{2022}_2$ and E$\mathbf{2022}_5$ are connected in parallel. The secondary battery cells E$\mathbf{2022}_3$ and E$\mathbf{2022}_6$ are connected in parallel.

Switches SW$\mathbf{2001}_1$ and SW$\mathbf{2002}_1$ are connected in series between a positive terminal of the secondary battery cell E$\mathbf{2021}_1$ and a positive terminal of the secondary battery cell E$\mathbf{2022}_1$. Switches SW$\mathbf{2001}_2$ and SW$\mathbf{2002}_2$ are connected in series between a positive terminal of the secondary battery cell E$\mathbf{2021}_2$ and a positive terminal of the secondary battery cell E$\mathbf{2022}_2$. Switches SW$\mathbf{2001}_3$ and SW$\mathbf{2002}_3$ are connected in series between a positive terminal of the secondary battery cell E$\mathbf{2021}_3$ and a positive terminal of the secondary battery cell E$\mathbf{2022}_3$.

On/off states of the switches SW$\mathbf{2001}_1$, SW$\mathbf{2001}_2$, and SW$\mathbf{2001}_3$ are controlled by a coil L2001. On/off states of the switches SW$\mathbf{2002}_1$, SW$\mathbf{2002}_2$, and SW$\mathbf{2002}_3$ are controlled by a coil L2002. The coils L2001 and L2002 are connected to a selection controlling circuit 2026. A battery terminal T2001 is connected from a connection point of the switches SW$\mathbf{2001}_1$ and SW$\mathbf{2002}_1$.

When solenoid type switches are used, many switches can be operated at a time. When a charging operation or a discharging operation is performed for the battery blocks E2021 and E2022, if the switches SW2001 and SW2002 are turned on, the center points of the secondary battery cells are connected.

Figure 54:
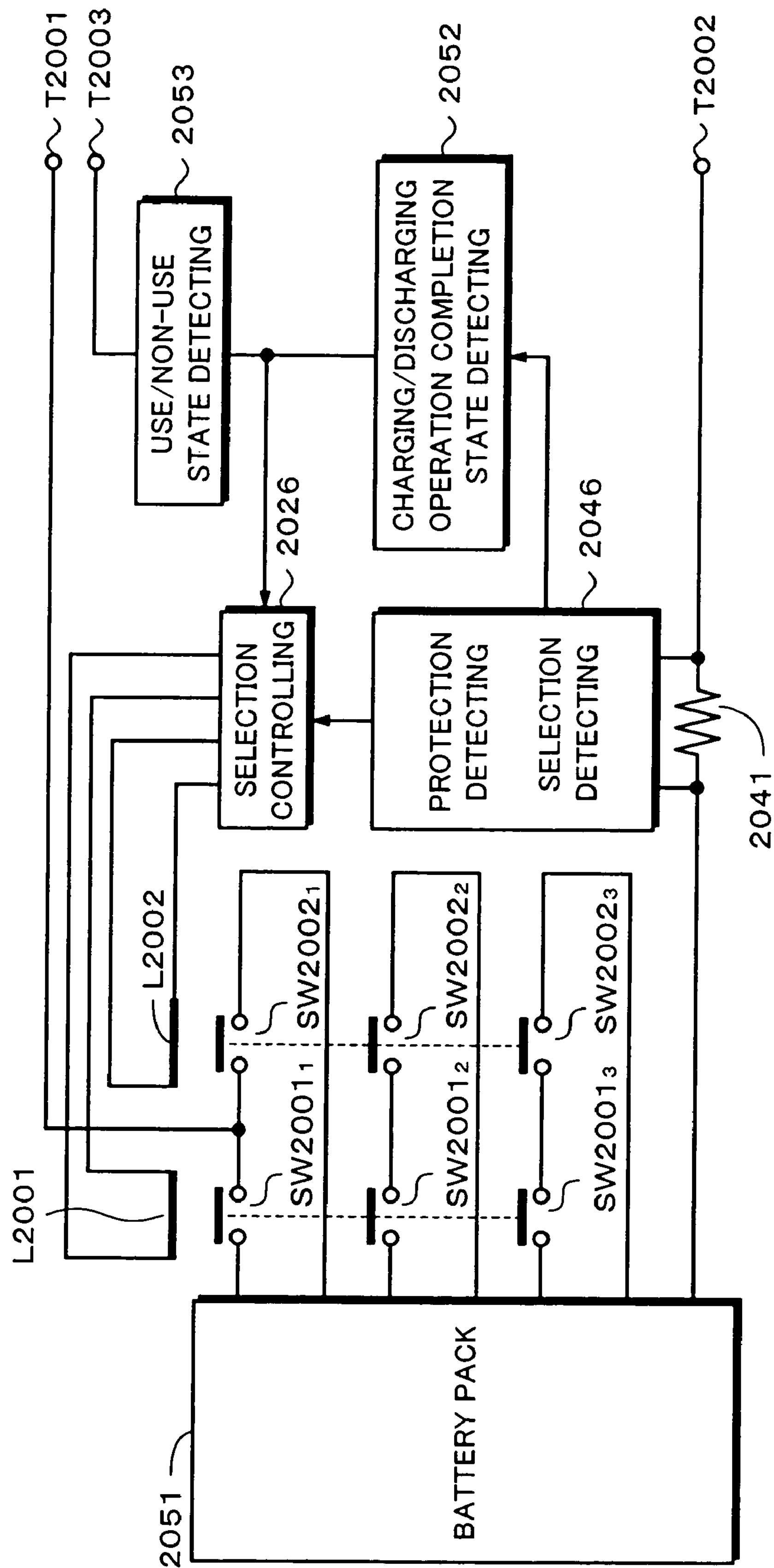
FIG. 54 is a block diagram describing another example of the battery pack according to the sixth embodiment of the present invention.

Next, with reference to FIG. 54, an example of which battery capacities of battery blocks E2021 and E2022 that have been charged/discharged or that are not used are balanced will be described. In FIG. 54, the battery blocks E2021 and E2022 are contained in a battery pack 2051.

A charging/discharging operation completion state detecting circuit 2052 detects a state of which the battery blocks E2021 and E2022 have been charged and discharged in accordance with a signal supplied from the protection detecting/selection detecting circuit 2046. When the detected result represents that the battery blocks E2021 and E2022 have been charged and discharged, a completion signal is supplied to a selection controlling circuit 2026.

A use state detecting circuit 2053 detects a state of whether the voltage/current of the battery pack 2051 is being used. When the detected result represents that the voltage/current is not being used, a non-use signal is supplied to the selection controlling circuit 2026.

When the completion signal and the non-use signal have been supplied to the selection controlling circuit 2026, it controls the coil L2001 and/or L2002 and the switches SW$\mathbf{2001}_1$, SW$\mathbf{2001}_2$, and SW$\mathbf{2001}_3$ and/or SW$\mathbf{2002}_1$, SW$\mathbf{2002}_2$, and SW$\mathbf{2002}_3$ so as to balance the battery capacities of the secondary battery cells contained in the battery pack 2051.

Figure 55:
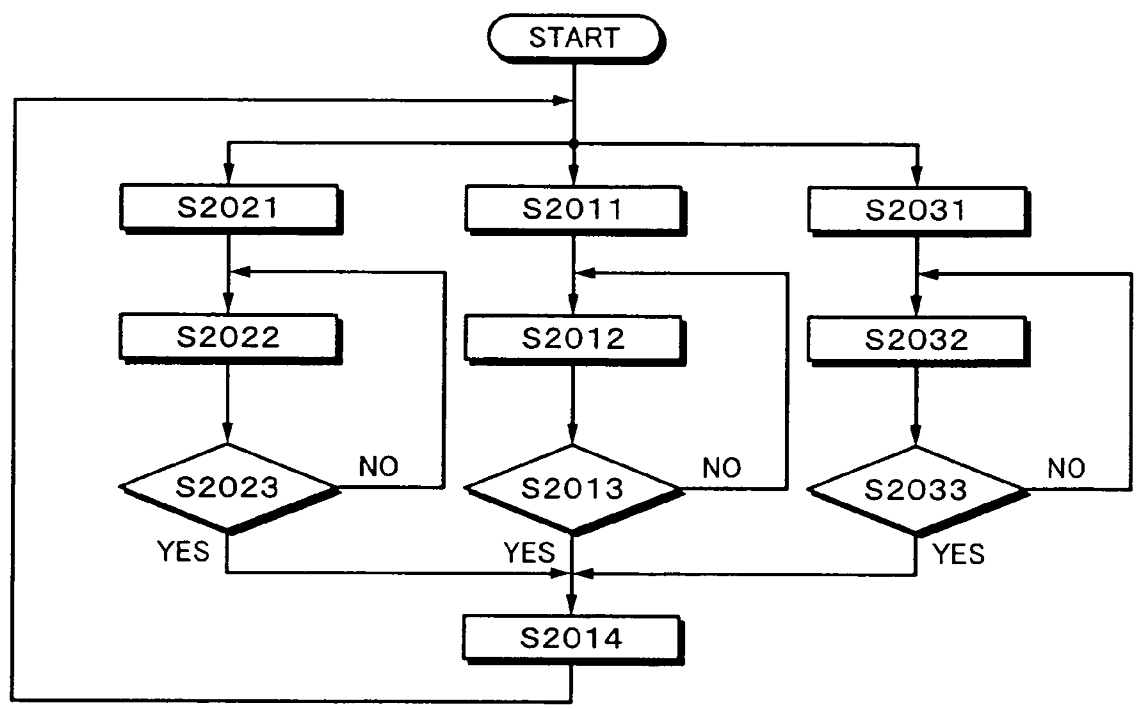
FIG. 55 is a flow chart describing a control of the battery pack according to the sixth embodiment of the present-invention.

Next, with reference to a flow chart shown in FIG. 55, an example of the control will be described. At step S2011, for example an electronic device is connected and the battery pack 2051 is discharged. At step S2012, the charging/discharging operation completion state detecting circuit 2052 detects a state that represents the battery pack 2051 has been discharged. At step S2013, it is determined whether or not the state that represents that the battery pack 2051 has been discharged in accordance with the detected result has been detected. When the determined result represents that the state has been detected, the control advances to step S2014. When the determined result represents that the state has not been detected, the control advances to step S2012.

At step S2021, the battery pack 2051 is charged. At step S2022, the charging/discharging completion state detecting circuit 2052 detects a state that represents that the battery pack 2051 has been charged. At steps S2023, it is determined whether or not the state has been detected in accordance with the detected result. When the determined result represents that the state has been detected, the control advances to step S2014. When the determined result represents that the state has not been detected, the control advances to step S2022.

At step S2031, the battery pack 2051 is charged or discharged. At step eS2032, the use/non-use state detecting circuit 2053 detects a state of whether or not the battery pack 2051 is being charged or discharged. At step S2033, it is determined whether or not the battery pack 2051 is being used in accordance with the detected result. When the determined result represents that the battery pack 2051 has not been used, the control advances to step S2014. When the determined result represents that the battery pack 2051 is being used, the control advances to step S2032.

At step S2014, when the determined result represents that the battery pack 2051 has been charged and discharged and is not being used, the selection controlling circuit 2026 controls the coil L2001 and/or L2002 so as to control the switches SW$\mathbf{2001}_1$, SW$\mathbf{2001}_2$, SW$\mathbf{2001}_3$, and/or SW$\mathbf{2002}_1$, SW$\mathbf{2002}_2$, and SW$\mathbf{2002}_3$.

In the battery packs according to the foregoing embodiments, as an example, two battery packs are used. Alternatively, three or more battery blocks may be used.

The present invention is not limited to such embodiments. Instead, various modifications and ramifications may be made without departing from the spirit of the present invention.

According to the present invention, a switch can be turned off with a current that flow therein.

According to the present invention, when a detecting circuit is additionally used, a time period for which a switch is turned off can be shortened.

According to the present invention, when a latch type switch is used, a power consumption can be reduced.

Unlike with related art, according to the present invention, an on/off state of a switch that protects a circuit (part) can be easily checked. In addition, safety of a circuit (part) can be maintained without need to dispose an extra protecting circuit.

According to the present invention, with a switch, a plurality of secondary battery cells can be connected in series and in parallel so as to output a desired power.

According to the present invention, since up to 85% of the battery capacitance of a secondary battery cell can be safely charged and discharged in accordance with a characteristic of voltage/current of a secondary battery cell. Thus, even if a plurality of secondary battery cells that are connected in series and in parallel are charged and discharged, their safety can be maintained. In addition, the charging time can be shortened. When secondary battery cells are discharged, a power can be stably output.

The invention claimed is:

1. A switching circuit, comprising:

first and second coils;

a switch connected in series with the first coil and having a movable magnetic substance;

controlling means for controlling on/off states of the switch with a current that flows in the second coil;

wherein when an overcurrent flows in the first coil, the first coil and the second coil are configured to turn off the switch; and wherein the controlling means toggles the states of the switch by toggling the direction of the current that flows in the second coil.

2. A protecting device, comprising:

a first switch and a second switch connected in series;

controlling means for controlling on/off states of the first switch and the second switch;

operation state detecting means for detecting operation states of the first switch and the second switch;

state determining means for determining whether or not control states of the first switch and the second switch match the operation states thereof, wherein when the determined result of the state determining means represents that the control states do not match the operation states, the first switch and the second switch are configured to be turned off;

wherein the operation state detecting means is configured to detect electric charges stored in a capacitor disposed between a first path in which the first switch and the second switch are disposed and a second path that is different from the first path so as to detect the operation states of the first switch and the second switch.

3. The protecting device as set forth in claim 2, wherein each of the first switch and the second switch is a solenoid type switch or a selection type switch.

4. A battery pack, comprising:

a first battery block and a second battery block, each of which is composed of a plurality of secondary battery cells connected in series and in parallel;

a first battery terminal to which first terminals of the first battery block and the second battery block are connected through first switching means and second switching means;

a second battery terminal to which second terminals of the first battery block and the second battery block are connected;

switching means for switching the first switching means and the second switching means when charging or discharging is performed;

capacitance detecting means for detecting battery capacitances of the first battery block and the second battery block; and switching controlling means for controlling the switching means in accordance with the detected battery capacities, wherein when the first switch means and the second switch means are switched, after one of the first switch and the second switch is turned off and a predetermined time period elapses, the other of the first switch means and the second switch means is turned on.

5. The battery pack as set forth in claim 4, wherein when the difference between the battery capacity of the first battery block and the battery capacity of the second battery block is equal to or higher than a predetermined value, the first switch means and the second switch means are switched.

6. The battery pack as set forth in claim 4, wherein when the battery capacity of each of the first battery block and the second battery block is equal to or lower than the reference value and the battery capacities are almost the same, the first switch means and the second switch means are controlled so that charging and discharging are performed at a time.

7. The switching circuit as set forth in claim 1 for use with a battery pack, further comprising:

a first battery block and a second battery block having said first and second coils, each of which is composed of a plurality of secondary battery cells connected in series and in parallel;

a first battery terminal to which first terminals of the first battery block and the second battery block are connected through first switching means and second switching means;

a second battery terminal to which second terminals of the first battery block and the second battery block are connected;

switching means, including said switch connected in series with the first coil, for switching the first switching means and the second switching means when charging or discharging is performed;

capacitance detecting means for detecting battery capacitances of the first battery block and the second battery block; and switching controlling means for controlling the on-off states of the switching means in accordance with the detected battery capacities related to a current that flows in the second coil, wherein when the first switch means and the second switch means are switched, after one of the first switch and the second switch is turned off when an overcurrent flows in the first coil, and a predetermined time period elapses, the other of the first switch means and the second switch means is turned on.

8. The switching circuit for the battery pack as set forth in claim 7, wherein when the difference between the battery capacity of the first battery block and the battery capacity of the second battery block is equal to or higher than a predetermined value, the first switch means and the second switch means are switched.

9. The switching circuit for the battery pack as set forth in claim 7, wherein when the battery capacity of each of the first battery block and the second battery block is equal to or lower than the reference value and the battery capacities are almost the same, the first switch means and the second switch means are controlled so that charging and discharging are performed at a time.

10. A protecting device for a battery pack as set forth in claim 2, further including:

a first battery block and a second battery block, each of which is composed of a plurality of secondary battery cells connected in series and in parallel;

a first battery terminal to which first terminals of the first battery block and the second battery block are connected through first switching means and second switching means including a first switch and a second switch connected in series;

a second battery terminal to which second terminals of the first battery block and the second battery block are connected;

switching means for switching the first switching means and the second switching means when charging or discharging is performed;

said operation state detecting means is a capacitance detecting means for detecting battery capacitances of the first battery block and the second battery block; and wherein said controlling means is a switching controlling means for controlling the switching means in accordance with the detected battery capacities, wherein when the first switch means and the second switch means are switched, after one of the first switch and the second switch is turned off and a predetermined time period elapses, the other of the first switch means and the second switch means is turned on.

11. The protecting device as set forth in claim 10, wherein when the difference between the battery capacity of the first battery block and the battery capacity of the second battery block is equal to or higher than a predetermined value, the first switch means and the second switch means are switched.

12. The battery pack as set forth in claim 10, wherein when the battery capacity of each of the first battery block and the second battery block is equal to or lower than the reference value and the battery capacities are almost the same, the first switch means and the second switch means are controlled so that charging and discharging are performed at a time.

13. The switching circuit as set forth in claim 1, wherein the controlling means can toggle the states of the switch by toggling the direction of the current that flows in the second coil, in response to a detected overcurrent.

14. The switching circuit as set forth in claim 1, wherein when the switch is toggled off by the first coil in response to an overcurrent and by the controlling means in response to the detected overcurrent, the time period for turning off the switch is shorter than if the switch is toggled off by the first coil alone.

15. The switching circuit as set forth in claim 1, wherein the second coil is set on a circuit in a closed loop with the controlling means, and the controlling means operates the second coil in accordance with a signal from a current detecting means for detecting overcurrent on either side of a resistor.

16. The switching circuit as set forth in claim 1, wherein the controlling means operates by controlling a first plurality of switches connected in series and a second plurality of switches connected in series, the first and second plurality of switches being in parallel.

17. The switching circuit as set forth in claim 16, wherein the controlling means operates by controlling a first plurality and second plurality of switches so as to toggle the current passed to the second coil.

18. The switching circuit as set forth in claim 1, wherein the controlling means operates by controlling a first and second switches operating in series on opposite ends of the second coil to toggle the current passed to the second coil.

19. The protecting device as set forth in claim 2, wherein the state determining means function by sampling the current at one point along the series of switches.

* * * * *